US006373789B2

(12) United States Patent
Koike et al.

(10) Patent No.: US 6,373,789 B2
(45) Date of Patent: *Apr. 16, 2002

(54) ELECTRONICALLY CONTROLLED MECHANICAL TIMEPIECE AND METHOD CONTROLLING THE SAME

(75) Inventors: Kunio Koike, Matsumoto; Eisaku Shimizu, Okaya; Osamu Takahashi, Matsumoto; Osamu Shinkawa, Suwa, all of (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/162,876

(22) Filed: Sep. 29, 1998

(30) Foreign Application Priority Data

| | | |
|---|---|---|
| Sep. 30, 1997 | (JP) | 9-265205 |
| Apr. 17, 1998 | (JP) | 10-108251 |
| Aug. 4, 1998 | (JP) | 10-220738 |

(51) Int. Cl.$^7$ .......... G04B 1/00; G04C 3/00; H02D 9/04

(52) U.S. Cl. .......... 368/204; 322/8; 322/29

(58) Field of Search .......... 368/64, 66, 140, 368/155–157, 203–204; 322/8, 29, 46; 318/696

(56) References Cited

U.S. PATENT DOCUMENTS

| | | | | |
|---|---|---|---|---|
| 3,937,001 A | | 2/1976 | Berney | |
| 4,361,409 A | * | 11/1982 | Sutter | 368/80 |
| 4,799,003 A | | 1/1989 | Tu et al. | |
| 5,517,469 A | * | 5/1996 | Wiget | 368/140 |
| 5,668,414 A | | 9/1997 | Takahashi | |
| 5,699,322 A | * | 12/1997 | Born | 368/66 |
| 5,740,131 A | * | 4/1998 | Bernasconi | 368/148 |
| 5,751,666 A | * | 5/1998 | Farine | 368/140 |

FOREIGN PATENT DOCUMENTS

| | | | |
|---|---|---|---|
| EP | 0 239 820 | 7/1987 | |
| EP | 0 762 243 | 12/1997 | |
| EP | 0 816 955 | 7/1998 | |
| JP | 8-101284 | 4/1996 | G04C/10/100 |
| JP | 7-119812 | 11/1997 | G04C/3/14 |

* cited by examiner

*Primary Examiner*—Vit Miska
(74) *Attorney, Agent, or Firm*—Stroock & Stroock & Lavan LLP

(57) ABSTRACT

An electronically controlled mechanical timepiece includes a mechanical energy source; a generator for converting mechanical energy transmitted through a train wheel to electrical energy. A rotation controller coupled to the generator controls rotation of the generator and includes switch capable of short circuiting the generator by intermittently activating and deactivating the switch using chopper control.

69 Claims, 43 Drawing Sheets

ELECTRONICALLY CONTROLLED MECHANICAL TIMEPIECE AND METHOD CONTROLLING THE SAME

BACKGROUND OF THE INVENTION

The present invention relates to an electronically controlled mechanical timepiece for accurately driving hands fixed to a train wheel by converting the mechanical energy of a mechanical energy source, such as a mainspring, into electrical energy by a generator and controlling the rotational cycle of the generator by actuating a rotation controller powered by the electric energy.

Japanese Examined Patent Publication No. 7-119812 and Japanese Unexamined Patent Publication No. 8-101284 disclose electronically controlled mechanical timepieces for displaying time by driving hands fixed to a train wheel by converting mechanical energy generated by the release of a mainspring into electrical energy by a generator and controlling the value of the current flowing to the coil of the generator by actuating a rotation controller by the electrical energy.

In the timepieces of the above references, it is important to increase braking torque when the mainspring has high torque and prevent a drop of generated power at the same time to increase the time with which the timepiece may be powered by the electrical energy. For this purpose, the electronically controlled mechanical timepiece disclosed in Japanese Examined Patent Publication No. 7-119812 provides an angular range where the rotating velocity of a rotor is increased by turning off a brake to increase the amount of generated power each time the rotor rotates. That is, a brake is released during each rotation of the rotor to permit more power to be generated to compensate for the drop in generated power when the brake is applied over an angular range.

Further, the timepiece disclosed in Japanese Unexamined Patent Publication No. 8-101284 increases braking torque and prevents a drop of a generated voltage at the same time by boosting the voltage of the power induced by a generator with a number of stages of a boosting circuit.

However, in the timepiece disclosed in Japanese Examined Patent Publication No. 7-119812, the rotor is switched from a state in which it rotates at a high rotating velocity to a state in which it rotates at a low rotating velocity. The abrupt velocity change is difficult to realize as the rotor almost stops during each rotation. In particular, because a fly wheel is typically provided to increase the rotational stability of the rotor, it is difficult to abruptly change the velocity of the rotor.

Further, since generated power is reduced when the brake is applied, a limit is reached in suppressing the reduction in the loss of generated power while increasing braking torque.

On the other hand, because the electronically controlled mechanical timepiece disclosed in Japanese Unexamined Patent Publication No. 8-101284 requires a number of switches and capacitors, the cost of the design is increased.

Accordingly, it is desirable to provide a timepiece that overcomes the drawbacks of the prior art.

SUMMARY OF THE INVENTION

Generally speaking, in accordance with the invention, an electronically-controlled, mechanical timepiece preferably can include a mechanical energy source, a generator driven by the mechanical energy source coupled therewith through a train wheel. The generator generating induced power and supplying electrical energy from first and second terminals of the generator, and hands coupled with the train wheel. A rotation controller, driven by the electric energy can be provided to control the rotational cycle of the generator, and can include a switch for short-circuiting the respective terminals of the generator, and wherein the rotation controller uses chopping to control the generator by intermittently actuating the switch.

The electronically controlled mechanical timepiece of the present invention drives the hands and the generator by a mainspring and regulates the number of rotations of a rotor (and thereby the rotation of the hands) by applying a brake to the generator by the rotation controller. The generator rotation is controlled by chopping the generator by activating and deactivating the switch that short circuits the ends of the generator coil. When the switch is activated, a short-circuit brake is applied to the generator by chopping and energy is stored in the coil of the generator. Whereas, when the switch is deactivated, the generator is operated and a voltage generated thereby is increased by the energy stored in the coil. As a result, when the generator is controlled by chopping, a loss of generated power caused when the brake is applied can be compensated by an increase in the generated voltage when the switch is deactivated. Thus, brake torque can be increased while keeping the generated power to at least a prescribed level so that the timepiece can have a long life.

Since the effect of increasing the generated voltage is diminished when the chopping frequency is lower than five times the waveform frequency of the generated voltage, it is preferable that a chopping frequency for intermittently activating the switch by the rotation controller is at least five times as large as the waveform frequency of the voltage generated by the rotor of the generator at a set velocity. It is more preferable that the chopping frequency is five to one hundred times as large as the waveform frequency of the voltage generated by the rotor of the generator at the set velocity.

When the chopping frequency is more than one hundred times as large as the waveform frequency of the generated voltage, an IC for executing chopping consumes a large amount of power. Thus, it is preferable that the chopping frequency is one hundred times or less the waveform frequency of the generated voltage. Further, because the changing ratio of torque to the changing ratio of a duty cycle approaches a prescribed level when the chopping frequency is five times to one hundred times as large as the waveform of the generated voltage, the control can be easily carried out. However, the chopping frequency may be set to less than five times or greater than one hundred times the value of the generated voltage waveform depending upon the use and the control method.

In a preferred embodiment, the timepiece includes first and second power supply lines for charging the electrical energy of the generator to a power supply circuit, wherein the switch is composed of a first and a second switch, preferably transistors, interposed between the first and second terminals of the generator and one of the first and second power supply lines, respectively, and the rotation controller continuously activates the switch connected to one of the first and second terminals of the generator as well as intermittently activates the switch connected to the other terminal of the generator.

With this arrangement, since the control of the power generating process and the rotation process of the generator can be simultaneously carried out in addition to the brake control by chopping, cost can be reduced by decreasing the number of parts as well as an improvement can be attained in power-generating efficiency by controlling the timing at which the respective switches are activated.

Further, it is preferable that the rotation controller includes comparators for comparing the waveforms of the voltage generated by the generator with a reference waveform, a comparison circuit for comparing the output from each comparator with a time standard signal and outputting a difference signal, a signal output circuit for outputting a pulse-width varied clock signal based on the difference signal, and a logic circuit for ANDing the clock signal and the output from each comparator and outputting an ANDed signal to the transistors.

With this arrangement, because the power consumed to intermittently control the transistors can be reduced, a circuit may be arranged that is suitable for the generator of a clock that generates a small amount of power.

A preferred embodiment of the timepiece includes a first switch that includes a first field effect transistor having a gate connected to the second terminal of the generator and a second field effect transistor connected in series to the first field effect transistor is intermittently activated by the rotation controller. The second switch includes a third field effect transistor having a gate connected to the first terminal of the generator, and a fourth field effect transistor connected in series to the third field effect transistor that is intermittently activated by the rotation controller. Further, one of the first and second diodes are interposed between one of the first and second terminals of the generator and one of the first and second power supply lines, respectively.

In another preferred embodiment, the first switch is preferably composed of a first field effect transistor having a gate connected to the second terminal of the generator that is a second field effect transistor connected in series to the first field effect transistor and intermittently activated by the rotation controller. The second switch is preferably composed of a third field effect transistor having a gate connected to the first terminal of the generator and a fourth field effect transistor connected in series to the third field effect transistor that is intermittently activated by the rotation controller. A boost capacitor is interposed between one of the first and second terminals of the generator and the other of the first and second power supply lines and a diode is interposed between the other of the first and second terminals and the other of the first and second power supply lines.

In the timepiece constructed as described above, when the first terminal of the generator is positive and the second terminal thereof is negative (i.e., the second terminal has lower potential than that of the first terminal), the first field effect transistor, whose gate is connected to the second terminal, is activated, and the third field effect transistor, whose gate is connected to the first terminal, is deactivated. As a result, the a.c. current generated by the generator flows through the path composed of the first terminal, the first field effect transistor, one of the first and second power supply lines, the power supply circuit, the other of the first and second power supply lines and the second terminal.

When the second terminal of the generator is set to positive and the first terminal thereof is set to negative (i.e., the first terminal has a lower potential than that of the second terminal), the third field effect transistor whose gate is connected to the first terminal, is activated, and the first field effect transistor, whose gate is connected to the second terminal, is deactivated. As a result, the a.c. current generated by the generator flows through the path composed of the second terminal, the third field effect transistor, one of the first and second power supply lines, the power supply circuit, the other of the first and second power supply lines and the first terminal.

At that time, the second and fourth field effect transistors are repeatedly activated and deactivated in response to the chopping signals input to their gates. Since the second and fourth field effect transistors are connected in series to the first and third field effect transistors, when the first and third field effect transistors are activated, a current flows regardless of the activation state of the second and fourth field effect transistors. However, when the first and third field effect transistors are deactivated, current flows when the second and fourth field effect transistors are activated in response to the chopper signal. Therefore, when the second and fourth field effect transistors, which are connected in series to one of the first and third field effect transistors in the deactivated state, are activated in response to the chopping signal, both the first and second switches are activated to thereby short-circuit the respective terminals of the generator.

With this operation, the generator may be subjected to a brake control by chopping so that a drop of generated power when the brake is applied can be compensated by an increase in the generated voltage when the switch is deactivated. In this way, brake torque can be increased, while maintaining generated power to at least a prescribed level so that the life of the timepiece is prolonged. Further, since the generator is rectified by the first and third field effect transistors whose gates are connected to the respective terminals, a comparator and the like are not required, thereby simplifying the construction as well as preventing a drop in the charging efficiency due to the power consumed by the comparator. Further, since the field effect transistors are activated and deactivated making use of the terminal voltage of the generator, the respective field effect transistors can be synchronized with the polarities of the terminals of the generator, thereby improving the rectifying efficiency.

When a boost capacitor is interposed between one of the terminals of the generator and a power supply line as described above, the power supply circuit and the boost capacitor can be simultaneously charged when the terminal voltage of the terminal to which the capacitor is connected is increased. Whereas, when the voltage of the other terminal of the generator is increased, the power supply circuit can be charged with a high voltage obtained by adding the voltage charged to the boost capacitor to the voltage induced by the generator.

The rotation controller can include a chopper signal generator for generating at least two types of chopper signals having different duty ratios and at least the two types of chopper signals can be imposed on the switch to thereby perform chopping control of the generator.

In the present invention, when the switch for short-circuiting both terminals of the generator is provided and the generator is controlled by imposing the chopping signal to the switch, although a lower chopper frequency and a higher duty ratio can provide increased drive torque (brake torque) and the higher chopper frequency increases the charged voltage (generated voltage), the drive torque and voltage generated are not significantly reduced even if the duty ratio is increased. This effect is found where the charged voltage is increased until the duty ratio is about 0.8 when the chopper frequency is at least 50 Hz. Thus, the generator can be controlled by chopping using at least the two chopper signals having different duty ratios.

It is preferable that the rotation controller includes a brake controller for detecting the rotational cycle of the generator and applying a brake to the generator based on the rotational cycle and a brake deactivation control for releasing the brake. The brake controller imposes chopper signals having different duty ratios on the switch in the brake-activation control and the brake-deactivation control. For example, preferably, the chopper signal imposed in the brake-activation control can have a duty ratio larger than that of the chopper signal imposed in the brake-deactivation control.

The timepiece of the present invention can drive the hands and the generator by a mainspring and regulate the number of revolutions of the rotor (and hence the hands) by applying a brake, controlled by a rotation controller, to the generator.

The rotation control of the generator is carried out by imposing a chopper signal on the switch capable of short-circuiting both ends of the generator coil and turning the switch on and off, that is, by chopping the switch. When the switch is activated by the chopping, a short-circuit brake is applied to the generator and energy is stored to the generator coil. Whereas, when the switch is deactivated, the generator is operated and a voltage generated thereby is increased by the energy stored in the coil. As a result, when the generator is controlled by the chopping in the application of the brake, a drop of the generated power caused when the brake is applied can be compensated by an increase of the generated voltage when the switch is deactivated. In this manner, brake torque (brake torque) can be increased while preventing a drop in the generated power so that the timepiece life is prolonged.

When the brake activation control in which the brake is applied by imposing at least two types of chopper signals having different duty ratios on the switch, the control torque of the generator can be increased and a drop of the generated power can be prevented by using a chopper signal having a large duty ratio (during which the switch is activated for a longer period than the switch is deactivated).

On the other hand, when the brake is released, the brake torque of the generator can be greatly reduced and the generated power can be sufficiently maintained by using a chopper signal having a duty ratio smaller than that of the chopper signal described above.

The application of the brake by a chopper signal having a large duty ratio and the release thereof by means of the chopper signal having a small duty ratio permits an increase of the brake torque while suppressing a drop of the generated power (power charged to a capacitor and the like), whereby an electronically controlled mechanical timepiece having a long life can be arranged.

Although the brake-activation control and the brake-deactivation control are ordinarily carried out once in each reference cycle of the generator (for example, the cycle during which the rotor rotates once), in one embodiment, only the brake-deactivation control may be carried out during a plurality of the reference cycles just after the generator is started.

Further, although the duty ratio of the respective chopper signals may be set in accordance with the characteristics of the generator to be controlled, a chopper signal having a large duty ratio of, for example, about 0.7 to 0.95, and a chopper signal having a small duty ratio of about, for example, 0.1 to 0.3 can be used.

In another embodiment, the rotation controller includes a chopper signal generator for generating a chopper signal and brake controller for switching a brake-activation control for detecting the rotational cycle of the generator and applying a brake to the generator based on the rotational cycle and a brake-deactivation control for releasing the brake. In this embodiment, the brake controller imposes the chopper signal on the switch only in the brake-activation control to thereby perform chopping control of the generator.

Since the chopping signal is imposed only in the brake activation control which, in this case, also needs to control a brake, the brake torque of the generator can be increased and a drop of generated power can be suppressed by chopping.

The rotation controller can include a chopper signal generator for generating at least two types of chopper signals having a different frequency, which are imposed on the switch to thereby chopping control the generator.

It is preferable that the rotation controller includes a brake controller for switching a brake activation control for detecting the rotational cycle of the generator and applying a brake to the generator based on the rotational cycle and a brake deactivation control for releasing the brake, wherein the brake controller uses chopper signals having different frequencies on the switch in the brake activation control and the brake deactivation control and the chopper signal imposed in the brake activation control has a frequency smaller than that of the chopper signal imposed in the brake deactivation control. When the chopper signal imposed on the switch has a high frequency, the drive torque (brake torque) is reduced so that a braking effect is decreased and the charged voltage (generated voltage) is increased. On the other hand, when the chopper signal having a low frequency is imposed, the drive torque is increased, the braking effect is increased, and the charged voltage is reduced as compared with the case where the frequency is high. However, since chopping is carried out, the charged voltage is increased as compared with a case where only a brake control is executed.

Therefore, where the brake is applied during brake activation control, the brake torque of the generator can be increased by using a chopper signal having a low frequency while suppressing a drop of the generated power by the chopping. On the other hand, where the brake is released during brake-deactivation control, the brake torque of the generator can be greatly reduced by using a chopper signal having a frequency which is higher than that used during brake activation control, thereby generating sufficient power.

The brake torque can be increased while suppressing a drop of the generated power by applying the brake using a chopper signal having the low frequency and releasing the brake using a chopper signal having the high frequency, whereby an electronically controlled mechanical timepiece having a long life can be arranged.

Although the frequency of the respective chopper signals may be set in accordance with the characteristics of the generator to be controlled, a chopper signal having a high frequency of, for example, about 500–1000 Hz and a chopper signal having a low frequency of, for example, about 10–100 Hz can be used.

Further, the chopping control may be carried out using chopper signals having not only a different frequency but also a different duty ratio. In particular, brake control can be effectively carried out when a chopper signal having a low frequency and a high duty ratio is used in the brake activation control and a chopper signal having a high frequency and a low duty ratio is used in the brake deactivation control.

The rotation controller can include a chopper signal generator for generating at least two types of chopper signals having different frequencies and a voltage sensor for detecting the voltage of a power supply charged by the generator. Where the voltage of the power supply detected by the voltage sensor is lower than a set value, a chopper signal having a first frequency can be imposed on the switch, and when the detected voltage of the power supply is higher than the set value, a chopper signal having a second frequency, which is lower than the first frequency, can be imposed on the switch.

In one embodiment, the rotation controller preferably includes a brake controller for switching a brake activation control, for detecting the rotational cycle of the generator, and for applying a brake to the generator based on the rotational cycle, and a brake deactivation control for releasing the brake. The chopper signal generator can generate two types of chopper signals having a different duty ratio at first and second frequencies. The brake controller can use chopper signals having one of a first and second frequencies selected in correspondence to the power supply voltage and a different duty ratio than the switch in the brake activation control and the brake deactivation control, respectively.

In the present invention arranged as described above, the chopper signal for executing the brake control of the generator is switched to a chopper signal having a different frequency in accordance with the power supply voltage (for example, the voltage charged to the capacitor by the generator). Accordingly, when the power supply voltage is lower than a predetermined value, a chopper signal can be used that decreases brake torque and increases charged voltage (that is, which gives priority to charging rather than a braking effect), whereas when the power supply voltage is higher than the predetermined value, a chopper signal can be used that increases the brake torque and decreases charged voltage (that is, which gives priority to the brake rather than a charging effect), so that a proper brake control can be carried out in accordance with a charged state.

Further, it is preferable that the rotation controller synchronizes the time at which the brake activation control for applying the brake to the generator and the brake deactivation control for releasing the brake are switched with a time when the switch is intermittently activated in response to the chopper signal. When the timing of the brake is synchronized with the timing of the chopping signal, the chopper signal can also be used as a pace measuring pulse.

In a further embodiment, the rotation controller can include a rotational cycle sensing for detecting the rotational cycle of the rotor by means of a rotor rotation sensing signal, which is set to one of a low-level signal and a high-level signal when the voltage of the rotational waveform of the generator is compared with a reference voltage at a time of chopping and the voltage of the rotational waveform is equal to or lower than the reference voltage, and to the other of the low-level signal and the high-level signal when the voltage of the rotational waveform is higher than the reference voltage.

It is preferable that the rotation controller sets the rotor rotation sensing signal to one of the low-level signal and the high-level signal when the voltage of the rotational waveform of the generator is compared with the reference voltage at the time of chopping and is continuously equal to or lower than the reference voltage n number of times, and sets the rotor rotation sensing signal to the other of the low-level signal and the high-level signal when the voltage of the rotational waveform of the generator which is compared with the reference voltage at the time of chopping is continuously higher than the reference voltage m number of times. In addition, it is preferable that n and m are based on a chopping frequency and a noise frequency superimposed on the rotational waveform of the rotor.

When the generator is controlled by chopping, a chopper pulse is superimposed on the rotational waveform of the rotor of the generator. Therefore, the voltage of the rotational waveform of the rotor is compared with the reference voltage at the time the chopper pulse is superimposed (i.e., time at which the chopping is executed) to obtain a rectangular wave signal (rotor rotation sensing signal) that corresponds to the rotational cycle of the rotor from the rotational waveform of the rotor.

At that time, noise such as an external magnetic field (for example, a commercial power supply having a frequency of 50/60 Hz) may be superimposed on the rotational waveform of the rotor and there may arise such a case that the rotational waveform of the rotor is deformed by the effect of the noise and the rotor rotation sensing signal cannot be correctly obtained. To cope with this problem, whether the rotational waveform of the rotor is equal to or less than the reference voltage or greater than the reference voltage can be correctly and reliably detected so that the erroneous detection of the rotor rotation sensing signal caused by the effect of the noise can be prevented by setting the rotor rotation sensing signal to one of the low-level signal and the high-level signal when the voltage of the rotational waveform of the generator is continuously equal to or lower than the reference voltage n number of times, and setting the rotor rotation sensing signal to the other of the low-level signal and the high-level signal when the voltage of the rotational waveform of the generator (which is compared with the reference voltage at the time of chopping) is continuously higher than the reference voltage m number of times.

Further, the rotation controller may set the rotor rotation sensing signal to one of the low-level signal and the high-level signal when the voltage of the rotational waveform of the generator (which is compared with the reference voltage at the time of chopping) is continuously equal to or lower than the reference voltage x number of times and set the rotor rotation sensing signal to the other of the low-level signal and the high-level signal when the rotational waveform of the generator (which is compared with the reference voltage at the time of chopping) is higher than the reference voltage y number of times (which may not be continuous). It is preferable here that the x times and the y times are set based on a chopping frequency and a noise frequency superimposed on the rotational waveform of the rotor.

Whether the rotational waveform of the rotor is equal to or less than the reference voltage or greater than the reference signal can be correctly and reliably detected and the erroneous detection of the rotor rotation sensing signal caused by the effect of the noise can be prevented.

Further, the rotation controller may control the rotation of the rotor using a PL control and may control the rotation of the rotor using an up/down counter. In short, the rotation controller may control the rotation of the rotor using any means so long as it compares the rotational waveform of the rotor with the reference waveform from a quartz oscillator and carries out the brake control of the generator so as to reduce the difference therebetween.

A method of controlling an electronically controlled, mechanical timepiece of the present invention is provided that includes the steps of comparing a reference signal based on a signal from a time standard source with a rotation sensing signal output that corresponds to the rotational cycle of the generator, intermittently activating a switch capable of short-circuiting the respective terminals of the generator in accordance with an amount of advance of the rotation sensing signal with respect to the reference signal and subjecting the generator to a brake control by chopping.

According to the above control method, because the rotation control (brake control) of the generator is carried out by chopping the activation and deactivation of the switch capable of short-circuiting both the ends of the generator coil, a drop in generated power caused when the brake is applied can be compensated by an increase of the generated voltage when the switch is deactivated. In this way, control torque can be increased while keeping the generated power to at least a prescribed level so that the life of an electronically controlled mechanical timepiece can be prolonged.

A second method of controlling an electronically controlled mechanical timepiece is provided, and includes the steps of inputting a reference signal based on a signal from a time standard source and a rotation sensing signal output that corresponds to the rotational cycle of the generator to an up/down counter by setting one of the signal as an up-count signal and the other of the signals as a down-count signal, applying a brake to the generator by chopping when the counter value of the up/down counter is a predetermined value and not applying the brake to the generator when the counter value is a value other than the predetermined value.

According to the above control method, when the counter value of the up/down counter is the predetermined value (that is, when the torque of the mechanical energy source, such as a mainspring, is increased and the rotation of the generator is increased), a brake is continuously applied by chopping until the difference between the respective count values disappears. As a result, brake torque can be increased while keeping generated power to at least a prescribed level, whereby a rotational velocity can be promptly and correctly regulated so that a control can be executed with excellent responsiveness. Further, since counting and the comparison of respective count values can be performed at the same time by the up/down counter, the construction can be simplified and the difference between the respective count values can be simply determined.

As described above, according to the electronically controlled mechanical timepiece of the present invention, torque for controlling the generator can be increased while keeping generated power to at least a prescribed amount as well as a cost can be also reduced.

An object of the present invention is to provide an electronically controlled mechanical timepiece capable of increasing the braking torque of a generator while keeping generated power at least at a prescribed level, and reduce the cost of the timepiece construction.

Other features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference numerals depict like elements throughout the several views.

DETAILED DESCRIPTION OF THE PREFERRED EMBODIMENTS

Figure 1:
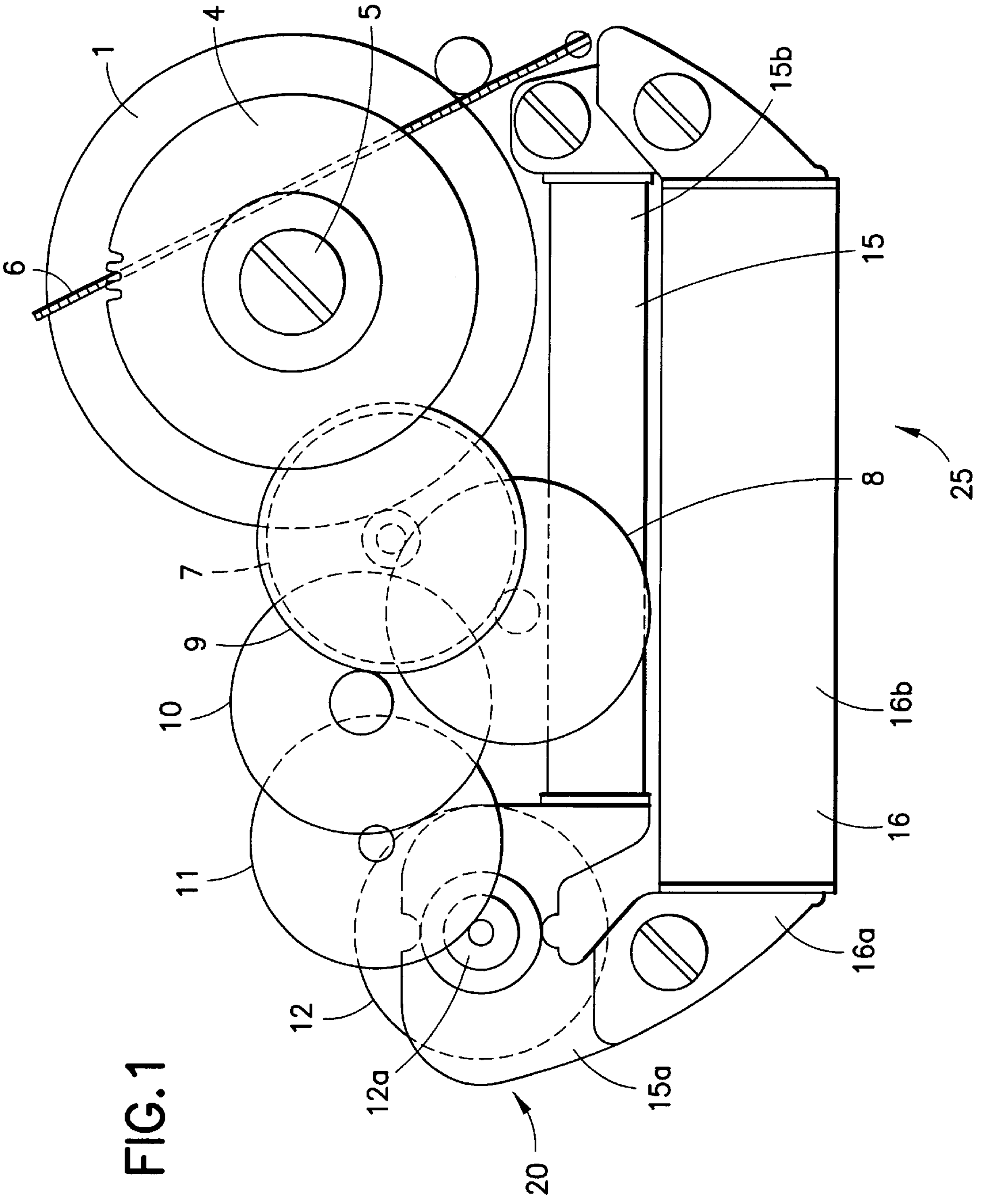
FIG. 1 is a plan view showing a portion of an electronically controlled mechanical timepiece constructed in accordance with a first embodiment of the present invention.
Figure 2:
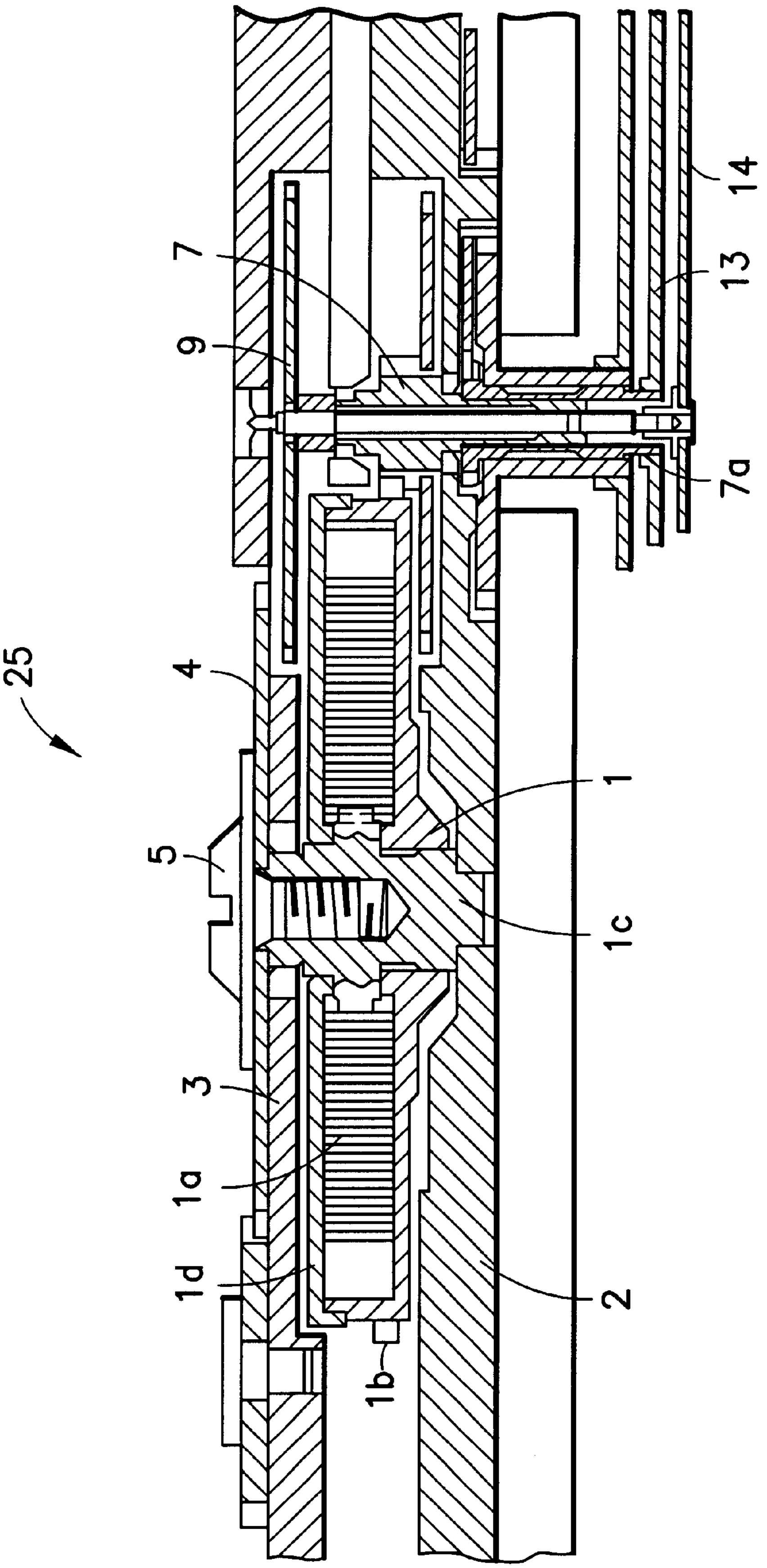
FIG. 2 is a cross-sectional elevational view showing a portion of the timepiece constructed in accordance with the first embodiment of the invention.

Referring to FIG. 1, a plan view showing a portion of an electronically controlled, mechanical timepiece generally depicted as 25, is constructed in accordance with of a first embodiment of the invention. Referring to FIG. 2, which depicts timepiece 25 in a front elevational cross section, timepiece 25 includes a movement barrel 1, having a mainspring 1*a*, a barrel wheel 1*b*, a barrel arbor 1*c*, and a barrel cover 1*d*. Mainspring 1*a* is supported with its outer end anchored at barrel wheel 1*b* and its inner end anchored at barrel arbor 1*c*. Barrel arbor 1*c* is supported by a main plate 2 and a train wheel support 3, and is rigidly secured to a ratchet wheel 4 by a ratchet wheel screw 5 so that both barrel arbor 1*c* and ratchet wheel 4 are integrally rotated.

Referring again to FIG. 1, ratchet wheel 4 meshes with a pawl 6 that permits ratchet wheel 4 to be rotated clockwise but does not permit ratchet wheel 4 to be rotated counterclockwise. The method of turning ratchet wheel 4 clockwise to tighten mainspring 1*a* is identical to the mechanism of self-winding or manual winding of a mechanical timepiece, which is well-known in the art and therefore is not discussed here. The rotation of barrel wheel 1*b* is stepped up in speed by a factor of seven and transmitted to a second wheel and pinion 7, and thereafter sequentially stepped up by a factor of 6.4 and transmitted to a third wheel and pinion 8, stepped up by a factor of 9.375 and transmitted to a fourth wheel and pinion 9, stepped up by a factor of three and transmitted to a fifth wheel and pinion 10, stepped up by a factor of 10 and transmitted to a sixth wheel and pinion 11, stepped up by a factor of ten and transmitted to a rotor 12. Through these step-up train wheels 7 through 11, the rotational speed is increased by a factor of 126,000.

Figure 3:
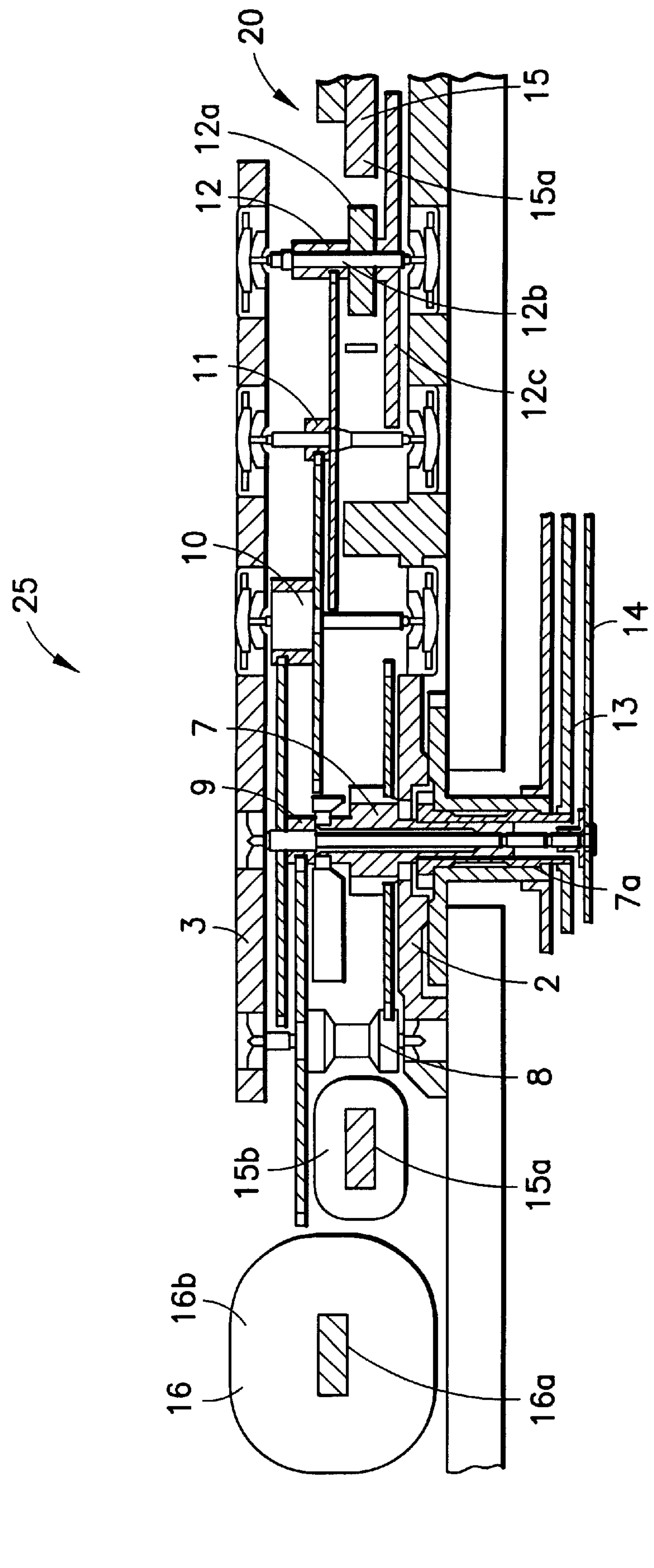
FIG. 3 is a sectional elevational view showing a portion of the timepiece constructed in accordance with the first embodiment of the invention.

Referring to FIG. 3, second wheel and pinion 7 includes a cannon pinion 7*a* and a minute band 13 attached to cannon pinion 7*a* for indicating time. A second hand 14 for indicating time is attached to the fourth wheel and pinion 9. To rotate second wheel and pinion 7 at 1 rpm and fourth wheel and pinion 9 at 1 rpm, rotor 12 may be controlled to rotate at 5 rpm. In such a case, barrel wheel 1*b* rotates at 1/7 rpm.

Timepiece 25 also includes a generator 20 having rotor 12, a stator 15 and a coil block 16. Rotor 12 includes a rotor magnet 12*a*, a rotor pinion 12*b*, and a rotor flywheel 12*c*, which reduces variations in the number of revolutions of rotor 12 due to variations in driving torque of movement barrel 1. Stator 15 includes a stator body 15*a* around which a stator coil 15*b* having 40,000 turns, by way of example, is wound. Coil block 16 includes a coil core 16*a* around which a coil 16*b* having 110,000 turns, by way of example, is wound. Stator body 15*a* and coil core 16*a* are made of PC Permalloy or of other materials known in the alt. Stator coil 15*b* and coil 16*b* are connected in series so that the sum of the voltages across these coils is output.

Figure 4:
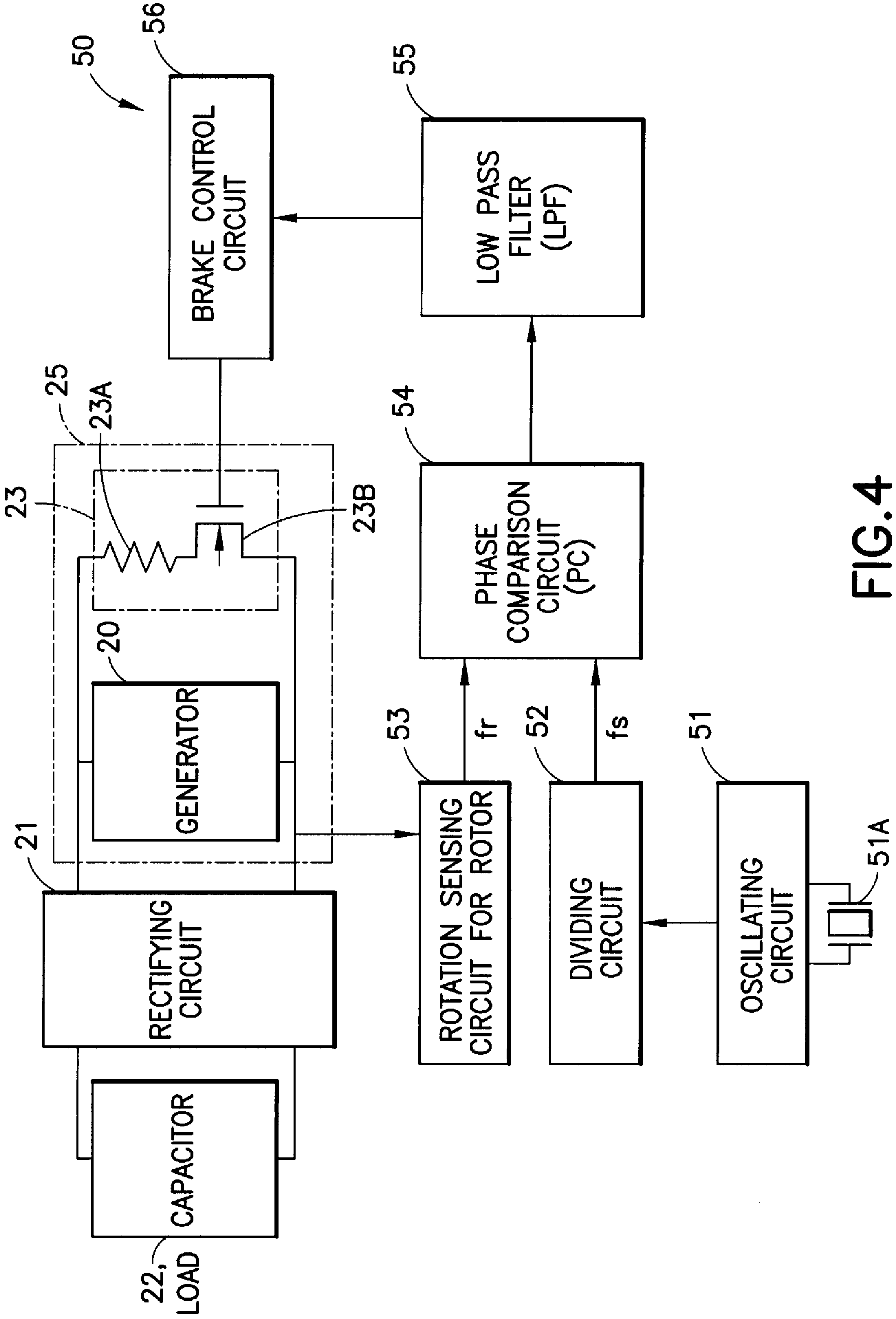
FIG. 4 is a block diagram the timepiece constructed in accordance with the timepiece of the first embodiment of the invention.

Next, a control circuit of the electronically controlled mechanical timepiece will be described with reference to FIGS. 4 to 9. FIG. 4 is a block diagram showing a timepiece constructed in accordance with a first embodiment of the invention.

The AC output from generator 20 is boosted and rectified through a rectifying circuit 21, which executes boosting and rectification using full wave rectification, half wave rectification, transistor rectification, and the like. A load 22 such as an integrated circuit (IC) for controlling, for example, a rotation controller, a quartz oscillator, and the like is connected to rectifying circuit 21. FIG. 4 shows respective functional circuits arranged in an IC separately from load 22 for the convenience of description.

A voltage control oscillator (VCO) 25 coupled across rectifying circuit 21 is composed of generator 20 and braking circuit 23. Connected to generator 20 is a braking circuit 23. Braking circuit 23 includes braking resistor 23A and an N-channel or P-channel-type transistor 23B, which functions as a switch, connected in series. A diode may be suitably inserted into braking circuit 23 in addition to braking resistor 23A.

A rotation controller 50 is connected to VCO 25, and includes an oscillating circuit 51 providing an input to a dividing circuit 52 which provides an input to phase comparison circuit (PC) 54. A rotation sensing circuit 53, for detecting the rotation of rotor 12 also provides an input to a phase comparison circuit (PC) 54 which in turn provides an input to a low pass filter (LPF) 55 which in turn provides an input to a brake control circuit 56.

Oscillating circuit 51 outputs an oscillating signal generated by a quartz oscillator 51A, which is divided to a prescribed frequency by dividing circuit 52. The divided signal is output to phase comparison circuit 54 as a time standard signal (or a reference frequency signal) fs of, for example, 100 Hz. Reference frequency signal fs may be created using various types of reference standard oscillation sources known to those skilled in the art in place of quartz oscillator 51 A.

Rotation sensing circuit 53 receives the output waveform from VCO 25 at high impedance so that generator 20 is not affected thereby, converts the output to a rectangular wave pulse fr and outputs the same to phase comparison circuit 54. Phase comparison circuit 54 compares the phase of time standard signal fs from dividing circuit 52 with that of rectangular wave pulse fr from rotation sensing circuit 53, calculates a difference and outputs a difference signal. The difference signal is input to brake control circuit 56 after its high frequency component is filtered by LPF 55. Brake control circuit 56 inputs the control signal from braking circuit 23 to VCO 25 based on the above signal, by which a phase synchronous control (PLL control) is realized.

Figure 5:
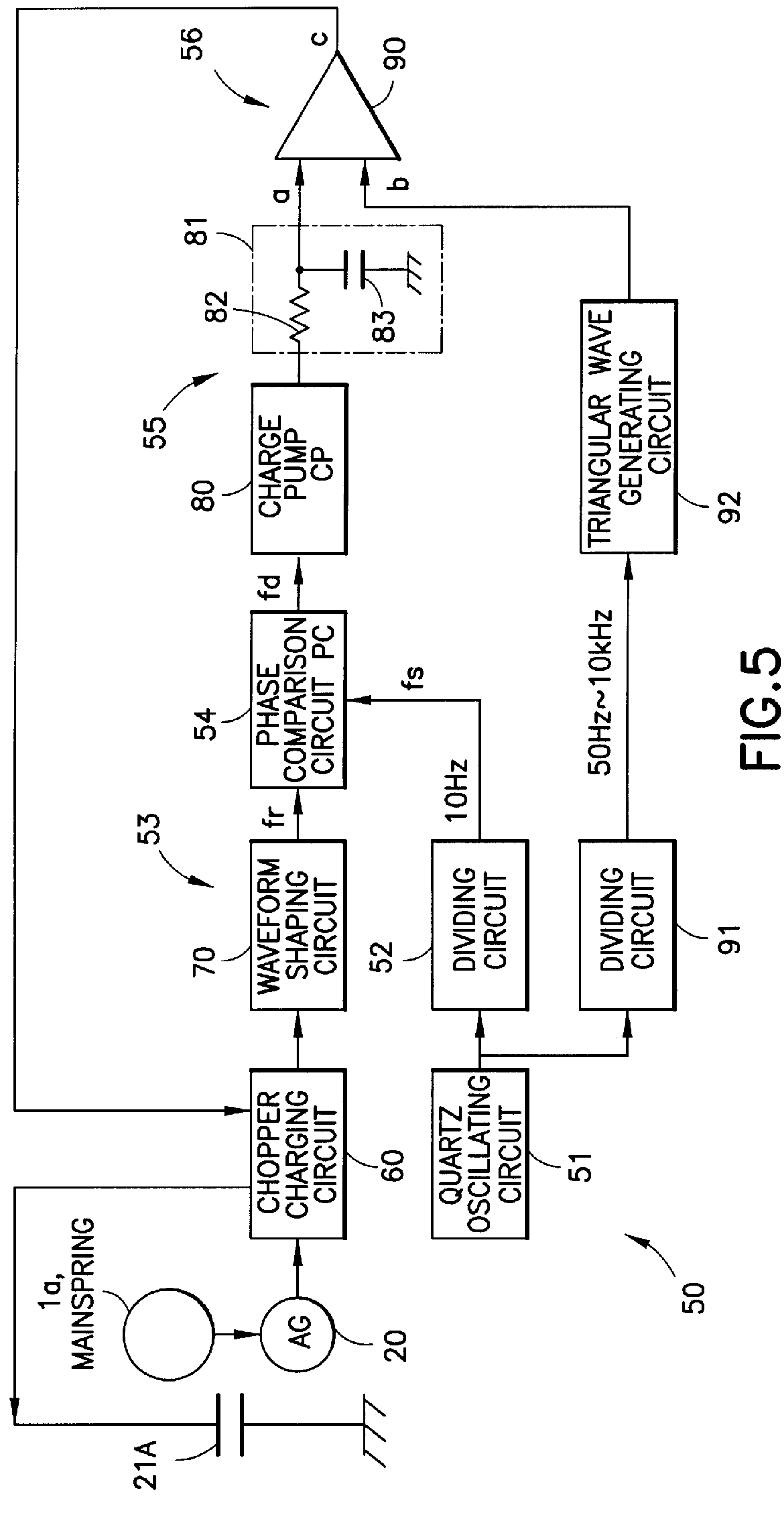
FIG. 5 is a block diagram showing the timepiece constructed in accordance with the timepiece of the first embodiment of the invention.
Figure 6:
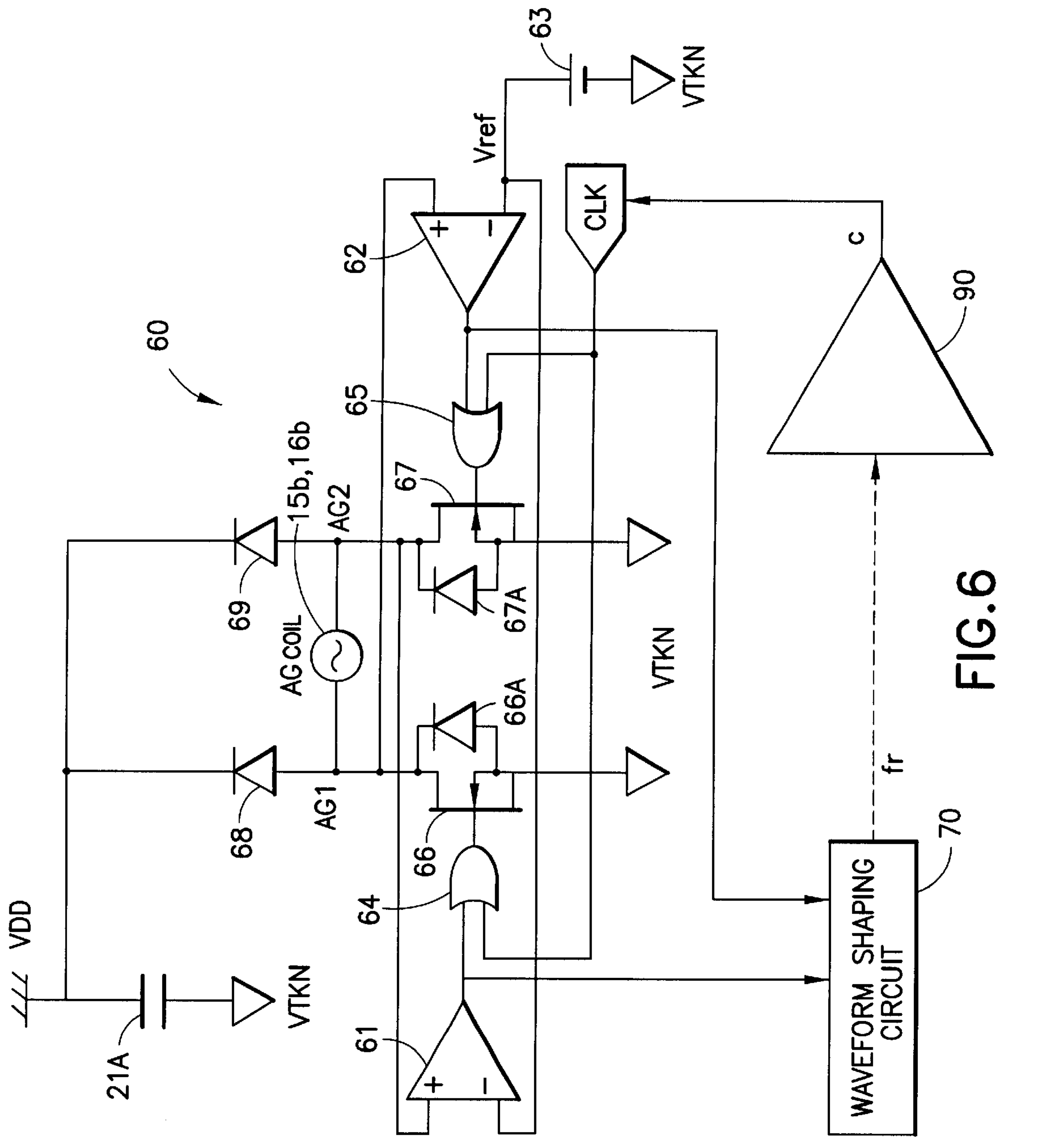
FIG. 6 is a circuit diagram showing a chopper charging circuit of the timepiece constructed in accordance with the first embodiment of the invention.

Referring to FIG. 5, a more specific arrangement of the embodiment is depicted. In the embodiment, a chopper charging circuit 60 is used as braking circuit 23. As shown in FIG. 6, chopper charging circuit 60 includes two comparators 61, 62 connected to coils 15*b*, 16*b* of generator 20. A power supply 63 supplies a comparison reference voltage Vref to comparators 61, 62, OR circuits 64, 65 receive the outputs from comparators 61, 62 and the clock output (control signal) from brake control circuit 56 and output signals to the gates of transistors 66, 67 respectively. Charging circuit 60 also includes the field effect transistors (FETs) 66, 67, which are connected to coils 15*b*, 16*b* and function as switches. Diodes 68, 69 are connected to coils 15*b*, 16*b* as well as to a capacitor power supply lines. FETs 66, 67 are provided with parasitic diodes 66A, 67A there across.

The positive side (first power supply line side) of capacitor 21 a is set to a voltage VDD and the negative side thereof (second power supply line side) is set to a voltage VTKN (V/TANK/Negative) for example, the negative side of a battery. Likewise, the negative side of power supply 63 and the source sides of transistors 66, 67 are also set to the voltage VTKN (second power supply line side). Therefore, chopper charging circuit 60 executes chopper boosting by short-circuiting generator 20 once to the VTKN side by controlling transistors 66, 67 so that the voltage of generator 20 is increased above voltage VDD when transistors 66, 67 are released. For this purpose, comparators 61, 62 compare a generated and boosted voltage with the voltage Vref, which is arbitrarily set between the VDD and the VTKN.

In chopper charging circuit 60, the outputs from comparators 61, 62 are also output to a waveform shaping circuit 70. Accordingly, rotation sensing circuit 53 is composed of chopper charging circuit 60 and waveform shaping circuit 70.

Figure 7:
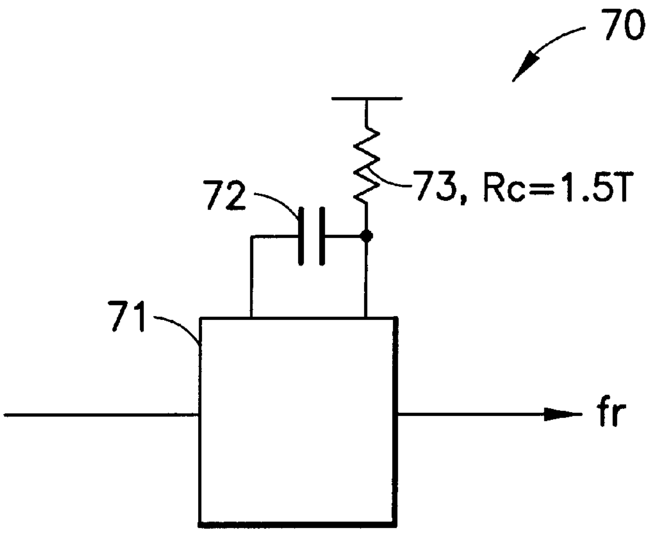
FIG. 7 is a block diagram of a waveform shaping circuit of the timepiece constructed in accordance with the first embodiment of the invention.
Figure 8:
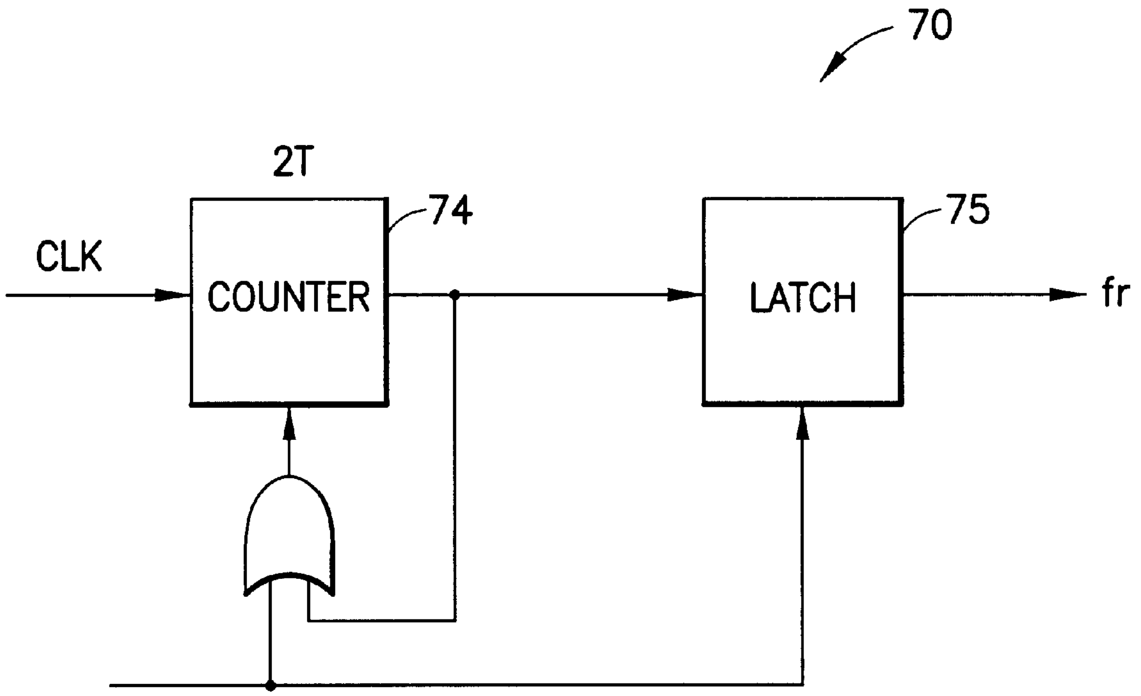
FIG. 8 a block diagram of a second embodiment of a waveform shaping circuit of the timepiece constructed in accordance with the first embodiment of the invention.

Waveform shaping circuit 70 may include a monostable multivibrator 71 (preferably, a one-shot type) composed of a capacitor 72 and a resistor 73, connected in parallel, as shown in FIG. 7, or a type using a counter 74 and a latch 75 connected in series as shown in FIG. 8. An OR Gate receives the count of counter 74 and provides an ORed input to counter 74.

Referring to FIG. 5, Phase comparison circuit 54 includes an analog phase comparator (not shown), a digital phase comparator (not shown), and may include a CMOS type phase comparator using a CMOS IC. Phase comparison circuit 54 detects a phase difference between the time standard signal fs of 10 Hz output from dividing circuit 52 and the rectangular wave pulse fr output from waveform shaping circuit 70 and outputs a difference signal fd.

Difference signal fd is input to a charge pump (CP) 80, where it is converted into a voltage level. A high frequency component of difference signal fd is removed by a loop filter 81 composed of a resistor 82 and a capacitor 83. Therefore, LPF 55 shown in FIG. 4 is composed of charge pump 80 and loop filter 81.

Referring again to FIG. 5, the level signal a output from loop filter 81 is input to a signal output circuit 90. A triangular signal b, obtained by converting the signal from oscillating circuit 51 through a triangular wave generating circuit 92, which uses a dividing circuit 91 for dividing the signal from oscillating circuit 51 to 50 Hz–100 kHz, or an integrator, for example, is also input to signal output circuit 90. Signal output circuit 90 outputs a rectangular wave pulse signal c in response to level signal a from loop filter 81 and triangular signal b. Therefore, brake control circuit 56, depicted in FIG. 4, includes signal output circuit 90, dividing circuit 91 and triangular wave generating circuit 92.

Rectangular wave pulse signal c output from signal output circuit 90 is input to chopper charging circuit 60 as clock signal CLK.

Figure 9:
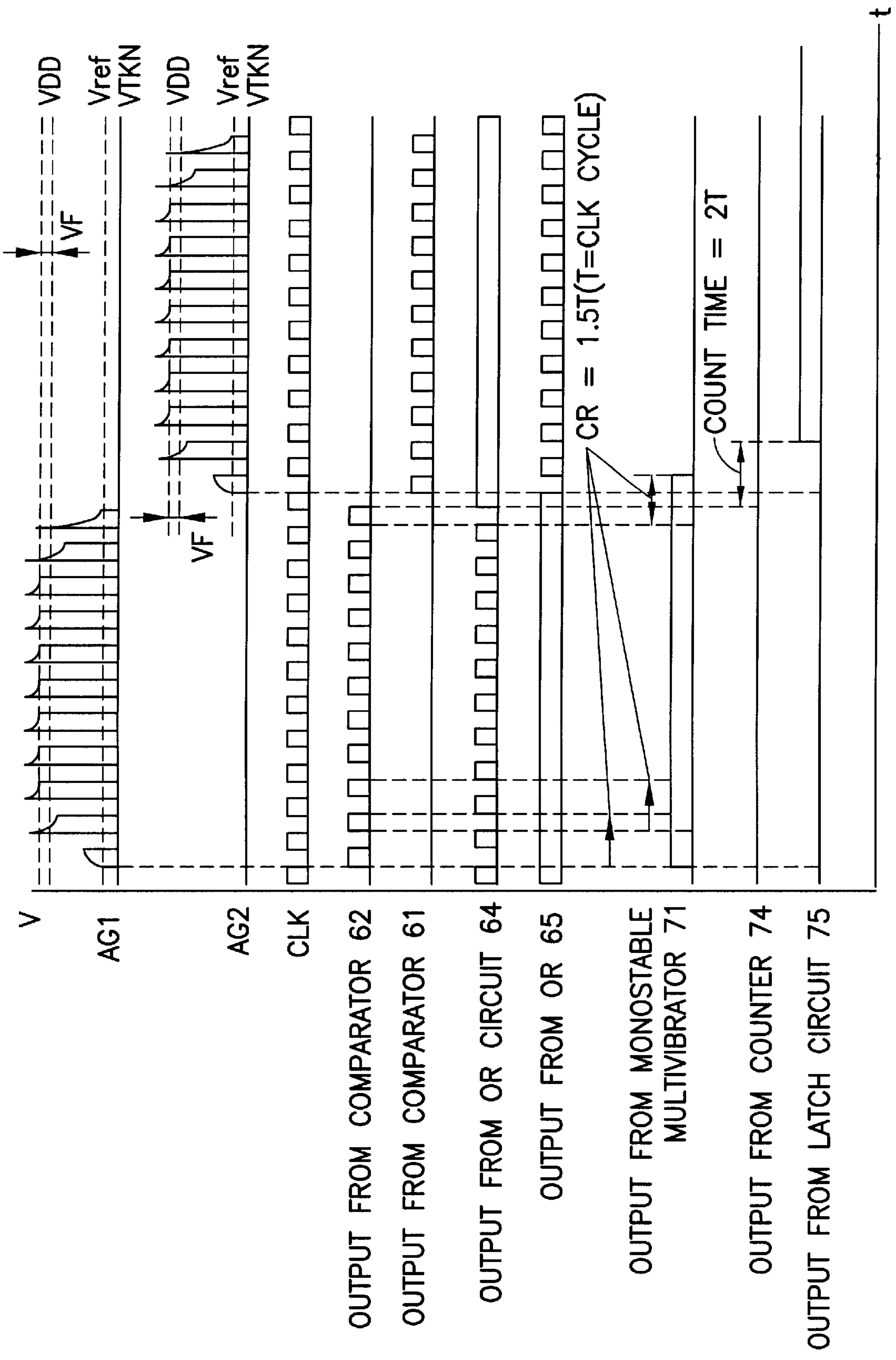
FIG. 9 is a waveform diagram of the timepiece constructed in accordance with the first embodiment of the invention.

An operation of the embodiment is described with reference to the waveforms shown in FIGS. 9, 10 and the flowchart of FIG. 11.

When rotor 12 of generator 20 is rotated by mainspring 1*a*, alternating current waveforms are output from coils 15*b*, 16*b* in accordance with the change of fluxes. The waveforms are input to comparators 61, 62, which compare them with reference voltage Vref from power supply 63. A timing of polarity for activating transistors 66, 67 is detected by the comparison executed by comparators 61, 62.

That is, boosting and charging to capacitor 21*a* and a chopper braking operation of generator 20 can be carried out only by inputting the clock signal CLK to the gates of transistors 66, 67. However, because transistors 66,67 are controlled solely by clock signal CLK, when clock signal CLK is set to a high-level signal, transistors 66, 67 are simultaneously activated and short-circuited, whereas when clock signal CLK is set to a low-level signal, capacitor 21*a* is charged through one of parasitic diodes 66A, 67A and one of diodes 68, 69. More specifically, when a terminal AG1 is set to a positive level, capacitor 21*a* is charged through a path from parasitic diode 67A to diode 68 through coils 15*b*, 16*b*, whereas when a terminal AG2 is set to a positive level, capacitor 21*a* is charged through a path from parasitic diode 66A to diode 69 through coils 15*b*, 16*b*.

In this case, since the two diodes are connected in series in the charging path, a voltage is dropped by an amount obtained by adding the rising-up voltages VF of the respective diodes. Therefore, capacitor 21*a* cannot be charged unless a charging voltage is higher than a voltage obtained by adding the amount of the voltage drop to the potential of capacitor 21*a*, which is a large factor for lowering a charging efficiency in a generator used in an electronically controlled mechanical timepiece that generates a small voltage.

To cope with the above problem, the embodiment improves the charging efficiency by regulating the timing of transistors 66, 67 without simultaneously activating and deactivating them. That is, when terminal AG1 is set to positive when viewed from voltage VTKN and exceeds voltage Vref, comparator 62 outputs a high-level signal so that OR circuit 65 continuously outputs a high-level signal regardless of clock signal CLK, and transistor 67 is activated by a voltage applied to its gate.

On the other hand, comparator 61 connected to terminal AG2 outputs a low-level signal due to terminal AG2 being less than voltage Vref, OR circuit 64 outputs a signal that is synchronized with clock signal CLK, transistor 66 repeats an activation/deactivation operation and terminal AG1 is chopper boosted.

The charging path at the time is set to AG1—diode 68—capacitor 21*a*—VTKN—transistor 67 (from source to drain)—AG2. Parasitic diode 67A is removed from the path when transistor 66 is activated once and then deactivated, thereby reducing a voltage drop and improving the charging efficiency.

It is preferable to select, as the level of voltage Vref, a generated voltage level that permits the voltage generated by generator 20 to be chopper boosted and charged to capacitor 21*a*. Ordinarily, voltage Vref is set to a level exceeding voltage VTKN by several hundred millivolts. When voltage Vref is set to a high-level, the power-generating efficiency is lowered accordingly because the period within which comparators 61, 62 are put into operation is increased and diodes 66A and 67A are connected in series in a charging path during the period, whereby the power-generating efficiency is lowered.

When transistor 66 is activated, generator 20 is short-circuited because transistor 67 is also activated at the time. As a result, a short-circuit brake is applied to generator 20 and the amount of power generated is reduced accordingly. However, the voltage of generator 20 can be boosted to a level higher than VDD by short-circuiting generator 20 to the voltage VTKN side when transistor 66 is released. Therefore, when a chopping cycle for activating and deactivating transistors 66, 67 is set higher than a prescribed cycle, a drop in generated power can be compensated for when a short-circuit brake is applied so that brake torque can be increased while maintaining generated power to a level higher than a prescribed level.

When the output from generator 20 is set to the terminal AG2 side, an operation similar to the aforesaid operation is carried out except that the operations of comparator 61 and transistor 66 are replaced with those of comparator 62 and transistor 67.

The outputs from comparators 61, 62 of chopper charging circuit 60 are input to waveform shaping circuit 70 and converted into rectangular wave pulse fr. That is, rotation sensing circuit 53 composed of chopper charging circuit 60 and waveform shaping circuit 70 detects the rotation of rotor 12 and outputs it as the rectangular wave pulse fr (Step 1) (hereinafter, step is abbreviated as "S"; see FIG. 11).

For example, monostable multivibrator 71 shown in FIG. 7 executes waveform shaping by detecting only one polarity (i.e., the output from comparator 62). More specifically, monostable multivibrator 71 is triggered in response to the rising-up edge of output from comparator 62 and outputs a pulse having a length set by values of a capacitor and resistor (RC). Since the RC has a time constant set about 1.5 times the cycle of clock signal CLK, the rising-up edge of the next output of comparator 62 is input within the pulse time set by the RC to thereby trigger monostable multivibrator 71. Therefore, monostable multivibrator 71 continuously outputs a high-level signal until the ascending edge of the output from comparator 62 is not generated within the time 1.5T set by the RC so that the rectangular wave pulse fr corresponding to the output signal of generator 20 is output. However, the descent time of the pulse fr is delayed by the time of the high-level of the set-time-polarity-detecting pulse of the RC. Thus, when the RC is set to 1.5T as shown in FIG. 9, a delay of 1T (=1.5T−0.5T) is caused.

On the other hand, waveform shaping circuit 70 shown in FIG. 8 also executes waveform shaping by detecting only one polarity (i.e., the output of one of comparators 61, 62). More specifically, in this embodiment, waveform shaping circuit 70 is composed of counter 74 for counting the clock signal for only a time 2T and clearing it, and latch 75 for applying a latch in response to the output from counter 74. Counter 74 and latch 75 are set so that they are cleared in response to the output from either comparator 61, 62. For example, where output is generated from comparator 62, latch 75 and counter 74 are cleared and output fr outputs a low-level signal as shown in FIG. 9. When output is not generated from comparator 62, output fr is latched to a high-level by counter 74.

When output is generated from comparator 62 again, a latch signal is cleared and output fr is dropped to a low-level signal so that the rectangular wave pulse can be obtained. When the output is generated from comparator 62 within the time (2T) set to the counter, no latch operation is executed. In this case, as shown in FIG. 9, the rise of rectangular wave pulse fr to a high-level is also delayed by the time (2T) set to counter 74.

Respective waveform shaping circuits 70 shown in FIGS. 7 and 8 convert the output from comparator 62 into a rectangular wave pulse by adding a delay to the output. This delay is executed to prevent the occurrence of incorrect pulse by the time set to the RC or the time set to the counter because the output from comparator 62 at the start of the system is not always obtained as a signal synchronized with the cycle of the clock signal and sometimes exhibits itself as an output with lack of pulse. Such an occurrence causes incorrect pulses when the output is converted into a rectangular wave pulse. The times set to the RC and the counter may be set to about 1.5–5T in accordance with the degree of the lack of pulse. The delay does not have any affect on control.

The rectangular wave pulse fr shaped as described above is compared with the time standard signal fs of dividing circuit 52 by phase comparison circuit 54 (S2) and difference signal fd thereof is converted into level signal a through charge pump 80 and loop filter 81.

Figure 10:
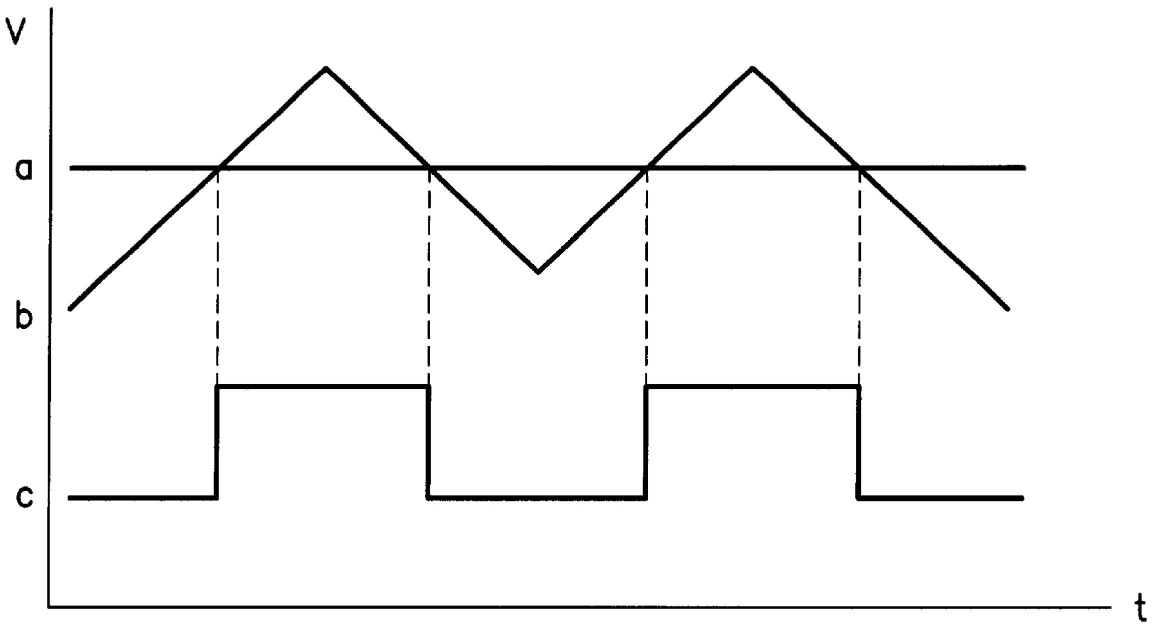
FIG. 10 is a timing chart showing processing executed by a comparator of a brake control circuit of the timepiece constructed in accordance with the first embodiment of the invention.
Figure 11:
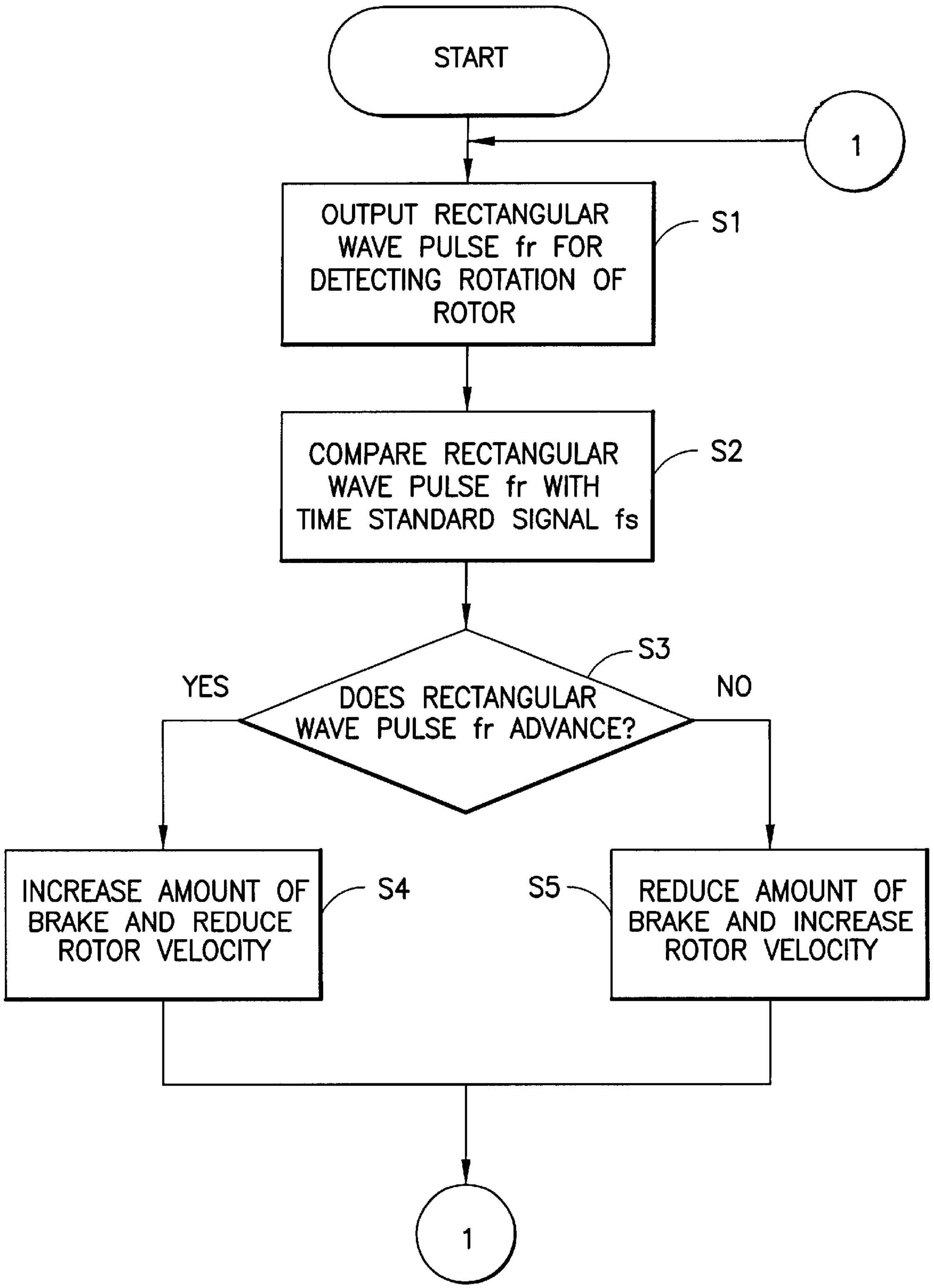
FIG. 11 is a flowchart showing a control method of the timepiece constructed in accordance with the first embodiment of the invention.

Signal output circuit 90 outputs a rectangular wave pulse signal c in response to level signal a and triangular signal b from triangular wave generating circuit 92 as shown in FIG. 10. Level signal a is set such that when rectangular wave pulse fr based on the rotation of rotor 12 advances with respect to time standard signal fs, pulse fr is made lower than the standard level, whereas if pulse fr delays with respect to time standard signal fs and pulse fr is made higher than the standard level.

As a result, when rectangular wave pulse fr advances with respect to time standard signal fs (S3), rectangular wave pulse signal c is in a high-level state for a longer time to thereby increase a short-circuit brake period in the respective chopper cycles in chopper charging circuit 60 so that the amount of braking is increased and the velocity of rotor 12 of generator 20 is reduced (S4). On the contrary, when rectangular wave pulse fr is delayed with respect to time standard signal fs, rectangular wave pulse signal c is in a low-level state for a longer time to thereby decrease the short-circuit brake period in the respective chopper cycles in chopper charging circuit 60 so that the amount of brake is decreased and the velocity of rotor 12 of generator 20 is increased (S5). Rectangular wave pulse fr is controlled by the repetition of the above brake control until pulse fr corresponds to time standard signal fs.

Figure 12:
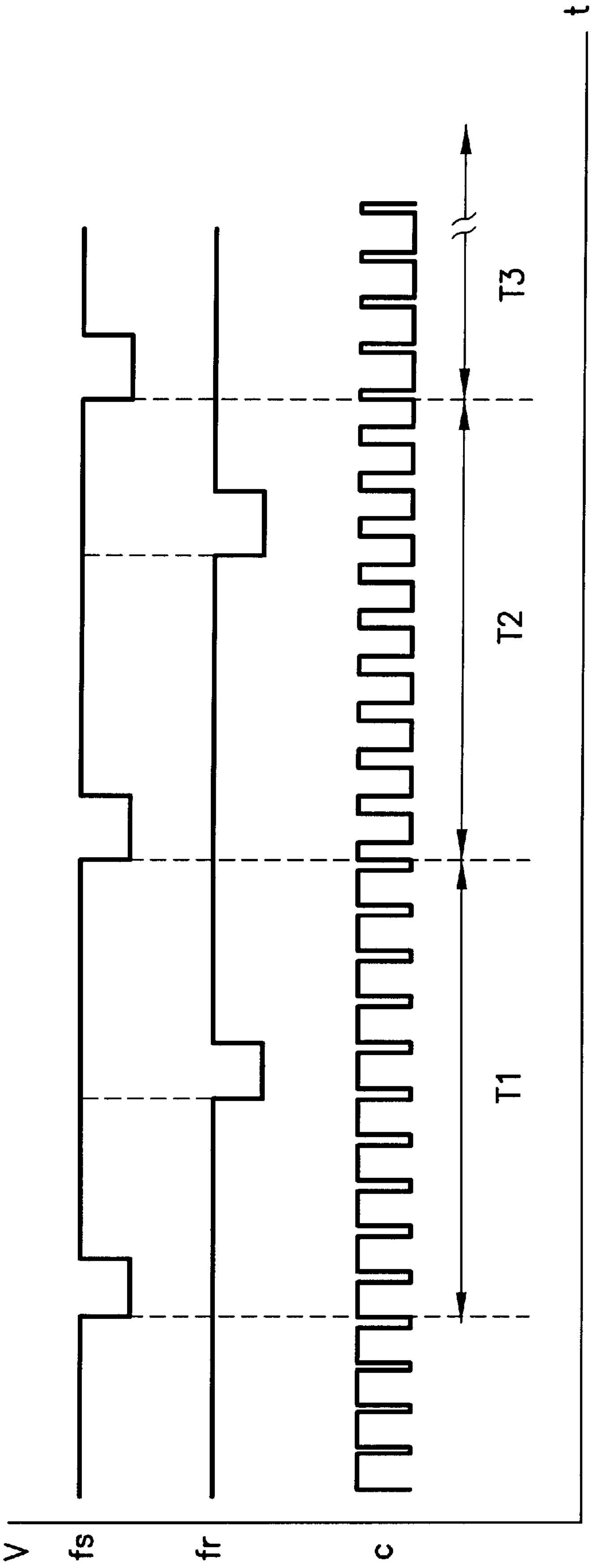
FIG. 12 is a timing chart of the timepiece constructed in accordance with the first embodiment of the invention.

The relationship between time standard signal fs and rectangular wave pulse fr from waveform shaping circuit 70 shown in FIGS. 4 and 5 and signal c output from signal output circuit 90 can be represented by a timing chart as shown in FIG. 12. That is, output signal c from signal output circuit 90 is arranged such that the short-circuit brake period is increased to thereby increase the amount of brake or decreased to thereby reduce the amount of brake in accordance with the phase difference between time standard signal fs and rectangular wave pulse fr. That is, in the comparison of cycles T1, T2 and T3 of time standard signal fs shown in FIG. 12, because the phase difference between the descending edge of rectangular wave pulse fr and that of the subsequent reference frequency signal fs in cycle T2 is smaller than the phase difference in cycle T1, output signal c from signal output circuit 90 in the next cycle (cycle T3) following the previous cycle T2 is set to decrease the short-circuit brake period to thereby reduce the amount of brake as compared with the case where the phase difference between the descending edge of rectangular wave pulse fr is compared with that of the subsequent reference frequency signal fs in cycle T1 (that is, as compared with cycle T2). Output signal c is set to the same waveform over one cycle of time standard signal fs; that is, signal c has a waveform having the same short-circuit brake period. In a preferred embodiment, the brake period is set to a high-level so that a brake is applied when output signal c is at the high-level.

This embodiment can provide the following benefit:

(1) Since VCO 25, composed of generator 20 and brake circuit 23, phase comparison circuit 54 and brake control circuit 56 are provided, the rotation of generator 20 can be controlled by the PLL control. As a result, since a brake level can be set in braking circuit 23 by comparing the waveforms of generated power at respective cycles, once generator 20 is in a lock range, it can be stably controlled with prompt responsiveness unless the waveforms of generated power greatly vary at a moment.

(2) Since braking circuit 23 is composed of chopper charging circuit 60 and brake control is realized using chopping, control torque can be increased while keeping a generated power to at least a prescribed level. As a result, the brake control can be effectively executed while maintaining the stability of the system.

(3) Since chopper charging circuit 60 is used, not only for brake control but also to charge capacitor 21*a* through rectifying circuit 21, chopper charging circuit 60 can detect the rotation of rotor 12 of generator 20. Therefore, the circuit can be simplified, the cost of such a system can be reduced by decreasing the number of parts, and manufacturing efficiency can be improved as compared with a case where these respective functions are performed by individual circuits.

(4) Since chopper charging circuit 60 controls the timing at which transistors 66, 67 are activated and deactivated and activates and deactivates one of transistors 66, 67 when the other thereof is continuously activated, a voltage drop in the charging path can be reduced and power generating efficiency can be improved. Such a system is very effective in improving the power generating efficiency of generator 20, which is small in size.

(5) Since waveform shaping circuit 70 is provided, even if the output waveform from VCO 25 is changed by changing the circuit arrangement of chopper charging circuit 60, for example, a different portion of the output waveform can be absorbed by waveform shaping circuit 70. As a result, even if the circuit arrangement of chopper charging circuit 60 is different, rotation controller 50 can be commonly used so that a cost reduction for parts is realized.

(6) When an ordinary circuit made by combining a low pass filter (LPF) and a comparator is used as waveform shaping circuit 70, a portion of a generated voltage, which has been chopper boosted, is charged to an LPF composed of a primary delay RC filter and the like. Although this lowers the charging efficiency to capacitor 21*a*, since respective waveform shaping circuits 70 of the embodiment carry out processing digitally, a consumption current can be suppressed to a low-level and the charging efficiency to capacitor 21*a* can be improved.

Next, a timepiece constructed in accordance with a second embodiment of the invention will be described, wherein the same numerals as used in the aforesaid embodiment are used to denote components that are similar or correspond to those of the aforesaid embodiment, permitting the description thereof to be omitted or simplified.

Figure 13:
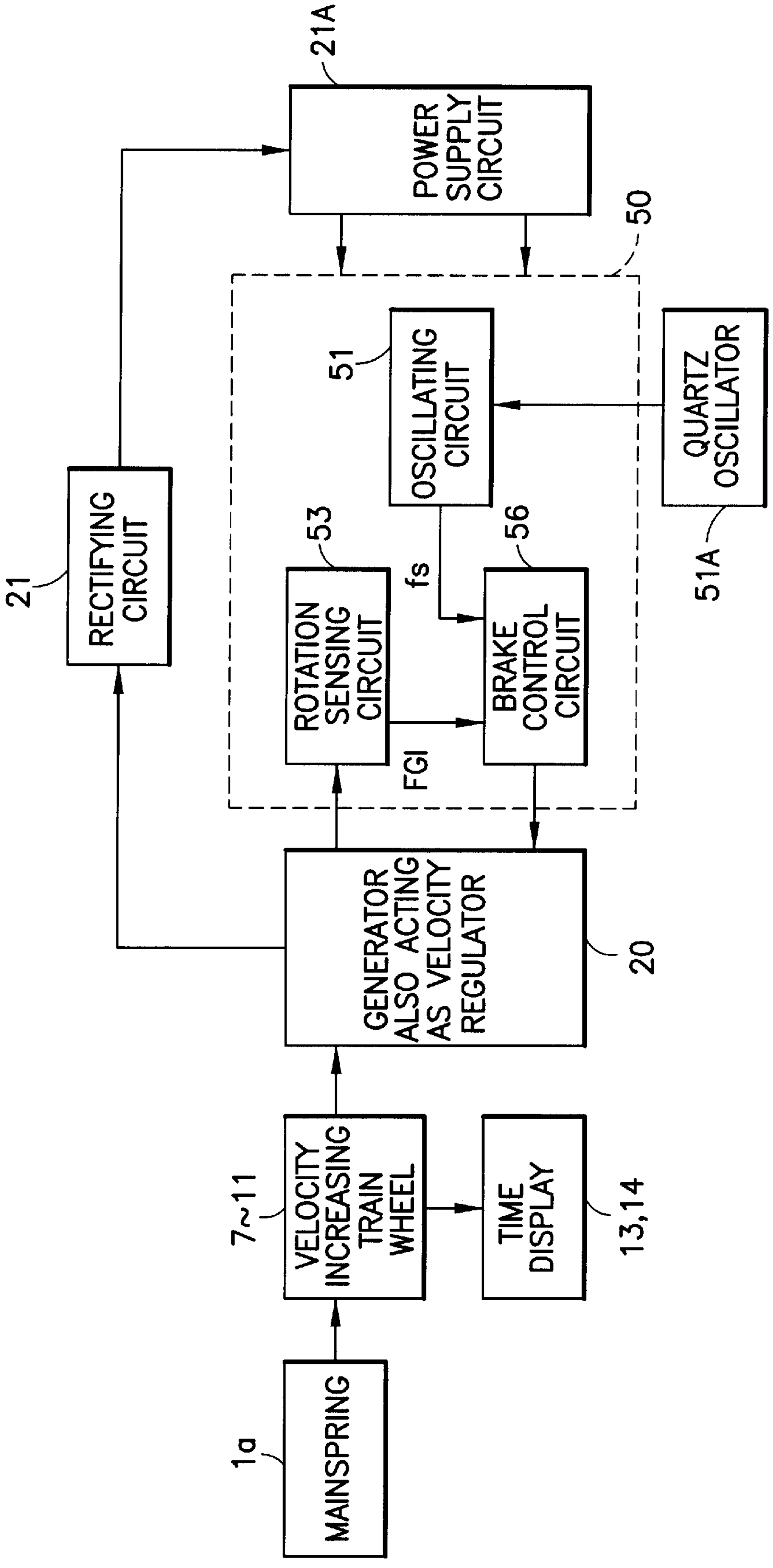
FIG. 13 is a block diagram showing an electronically controlled mechanical timepiece constructed in accordance with a second embodiment of the invention.

Referring to FIG. 13, an electronically controlled mechanical timepiece includes a mainspring 1*a* as a mechanical energy source, a velocity increasing train wheel (wheels 7–11) transmits the torque of mainspring 1*a* to generator 20 and hands (minute hand 13 and second hand 14) coupled with the velocity increasing train wheel for displaying a time.

Generator 20 is driven by mainspring 1*a* through the velocity increasing train wheel and supplies electric energy by induction. The a.c. output from generator 20 is boosted and rectified through rectifying circuit 21, which executes boosting and rectification of the output using, for example, full wave rectification, half wave rectification and transistor rectification, and charges the output to a power supply circuit 21*a*, which includes a capacitor.

Figure 14:
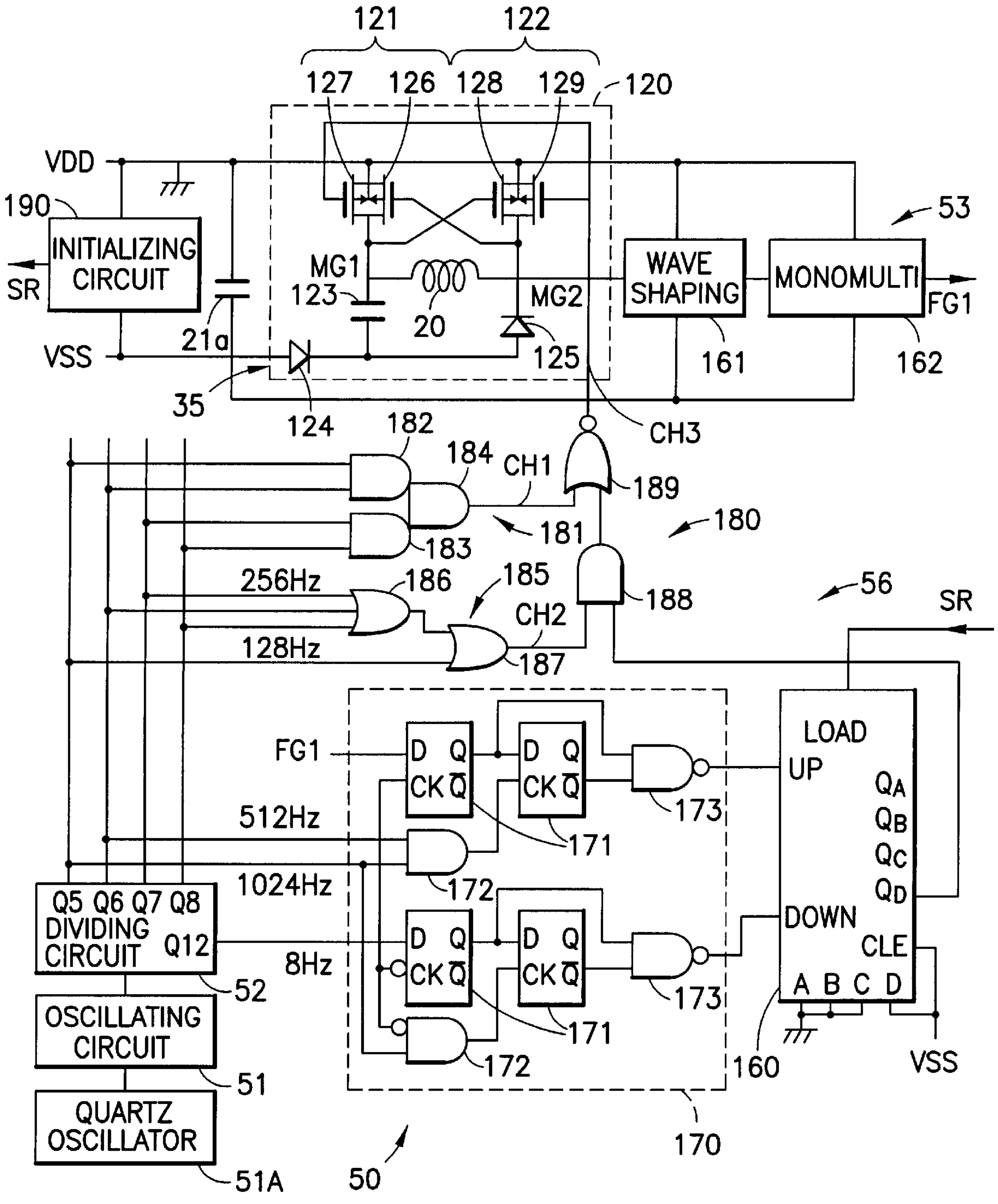
FIG. 14 is a circuit diagram of the timepiece constructed in accordance with the second embodiment of the invention.

As shown in FIG. 14, in this embodiment, generator 20 is provided with a brake circuit 120, which includes a rectifying circuit 35. More specifically, brake circuit 120 includes first and second switches 121, 122 for applying a short circuit brake to generator 20 by short-circuiting the output terminals of generator 20, denominated as a first terminal MG1 and a second terminal MG2.

First switch 121 includes a first-channel field effect transistor (FET) 126, having a gate connected to second terminal MG2, and a second field effect transistor 127, having a gate to which a chopper signal (chopper pulse) CH3 from a chopper signal generator 180 (to be described later) is input. First FET 126 is connected in series to second FET 127.

Second switch 122 is composed of a third P-channel FET 128, having a gate connected to first terminal MG1, and a fourth FET 129, having a gate to which chopper signal CH3 from chopper signal generator 180 is input. Third FET 128 is connected in series to fourth FET 129.

A voltage doubler rectifying circuit (or simplified synchronously boosting chopper rectifying circuit) 35 is composed of a boost capacitor 123, diodes 124, 125, and first switch 121 and second switch 122, which are connected to generator 20. Any type of one-direction devices for permitting a current to flow in one direction known to those skilled in the art may be used as diodes 124, 125. In particular, because the voltage generated by generator 20 is small in an electronically controlled mechanical timepiece, it is preferable to use a Schottky barrier diode having a small voltage drop Vf as diode 125. Further, diode 124 is preferably a silicon diode having a small inverse leak voltage.

Brake circuit 120 is controlled by rotation controller 50, which is driven by the power supplied from power supply circuit (capacitor) 21*a*. As shown in FIG. 13, rotation controller 50 includes oscillating circuit 51, rotation sensing circuit 53 and brake control circuit 56.

Oscillating circuit 51 outputs an oscillating signal (32768 Hz) using quartz oscillator 51A as a time standard source. The oscillating signal is divided to a prescribed frequency by a dividing circuit 52 composed of a twelve-stage flip-flop. The twelfth-stage output Q12 of dividing circuit 52 is output as a reference signal of 8 Hz.

Rotation sensing circuit 53 is composed of a waveform shaping circuit 161, which is connected to generator 20 and mono-multivibrator 162. Waveform shaping circuit 161 is composed of an amplifier and a comparator and converts a sine wave into a rectangular wave. Mono-multivibrator 162 functions as a band-pass filter for passing a pulse having at least a certain frequency and outputs a rotation sensing signal FG1 from which noise is filtered.

Brake control circuit 56 includes an up/down counter 160, which functions as a brake control circuit, synchronous circuit 170 and chopper signal generator 180. Rotation sensing signal FG1 from rotation sensing circuit 53 and reference signal fs from dividing circuit 52 are input to the up-count input terminal and the down-count input terminal of up/down counter 160 through synchronous circuit 170.

Synchronous circuit 170 is composed of four flip-flops 171, AND gates 172 and NAND gates 173, and synchronizes rotation sensing signal FG1 with reference signal fs (8 Hz) making use of output Q5 (1024 Hz) from the fifth stage of dividing circuit 52 and output Q6 (512 Hz) from the sixth stage of dividing circuit 52. In addition, synchronous circuit 170 adjusts the respective signal pulses to prevent them from being output in a superimposed state.

Up/down counter 160 is composed of a four-bit counter. A signal based on rotation sensing signal FG1 is input to the up-count input terminal of up/down counter 160 from synchronous circuit 170 and a signal based on reference signal fs is input to the down-count input terminal thereof from synchronous circuit 170. With this operation, reference signal fs and rotation sensing signal FG1 are counted and the difference therebetween is calculated at the same time.

Up/down counter 160 includes four data input terminals (preset terminals) A–D. A high-level signal is input to terminals A–C so that the initial value (preset value) of up/down counter 160 is set to a counter value 7.

An initializing circuit 190 is connected to the LOAD input terminal of up/down counter 160 for outputting a system reset signal SR in accordance with the voltage of power supply circuit 21*a*. Initializing circuit 190 outputs a high-level signal until the charged voltage of power supply circuit 21*a* becomes a prescribed voltage at which point it outputs a low-level signal.

Since up/down counter 160 does not receive an up-down input until the LOAD input terminal is a low-level signal, that is, until the system reset signal SR is output, the counter value of up/down counter 160 is maintained at “7”.

Up/down counter 160 has four-bit output terminals QA–QD. The fourth bit output terminal QD, which is connected to chopper signal generator 180, outputs a low-level signal when the counter value is 7 or less, and outputs a high-level signal when the counter value is 8 or more.

Chopper signal generator 180 includes a first chopper signal generator 181, which includes three AND gates 182, 183 and 184, and which outputs a first chopper signal CH1 and uses outputs Q5–Q8 of dividing circuit 52, a second chopper signal generator 185, which includes two OR gates 186, 187, and which outputs a second chopper signal CH2 and uses outputs Q5–Q8 of dividing circuit 52, an AND gate 188 to which the output QD of up/down counter 160 and signal CH2 of second chopper signal generator 185 are input, and a NOR gate 189 to which the output of AND gate 188 and signal CH1 of first chopper signal generator 181 are input.

The output CH3 from NOR gate 189 of chopper signal generator 180 is input to the gates of second and fourth FETs 127, 129. Therefore, when a low-level signal is output from output CH3, transistors 127, 129 are activated causing generator 20 to be short-circuited, thereby applying a brake. On the other hand, when a high-level signal is output from output CH3, transistors 127, 129 are deactivated and no brake is applied to generator 20. In this manner, generator 20 can be chopper-controlled by the chopper signal from output CH3.

Next, an operation of the embodiment will be described with reference to the timing charts of FIGS. 16–18 and the flowchart of FIG. 19, which depicts steps S11–S15.

When generator 20 starts to operate and a low-level system reset signal SR is input from initializing circuit 190 to the LOAD input terminal of up/down counter 160 (S11), an up-count signal (UP) based on rotation sensing signal FG1 and a down-count signal (DOWN) based on reference signal fs are counted by up/down counter 160 (S12). These signals are set by synchronous circuit 170 such that they are not simultaneously input to up/down counter 160.

As a result, when up-counit signal (UP) is input where the initial count value is set to “7”, the counter value increases to “8” and a high-level signal is output from the output QD to AND gate 188 of chopper signal generator 180. On the other hand, when a down-count signal (DOWN) is input and the counter value returns to “7”, the low-level signal is output from the output QD.

Figure 17:
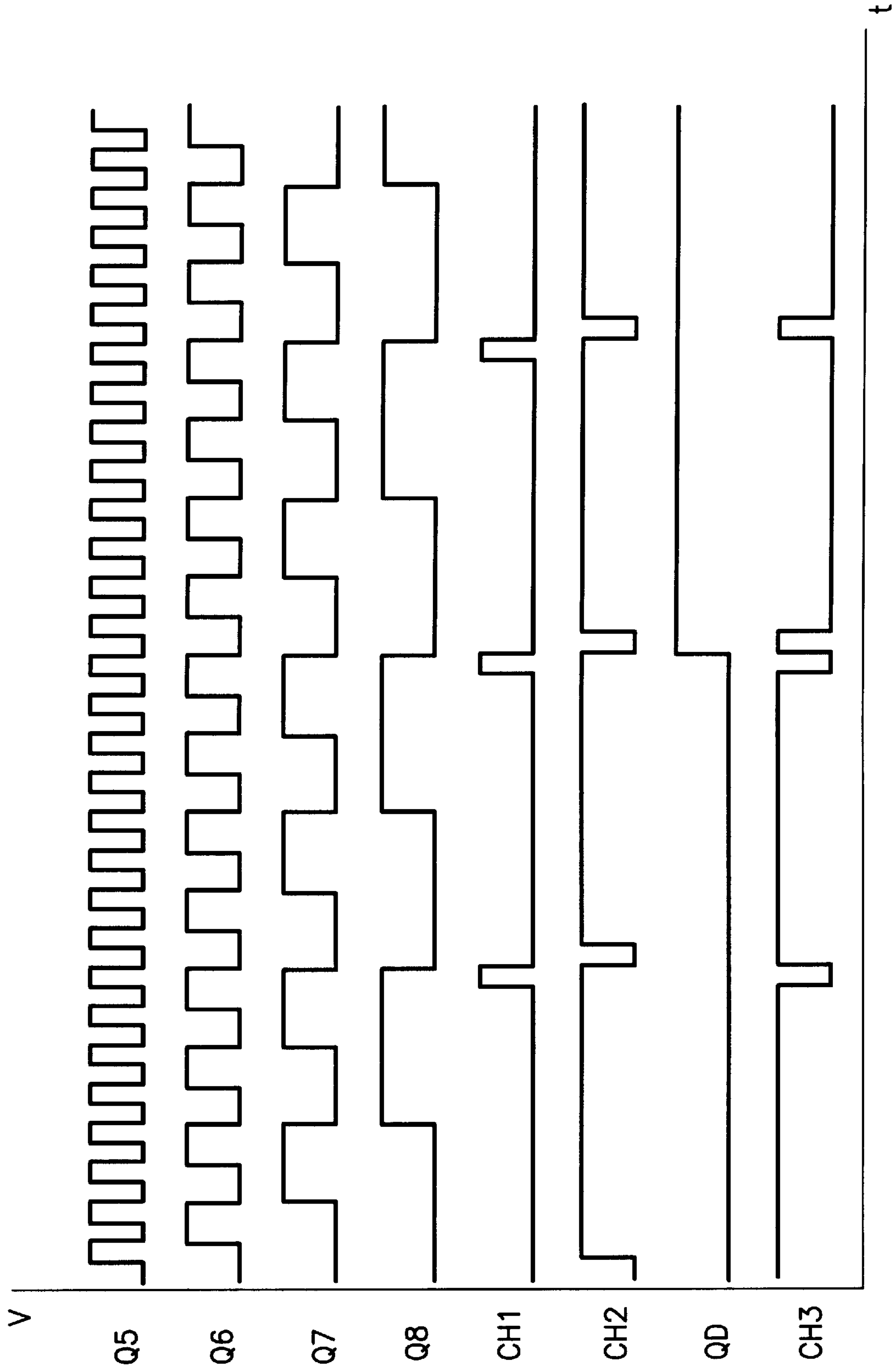
FIG. 17 is a timing chart of a chopper signal generating unit of the timepiece constructed in accordance with a second embodiment of the invention.

As shown in FIG. 17, in chopper signal generator 180, output CH1 is output from first chopper signal generator 181 and output CH2 is output from second chopper signal generator 185 making use of the outputs Q5–Q8 of dividing circuit 52.

When the low-level signal is output from the output terminal QD of up/down counter 160 (count value is “7” or less), since the output from AND gate 188 becomes a low-level signal, output CH3 from NOR gate 189 becomes a chopper signal obtained by inverting output CH1. That is, a chopper signal having a small duty ratio (the ratio at which transistors 127, 129 are activated) at which a high-level signal (brake-deactivation time) is long and a low-level signal (brake-activation time) is short. Therefore, the brake-activation time is reduced at a reference cycle so that almost no brake is applied to generator 20. Accordingly, under this circumstance, the brake-deactivation control gives priority to power generation (S13, S15).

On the other hand, when the high-level signal is output from output terminal QD of up/down counter 160 (count value is “8” or more), since the output from AND gate 188 becomes a high-level signal, output CH3 from NOR gate 189 becomes a chopper signal obtained by inverting output CH2, and has a large duty ratio at which a low-level signal (brake-activation time) is long and a high-level signal (brake-deactivation time) is short. Therefore, the brake-activation time is increased at the reference cycle and the brake-activation control is performed on generator 20. However, because the brake is deactivated at a prescribed cycle, a chopping control is carried out so that brake torque can be improved while suppressing the drop of generated power (S13, S14).

Voltage doubler rectifying circuit (or simplified synchronously boosting chopper rectifying circuit) 35 charges the electric charge generated by generator 20 to power supply circuit 21*a* as described below. That is, when the polarity of the first terminal MG1 is positive and the polarity of the second terminal MG2 is negative, first FET 126 is activated and third FET 128 is deactivated. As a result, the electric charge of the voltage induced by generator 20 is charged to capacitor 123 of, for example, 0.1 μF through the circuit "④→③→⑦→④" shown in FIG. 15, as well as to power supply circuit (capacitor) 21*a* of, for example, 10 μF through the circuit "④→⑤→⑥→①→②→③→⑦→④".

On the other hand, when the polarity of the first terminal MG1 to negative and the polarity of the second terminal MG2 is positive, first FET 126 is deactivated and third FET 128 is activated. As a result, the voltage obtained by adding the voltage induced by generator 20 and the voltage charged to capacitor 123 is charged to power supply circuit (capacitor) 21*a* through the circuit "capacitor 123→④→⑦→⑥→①→②→③→capacitor 123" shown in FIG. 15.

When both ends of generator 20 are short-circuited by a chopper pulse and generator 20, a high voltage is induced across both ends of the coil, and power supply circuit (capacitor) 21*a* is charged by the high-charging voltage, whereby charging efficiency is improved.

When mainspring 1*a* has a large amount of torque and generator 20 has a high rotational velocity, an up-counter value may be input to up/down counter 160 after the counter value is set to "8". In this case, the counter value is set to "9" and the brake-activation control of the chopper signal is performed by chopper signal CH3 to maintain the output QD at the high-level. Thus, the rotational velocity of generator 20 is lowered by the application of a brake thereto. When reference signal fs (the down-count signal) is input twice before rotation sensing signal FG1 is input, the counter value is lowered from "9" to "8" and then "7". When the counter value is "7", the control is switched to the brake-deactivation control for releasing the brake.

When the above control is carried out, the rotational velocity of generator 20 approaches a set rotational velocity and the operation shifts to a lock state in which the up-count signal (UP) and the down-count signal (DOWN) are alternately input and the counter value repeats "8" and "7". At that time, the brake is repeatedly activated and deactivated in accordance with the counter value. That is, the chopping control is carried out by the application of the chopper signal having a large duty ratio and the chopper signal having a small duty ratio to transistors 127, 129 in one reference cycle during one revolution of the rotor.

Further, when mainspring 1*a* is unwound and its torque is reduced, a brake application time is gradually decreased and the rotational velocity of generator 20 approaches a reference velocity even if no brake is applied.

When many down-count values are input in the absence of the application of the brake, the count value falls to a value of "6" or less, which indicates that the torque of mainspring 1*a* is diminished. In this event, the user is prompted to rewind mainspring 1*a* by the cessation of hand movement or the slow operation of the hands. Further, a buzzer may be sounded or a lamp may be lit to alert the user.

Therefore, when the high-level signal is output from output terminal QD of up/down counter 160, the brake-activation control is performed with a chopper signal having a large duty ratio, whereas when the low-level signal is output therefrom, the brake-deactivation control is performed with a chopper signal having a small duty ratio. That is, up/down counter 160 uses brake-activation control and brake-deactivation control as a brake controller.

In the embodiment, when the low-level signal is output from output terminal QD, chopper signal CH3 is arranged such that high-level period/low-level period is preferably set to 15:1, that is, the duty ratio is set to 1/16=0.0625. Whereas, when the high-level signal is output from output terminal QD, chopper signal CH3 is arranged such that high-level period/low-level period is preferably set to 1:15; that is, the duty ratio is set to 15/16=0.9375.

Figure 18:
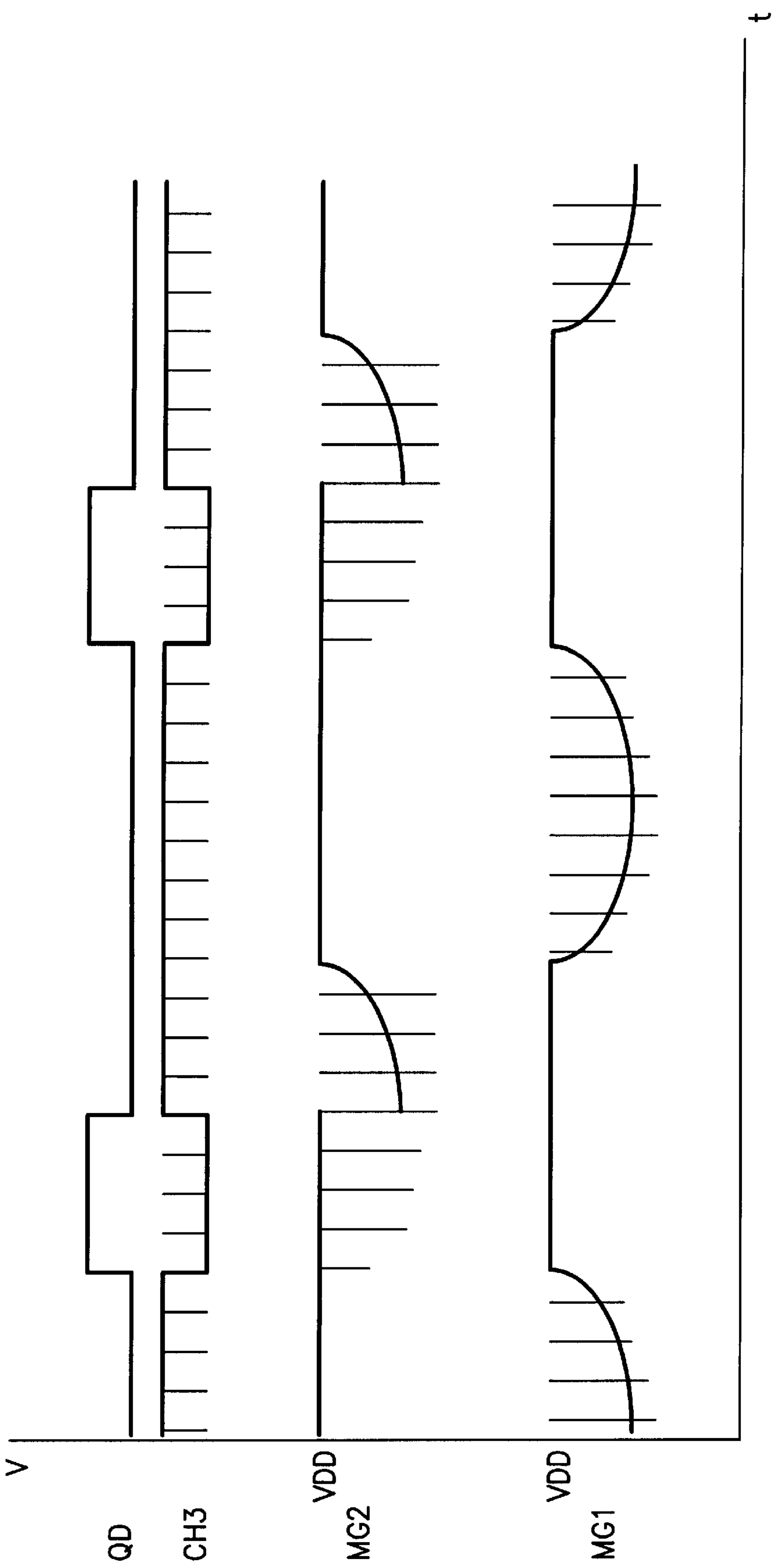
FIG. 18 is a diagram of an output waveform of a generator of the timepiece constructed in accordance with the second embodiment of the invention.
Figure 19:
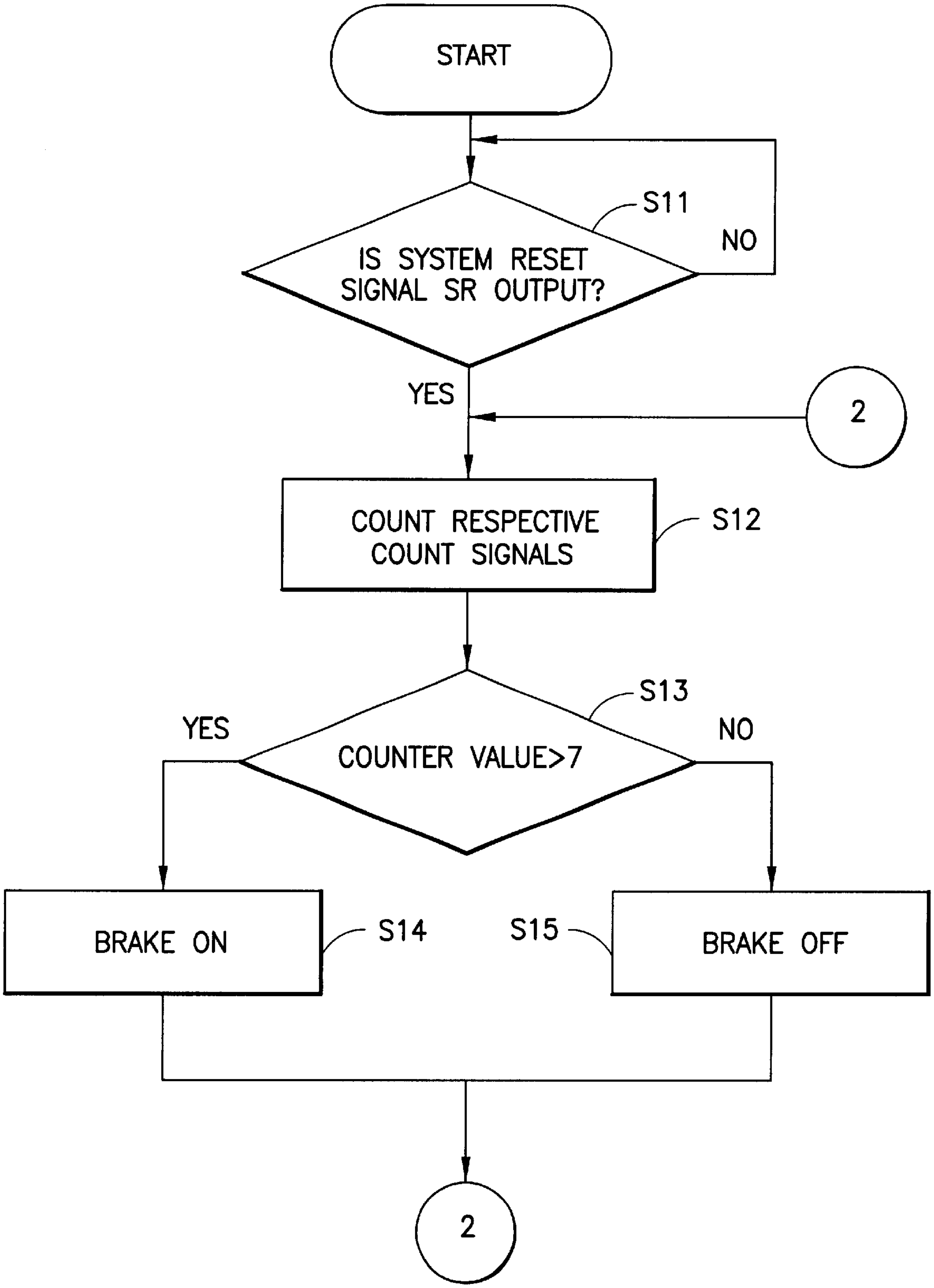
FIG. 19 is flowchart showing a control method of the timepiece constructed in accordance with the second embodiment of the invention.

As shown in FIG. 18, an a.c. waveform corresponding to the change of a flux is output from terminals MG1, MG2 of generator 20. At the time, chopper signals CH3, having a constant frequency and a different duty ratio are suitably applied to transistors 127, 129 in accordance with the signal from output terminal QD. When output terminal QD outputs the high-level signal (that is, when the brake-activation control is performed), the short-circuit brake time is increased in each chopper cycle to thereby increase the braking amount so that the rotational velocity of generator 20 is reduced. Then, although the amount of generated power is reduced corresponding to the amount of brake applied, the power can be chopper-boosted by outputting the energy accumulated in the short-circuit brake when transistors 127, 129 are deactivated by the chopper signal. Accordingly, the reduction of the generated power in the short-circuit brake can be compensated so that the brake torque can be increased while suppressing a drop of the generated power.

On the contrary, when the low-level signal is output from output terminal QD, that is, when the brake-deactivation control is carried out, the short-circuit brake time is decreased in each chopper cycle to thereby reduce the braking amount so that the rotational velocity of generator 20 is increased. Since, even during this condition, power can be chopper-boosted when transistors 127, 129 are switched from the deactivated state to the activated state, the generated power can be improved compared to a case where control is performed without applying a brake.

As discussed above, the a.c. output from generator 20 is boosted and rectified by voltage doubler rectifying circuit 35 and charged to power supply circuit (capacitor) 21*a* and rotation controller 50 is driven by power supply circuit 21*a*. Since both output QD of up/down counter 160 and chopper signal CH3 make use of outputs Q5–Q8 and Q12 of dividing circuit 52 (that is, the frequency of chopper signal CH3 is made an integral multiple of the frequency of the output QD), the change in the output level of output QD (that is, the time at which the brake-activation control and the brake-deactivation control are switched), and chopper signal CH3 are synchronized with each other.

Figure 16:
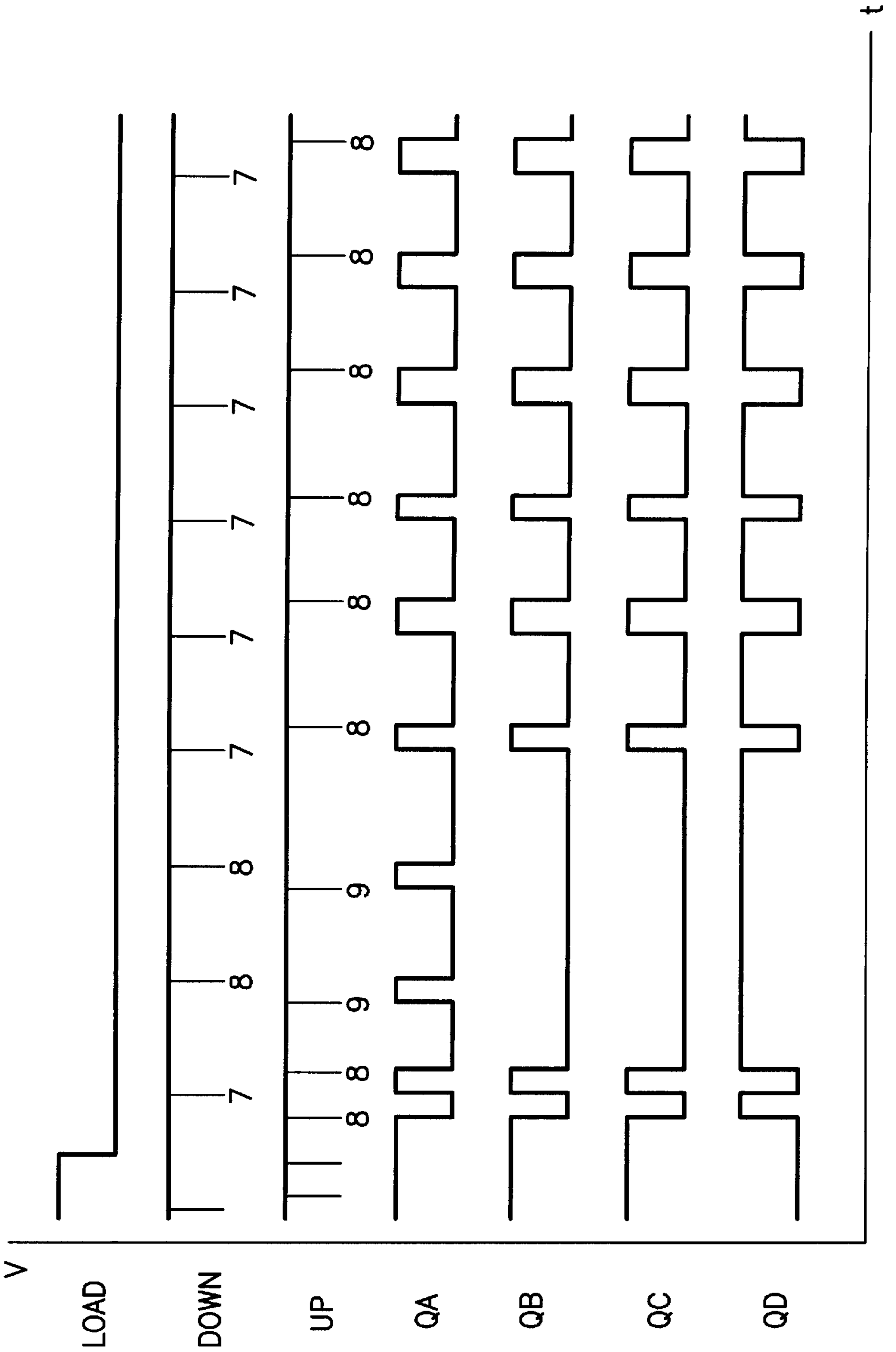
FIG. 16 is a timing chart for an up/down counter of the timepiece constructed in accordance with the second embodiment of the invention.
Figure 20:
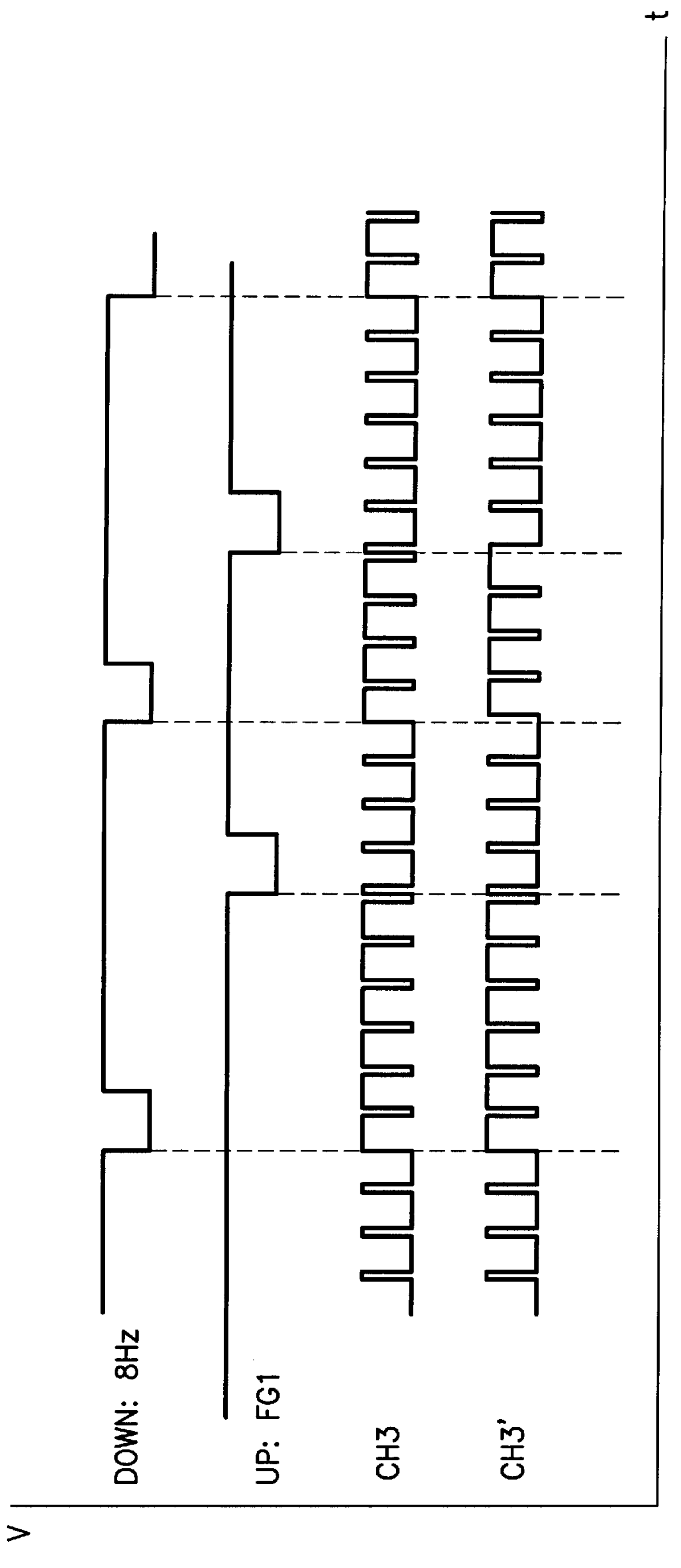
FIG. 20 is a timing chart of the timepiece constructed in accordance with the second embodiment of the invention.

FIG. 20 shows the relationship between the down-count signal DOWN of 8 Hz, the up-count signal UP of 8 Hz and chopper signal CH3 shown in FIGS. 16–18 in a timing chart. Chopper signal CH3 is synchronized with the down-count signal DOWN and the up-count signal UP. However, as shown by chopper signal CH3 of FIG. 20, chopper signal CH3 need not be synchronized with the down-count signal DOWN and the up-count signal UP and may have a waveform that starts from a high-level of the chopper signal CH3' in a certain cycle of the respective signals DOWN, UP or from a low-level thereof in a certain cycle thereof. In a preferred embodiment, however, the brake period is set to a low-level so that a brake is applied when chopper signal CH3 is at the low-level.

Further, the chopping signal need not be synchronized with a velocity set to control the rotation of rotor 12 (that is, with a velocity that permits the display of the correct time), so long as rotor 12 is rotated at the correct velocity. More specifically, the chopping cycle may or may not be synchronized with the set velocity and the relationship between chopping and the set velocity is not subject to any restriction.

This embodiment can provide the following benefits:

(7) The up-count signal (UP) based on rotation sensing signal FG1 and the down-count signal (DOWN) based on reference signal fs are input to up/down counter 160, and where the count number of rotation sensing signal FG1 (up-count signal) is larger than the count number of reference signal fs (down-count signal) (where counter value is at least "8" when the initial value of up/down counter 160 is set at "7"), a brake is continuously applied to generator 20 by brake circuit 120, whereas the count number of rotation sensing signal FG1 is less than the count number of reference signal fs (where counter value is "7" or less), the brake of generator 20 is deactivated (off). As a result, even if the rotational velocity of generator 20 greatly differs from the reference velocity when generator 20 starts, the rotational velocity can promptly approach the reference velocity, thereby improving the responsiveness of rotational control.

(8) Moreover, since the brake-activation and brake-deactivation controls are carried out using two types of chopper signals CH3 having a different duty ratio, brake torque can be increased without dropping a charged a generated voltage. In particular, when the brake is applied, since generator 20 is controlled using the chopper signal having a large duty ratio, the brake torque can be increased while suppressing a drop of the charged voltage, whereby the brake control can be effectively performed, while maintaining the stability of the system. With this arrangement, the life of the timepiece can also be increased.

(9) When the brake is not applied, since generator 20 is chopper controlled by the chopper signal having a small duty ratio, the charged voltage can be increased when brake is not applied.

(10) Since the brake-activation control and the brake-deactivation control is switched depending only upon whether the counter value is less than or equal to "7" or greater than or equal to "8", a brake period need not be set, thereby simplifying the construction of rotation controller 50, and reducing the cost of parts and manufacturing of the timepiece.

(11) Since the timing at which the up-count signal (UP) is input changes in accordance with the rotational velocity of generator 20, the period during which the counter value is set to "8" (the period during which the brake is applied) can also be automatically adjusted. As a result, stable control having prompt responsiveness is performed in the lock state where the up-count signal (UP) and the down-count signal (DOWN) are alternately input.

(12) Since up/down counter 160 is used as the brake controller, the count of the respective up-count signals (UP) and down-count signals (DOWN), and the calculation of the difference between the respective counted values can automatically be performed at the same time. As a result, the construction is simplified, while simplifying the determination of the difference between the respective counted values.

(13) Since four-bit up/down counter 160 is used, sixteen count values can be counted. Therefore, when up-count signals (UP) are continuously input, the input values can be cumulatively counted and the accumulated error of the input values can be corrected within a set range; that is, within a range in which the up-count signals and the down-count signals are continuously input and do not reach "15" or "1". As a result, even if the rotational velocity of generator 20 greatly deviates from the reference velocity, it can be returned to the reference velocity by reliably correcting the cumulated error, although it takes time until a lock state is achieved, whereby the correct operation of the hands can be maintained in the long run.

(14) Since the brake control is not carried out until power supply circuit 21*a* is charged to a prescribed voltage at the start of generator 20 by the provision of initializing circuit 190 so that no brake is applied to generator 20, priority can be given to the charging of power supply circuit 21*a*. Thus, rotation controller 50 can promptly and stably be driven by power supply circuit 21*a* and the stability of the rotation control executed thereafter also can be improved.

(15) Since the time at which the output level from output terminal QD changes (the time at which the activation-and deactivation-controls of the brake are switched) is synchronized with the time at which chopper signal CH3 is changed from an activated-state to a deactivated-state, a high voltage portion (shown as the beard-shaped voltage spike in FIG. 21) can be generated from generator 20 at prescribed intervals in correspondence to chopper signal CH3 and the output also can be used as a pace measuring pulse of the clock.

Figure 21:
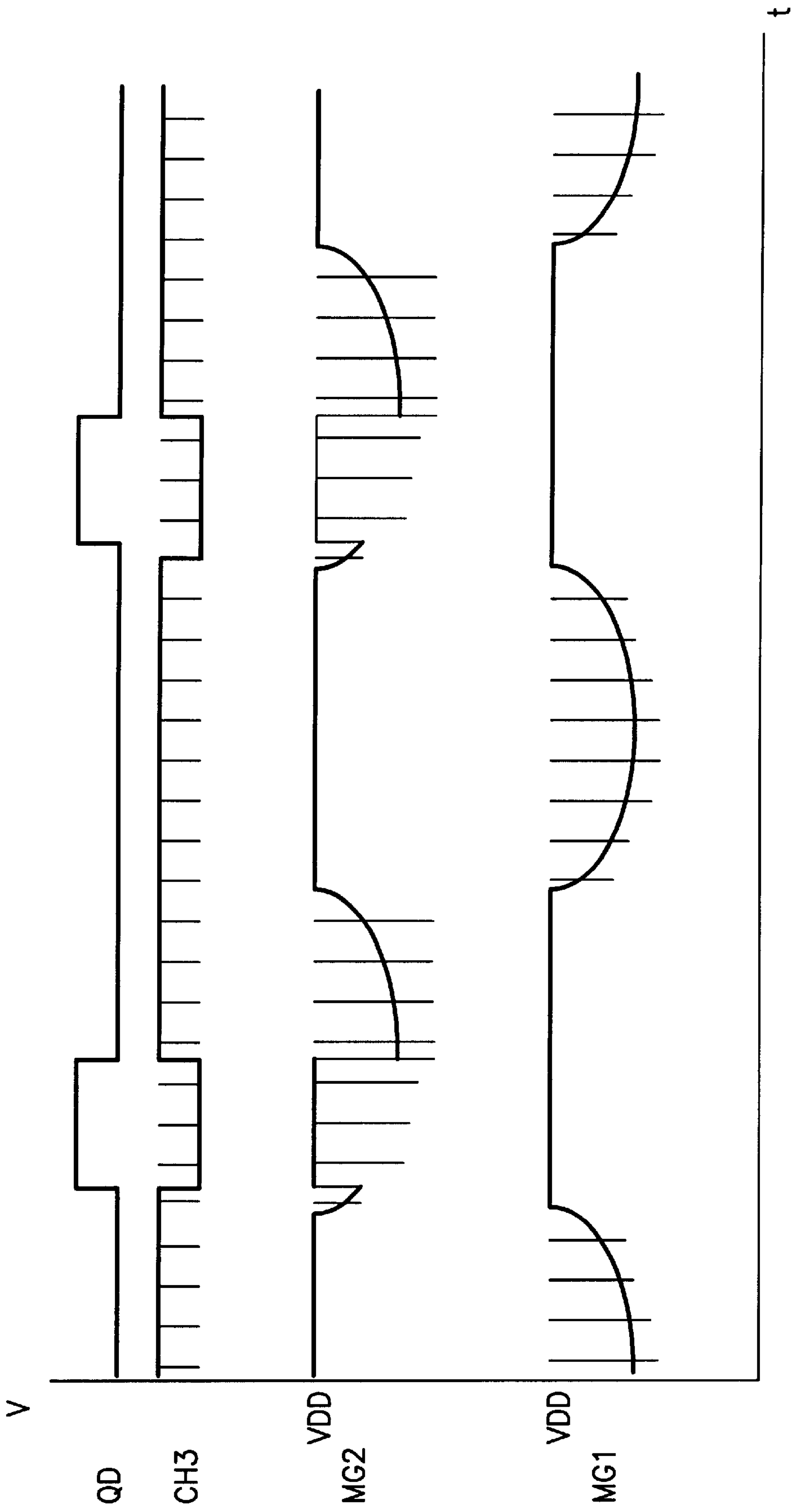
FIG. 21 is a diagram of the operation of the timepiece constructed in accordance with the second embodiment of the invention.

That is, when output QD is not synchronized with chopper signal CH3, a high voltage portion is also generated from generator 20 in response to the change of output QD, in addition to chopper signal CH3 having a prescribed cycle as shown in FIG. 21. As a result, since the beard portion is not always output at prescribed intervals in the output waveform of generator 20, it cannot be used as a pace measuring pulse. However, when output QD is synchronized with chopper signal CH3 as is the case preferably, the beard portion also can be used as the pace measuring pulse.

(16) Since the rectification control of generator 20 is carried out by first and third FETs 126, 128 whose gates are connected to terminals MG1, MG2, a comparator need not be used. The arrangement is therefore simpler and a further drop of the charging efficiency due to the power consumed by the comparator can be prevented. Further, field effect transistors 126, 128 are activated and deactivated making use of the terminal voltages of generator 20, and they can be synchronized with the polarities of the terminals of generator 20, thereby improving rectifying efficiency. In addition, since second and fourth field effect transistors 127, 129, which are subjected to the chopping control, are connected in series to transistors 126, 128, the chopping control can be independently performed and the arrangement can be simplified. Therefore, there can be provided a voltage doubler rectifying circuit 35 that has a simplified arrangement and that can execute chopper rectification in synchronicity with the polarity of generator 20 while boosting a voltage.

Figure 22:
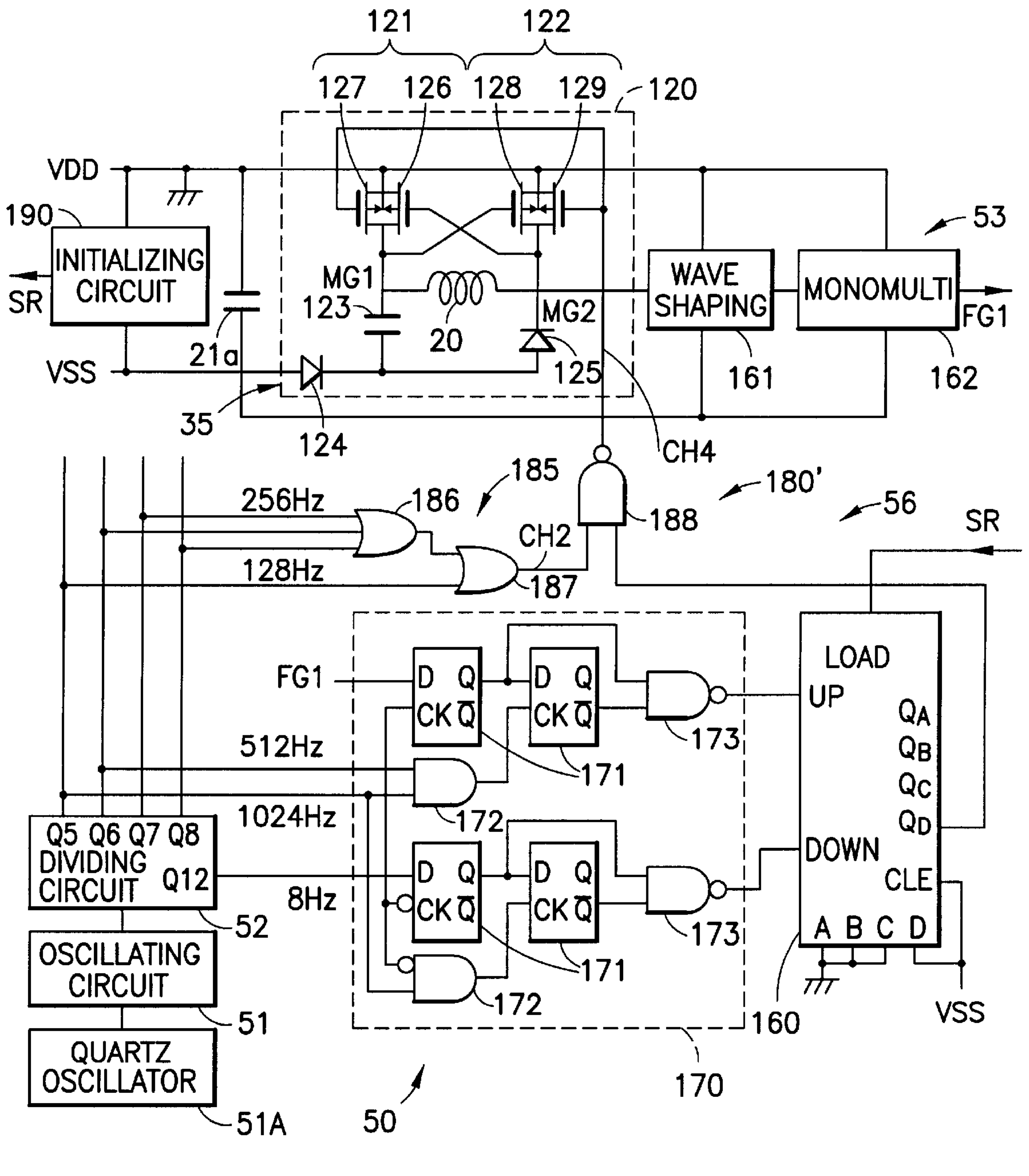
FIG. 22 is a circuit diagram of a timepiece constructed in accordance with a third embodiment of the invention.

Next, a timepiece constructed in accordance with a third embodiment of the present invention will be described with reference to FIG. 22, wherein the same numerals as used in the aforesaid respective embodiments are used to denote components that are similar or correspond to those of the aforesaid embodiments, permitting the description thereof to be omitted or simplified.

Figure 23:
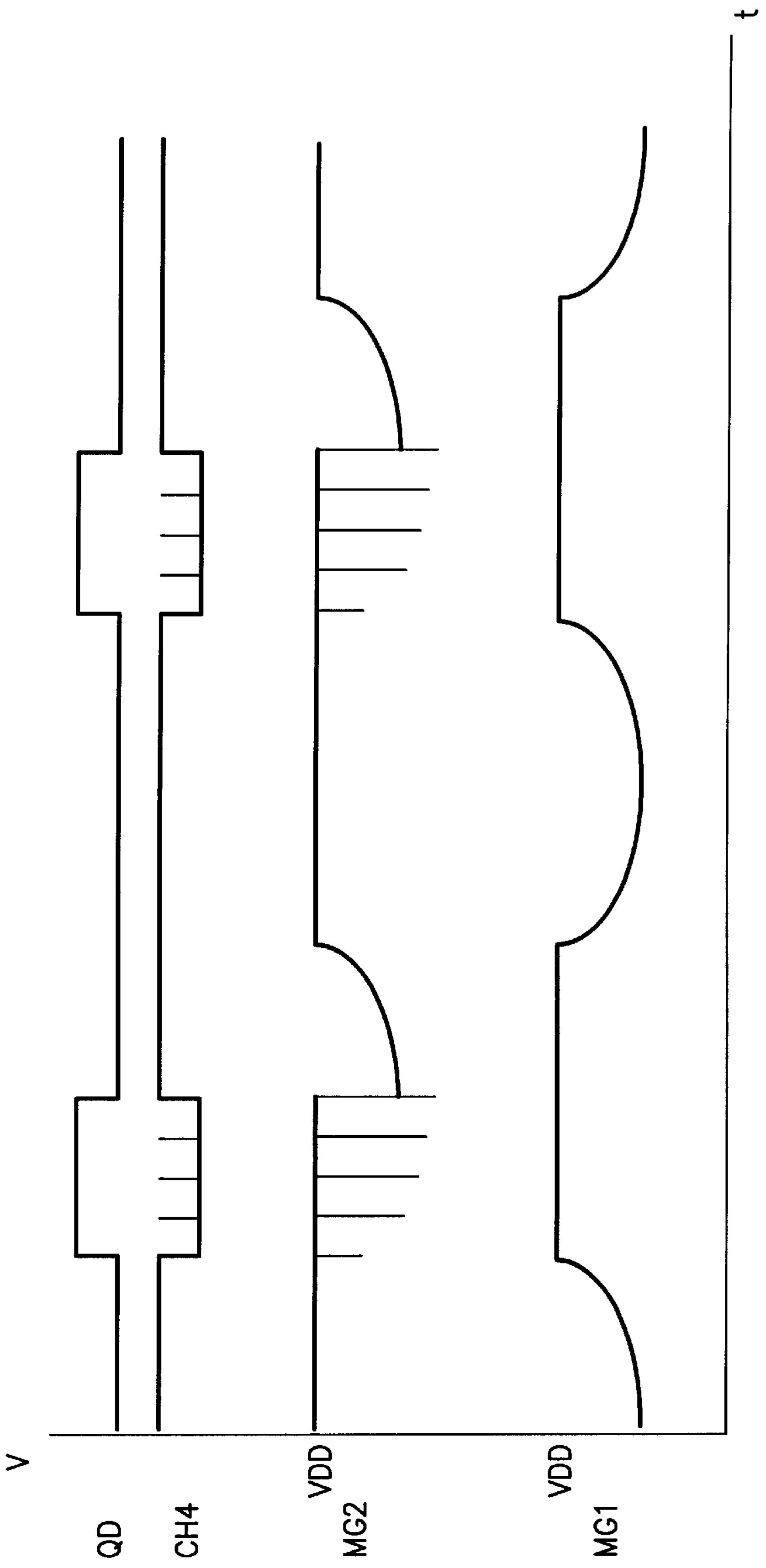
FIG. 23 is a diagram of an output waveform of a generator of the timepiece constructed in accordance with the third embodiment of the invention.

The embodiment is arranged such that chopper signal generator 180' is composed only of second chopper signal generator 185 by omitting first chopper signal generator 181 of the second embodiment. In this manner, chopper control is carried out by imposing a chopper signal only in a brake-activation control. That is, as shown in FIG. 23, since output CH4 from chopper signal generator 180' is maintained at a high-level in a state where output terminal QD is set to a low-level signal and a brake is not applied, transistors 127, 129 are deactivated and the a.c. output from generator 20 is output. On the other hand, when output terminal QD is set to a high-level signal and the brake is applied (in the brake-activation control), output CH4 from chopper signal generator 180 transmits a chopper signal similar to that of the first embodiment and chopper control is performed.

Figure 24:
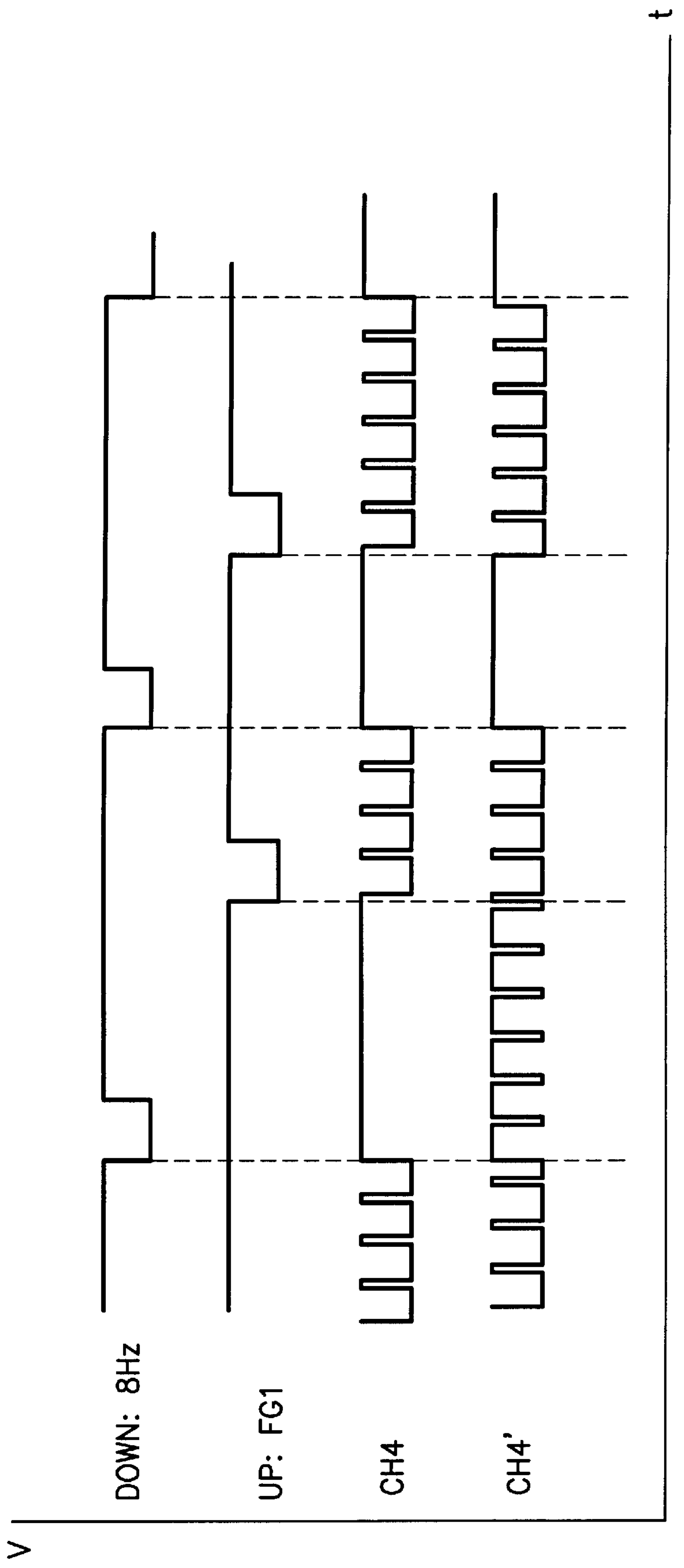
FIG. 24 is a timing chart of the timepiece constructed in accordance with the third embodiment of the invention.

FIG. 24 depicts the relationship between a down-count signal (DOWN) of 8 Hz, an up-count signal (UP) of 8 Hz and chopper signal CH4. Although chopper signal CH4 is also synchronized with one cycle of the down-count signal (DOWN) in this embodiment, chopper signal CH4 may have the waveform shown as chopper signal CH4' of FIG. 24. Chopper signal CH4' is not synchronized with the down-count signal (DOWN), and may start from a high-level of chopper signal CH4' in a certain cycle of the down-count signal (DOWN) and a low-level in a certain cycle thereof. In a preferred embodiment, however, the brake period is set to a low-level so that the brake is applied when chopper signal CH4 is at the low-level.

Further, the chopping signal need not be synchronized with the velocity set to rotor 12 as was the case in the second embodiment described above.

This third embodiment also can achieve benefits similar to (7), (8), (10)–(16) of the second embodiment, and provide the following additional advantage:

(17) Because first chopper signal generator 181 is omitted, the number of parts can be reduced and cost is reduced.

Figure 25:
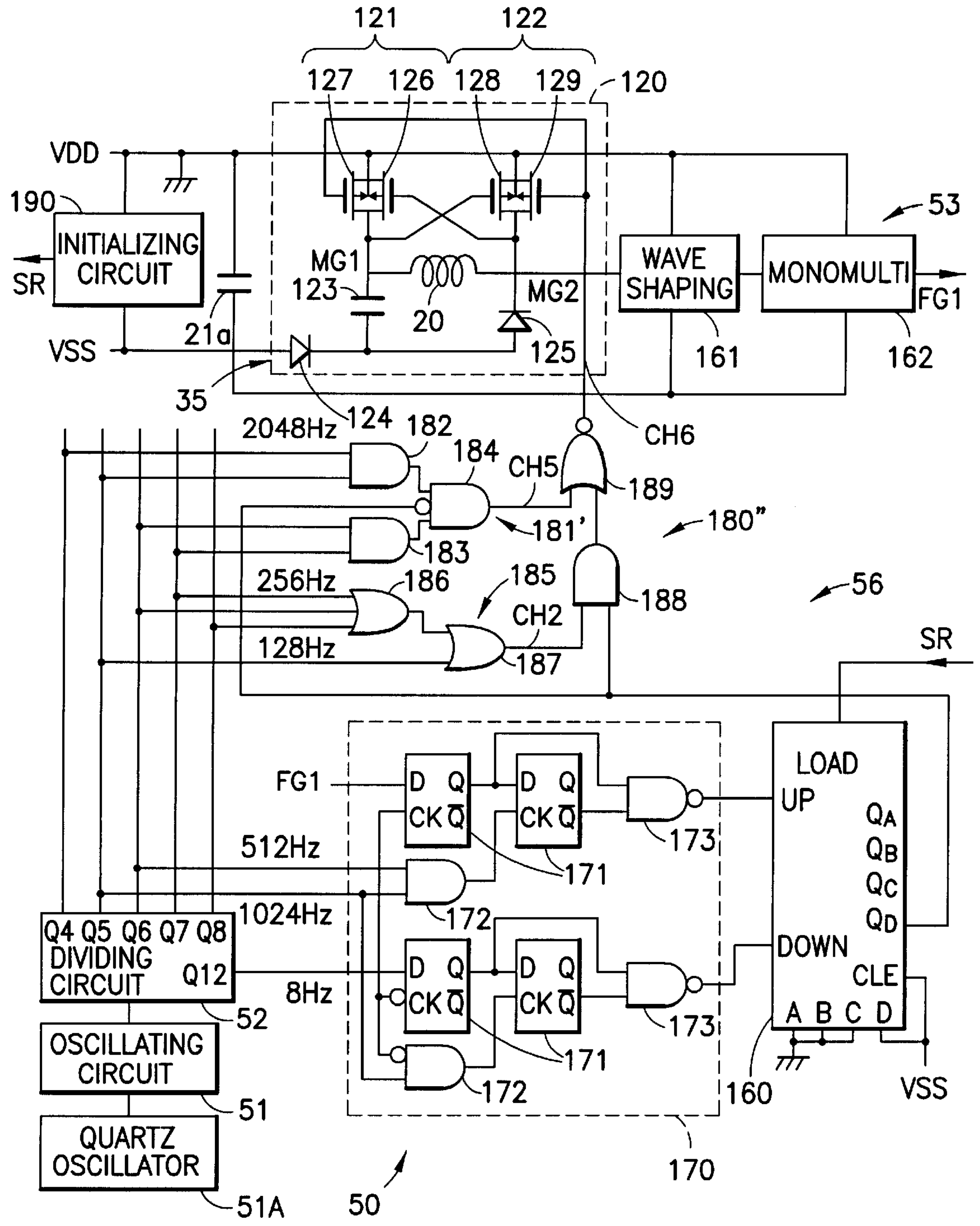
FIG. 25 is a circuit diagram of a timepiece constructed in accordance with a fourth embodiment of the invention.

Next, a timepiece constructed in accordance with a fourth embodiment of the present invention will be described with reference to FIG. 25. In the fourth embodiment, the same numerals as used in the aforesaid respective embodiments are used to denote components that are similar or correspond to those of the aforesaid embodiment, thus permitting the description thereof to be omitted or simplified.

The embodiment is arranged such that the frequency of output CH2 from first chopper signal generator 181 in chopper signal generator 180" is made different from that of output CH5 from second chopper signal generator 185 so that two types of chopper signals having a different frequency can be output as chopper signal output CH6 from chopper signal generator 180.

Figure 26:
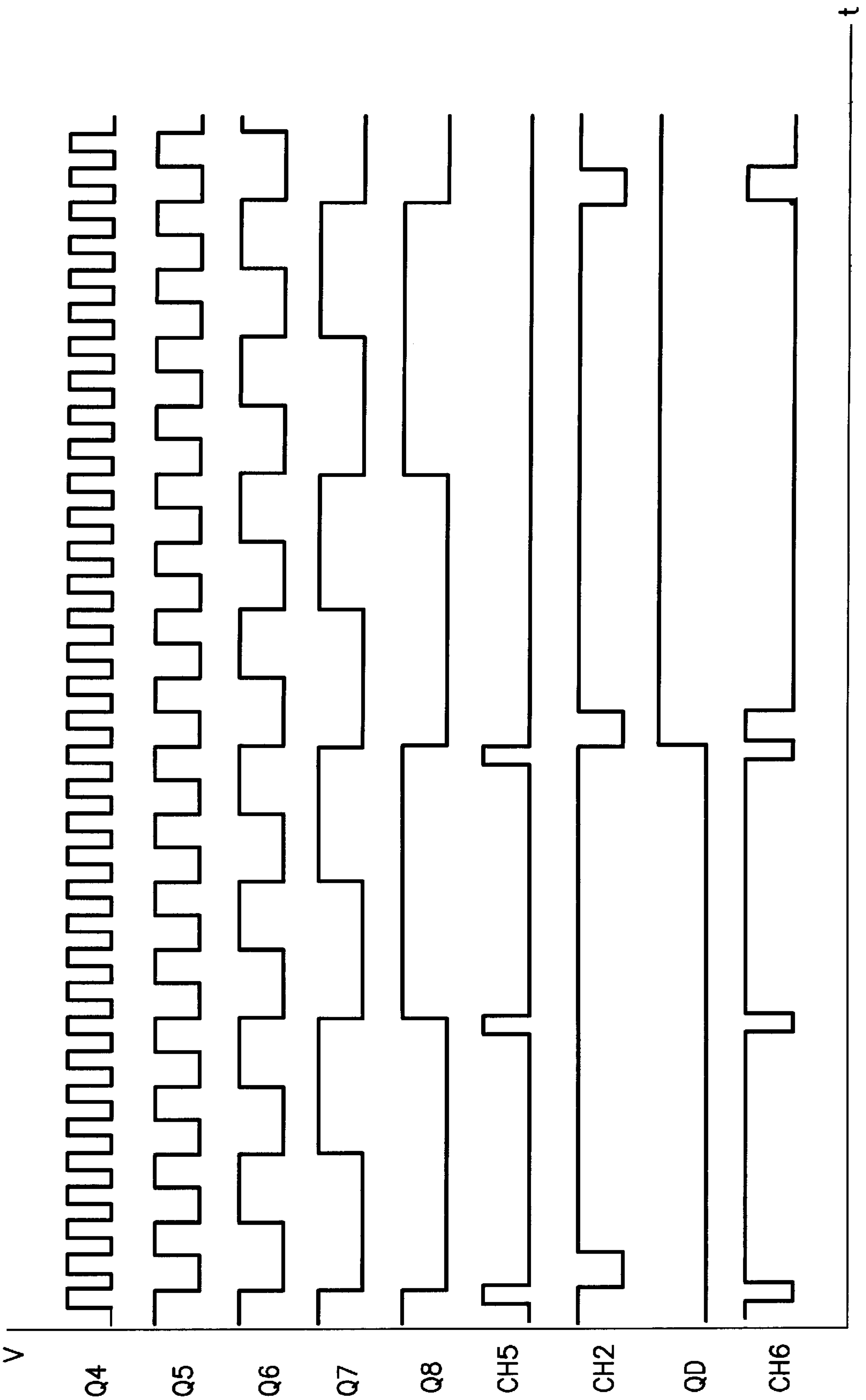
FIG. 26 is a timing chart of the timepiece constructed in accordance with the fourth embodiment of the invention.
Figure 27:
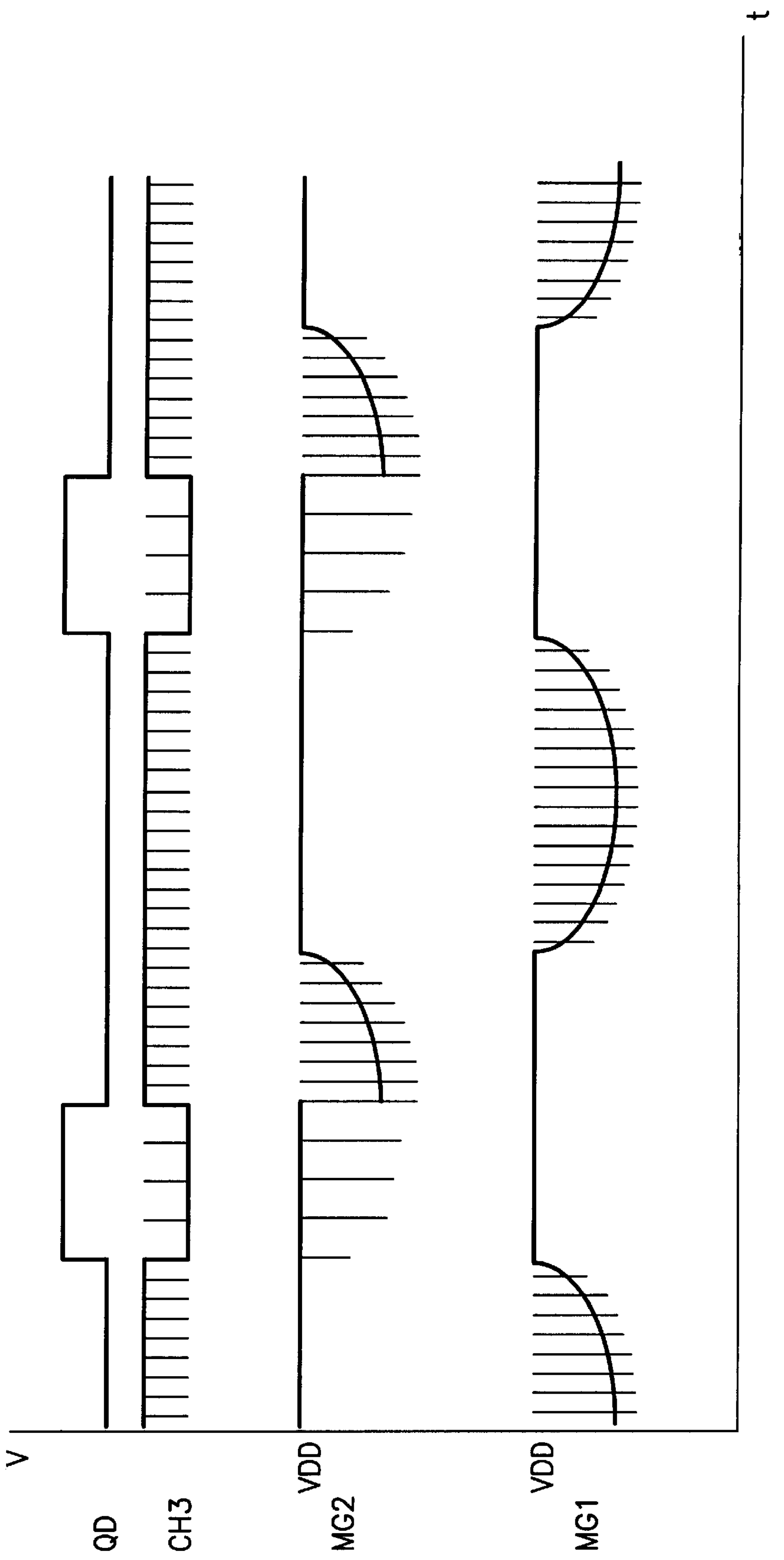
FIG. 27 is a diagram of an output waveform of a generator of the timepiece constructed in accordance with the fourth embodiment of the invention.

As shown in FIG. 26, in such an embodiment, the frequency of output CH5 from first chopper signal generator 181' is preferably set to twice that of output CH2 from second chopper signal generator 185 by inputting output Q4 from dividing circuit 52 only to first chopper signal generator 181. Therefore, two types of chopper signals having different duty ratios and frequencies are output as output signal CH6 from chopper signal generator 180 depending upon the level of output terminal QD. That is, the frequency and duty ratio of the chopper signal depend upon whether a brake activation or a brake deactivation control is performed, thereby providing the a.c. waveform output from generator 20 shown in FIG. 27.

Further, as in the above embodiments, the chopping signal need not be synchronized with the set velocity of rotor 12 in this embodiment.

Figure 45:
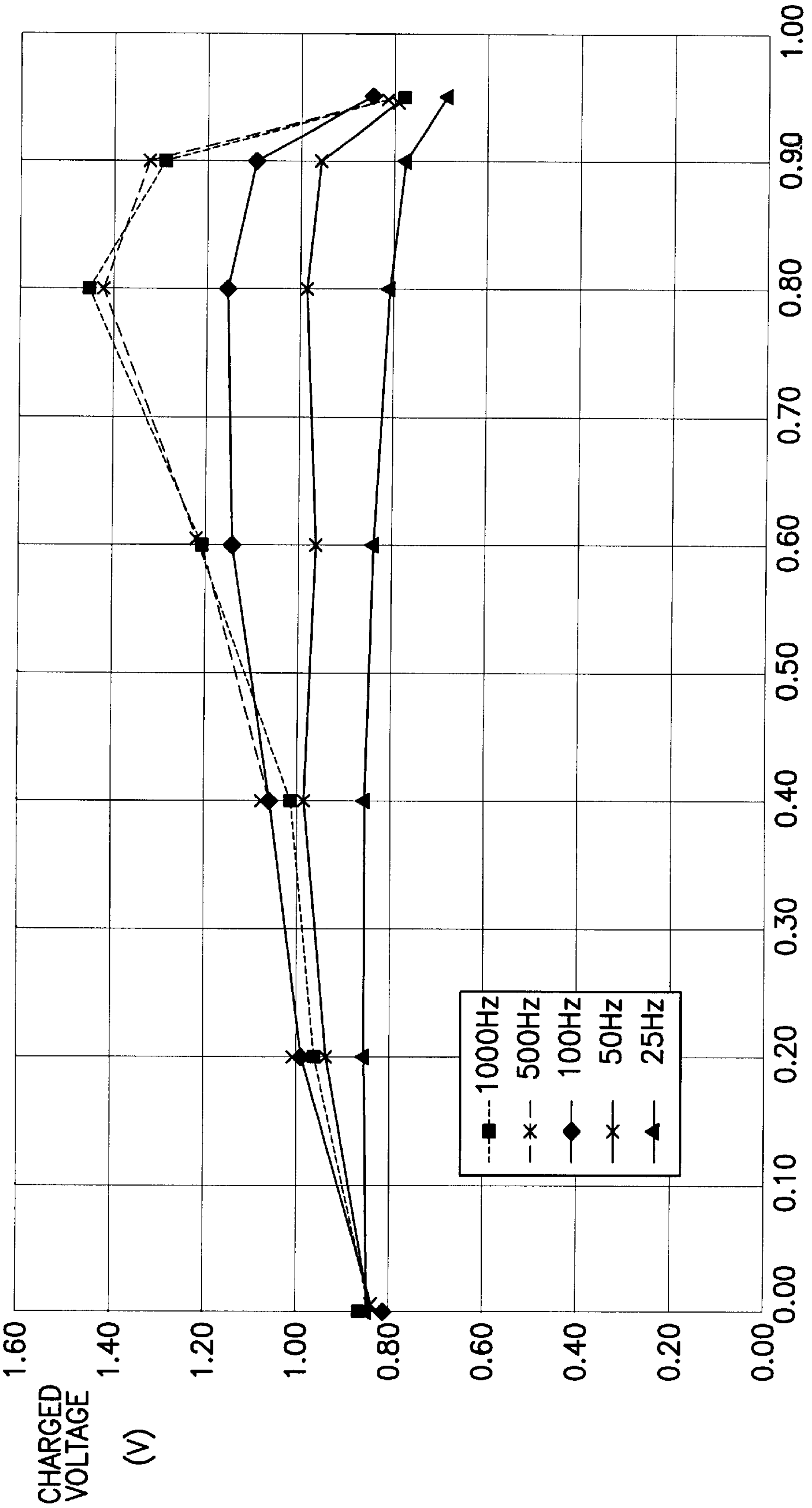
FIG. 45 is a graph showing the relationship between a chopping frequency and a charged voltage in the experimental example of the present invention.
Figure 46:
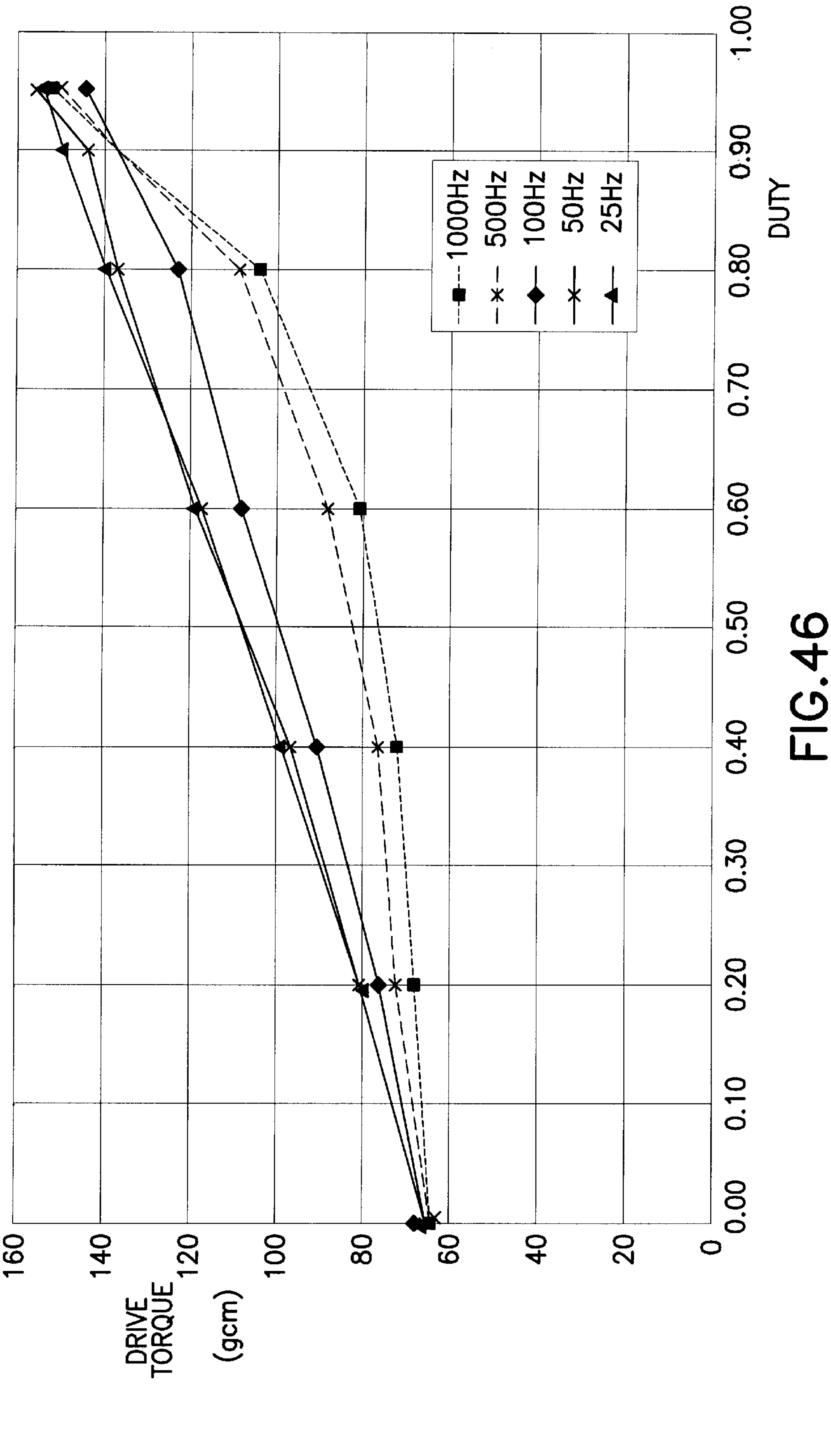
FIG. 46 is a graph showing the relationship between a chopping frequency and braking torque in the experimental example of the present invention.

This fourth embodiment can achieve benefit similar to (7)–(16) of the second embodiment, and additionally provide the following benefit:

(18) A chopper frequency can be produced twice as large as that of the second embodiment during brake-deactivation control. As is shown in FIGS. 45 and 46, when a duty ratio is the same, a higher frequency can reduce drive torque as well as improve a charged voltage. As a result, in this embodiment, the braking effect (brake torque) of the brake-deactivation control can be reduced as compared with the first embodiment, thereby improving the charged voltage.

Figure 28:
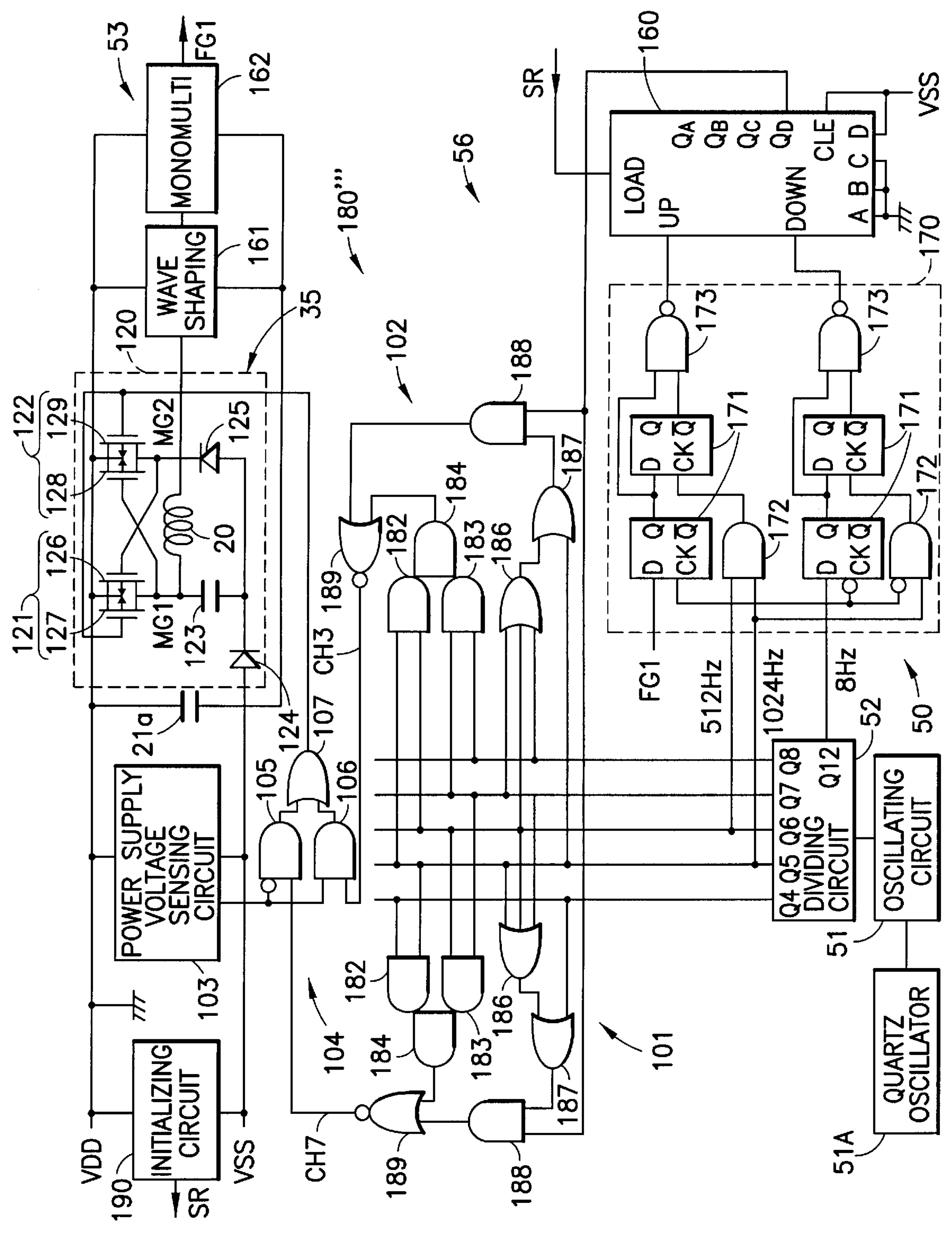
FIG. 28 is a circuit diagram of a timepiece constructed in accordance with a fifth embodiment of the invention.

Next, a timepiece constructed in accordance with a fifth embodiment of the present invention will be described with reference to FIG. 28. In the fifth embodiment, the same numerals as used in the aforesaid respective embodiments are used to denote components that are similar or correspond to those of the aforesaid embodiment permitting the description thereof to be omitted or simplified.

In this embodiment, a chopper signal generator 180'" is provided that includes a high frequency chopper signal generator 101 for outputting a high frequency chopper signal, a low frequency chopper signal generator 102 for outputting a low frequency chopper signal, a power supply voltage sensor 103 for detecting the voltage of power supply circuit 21*a*, and a switch 104 for switching an output CH7 from high frequency chopper signal generator 101 and an output CH3 from low frequency chopper signal generator 102 depending on the voltage of power supply circuit 21*a* and outputting the same.

The respective chopper signal generators 101, 102 are each arranged similarly to chopper signal generator 180' of the second embodiment and include three AND gates 182, 183, 184, two OR gates 186, 187, an AND gate 188, to which the output from OR gate 187 and output QD from up/down counter 160 are input, and NOR gate 189 to which the output from AND gate 188 and the output from AND gate 184 are input.

Since high frequency chopper signal generator 101 makes use of outputs Q4–Q7 of dividing circuit 52, it can output chopper signal CH7 having a frequency higher than that of the chopper signal of low frequency chopper signal generator 102, which makes use of outputs Q5–Q8 of dividing circuit 52.

When the voltage charged to power supply circuit (capacitor) 21*a* is lower than a set value, power supply voltage sensor 103 outputs a low-level signal, whereas when the voltage is higher than the set value, power supply voltage sensor 103 outputs a high-level signal.

Switch 104 includes two AND gates 105, 106 to which the signal from power supply voltage sensor 103 and the signals from respective chopper signal generators 101, 102 are input, respectively, and an OR gate 107 to which the outputs from AND gates 105, 106 are input.

When the low-level signal is input from power supply voltage sensor 103 (when the charged voltage is lower than the predetermined value), output CH3 from low frequency chopper signal generator 102 is cancelled by the low-level signal by inverting the signal input to the AND gate 105 from power supply voltage sensor 103 so that output CH7 from high frequency chopper signal generator 101 is output from OR gate 107 to transistors 127, 129. On the contrary, when a high-level signal is input from power supply voltage sensor 103 (when the charged voltage is higher than the predetermined value), output CH7 from high frequency chopper signal generator 101 is cancelled by the low-level signal so that output CH3 from low frequency chopper signal generator 102 is output from OR gate 107 to transistors 127, 129.

Figure 29:
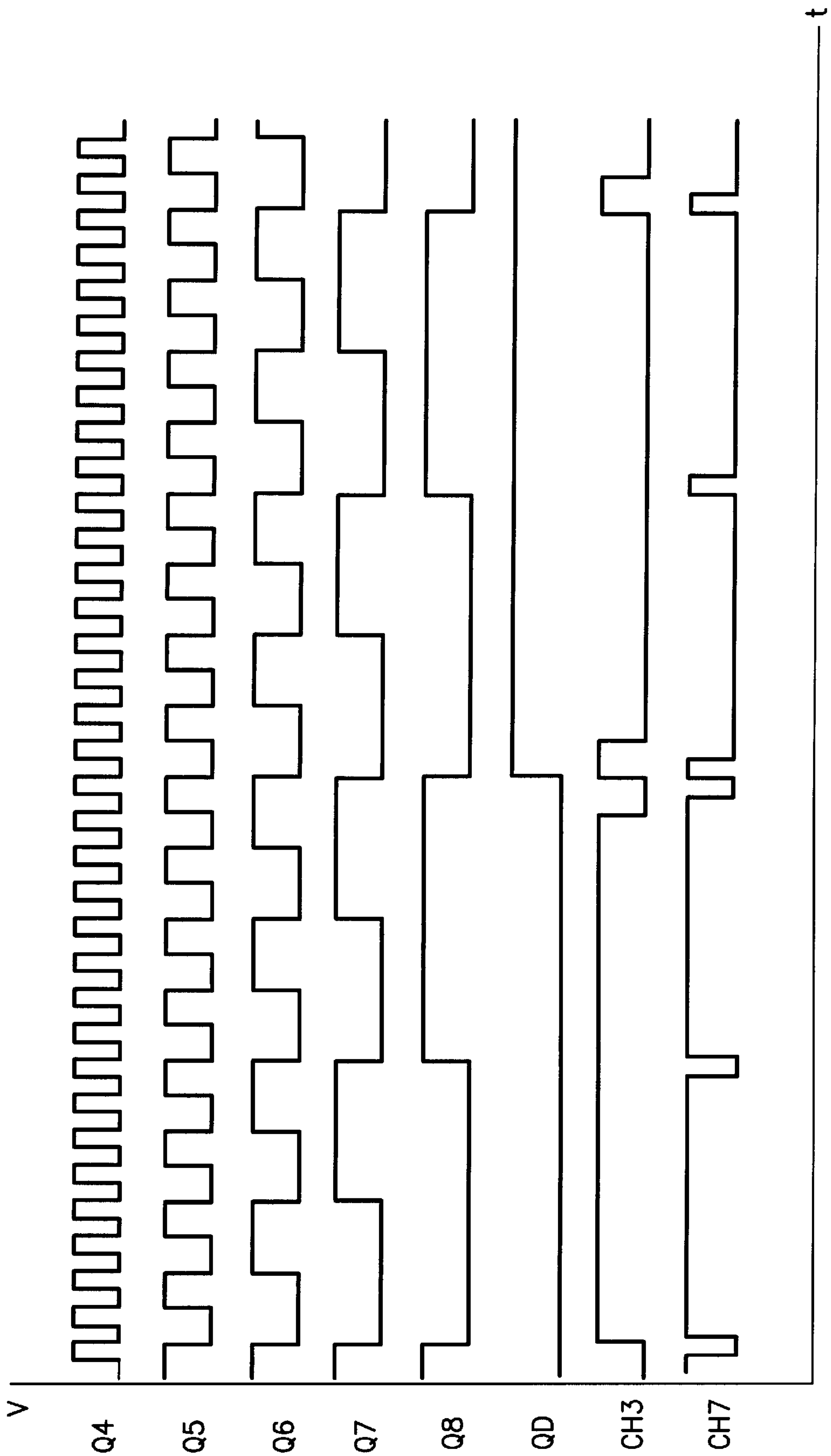
FIG. 29 is a timing chart of a circuit of the timepiece constructed in accordance with a fifth embodiment of the invention.

As a result, when a power supply voltage is low, a chopper brake control is carried out by the high frequency chopper signal CH7, whereas when the power supply voltage is high, the chopper brake control is carried out by the low frequency chopper signal CH3 as shown in FIG. 29. Since chopper signals CH3 and CH7 have the same duty ratio, respectively when a brake-activation control and a brake-deactivation control are carried out, high frequency chopper signal CH7 has a lower drive torque and a higher charged voltage (i.e., priority is given to charging), whereas low frequency chopper signal CH3 has higher drive torque and a lower charged voltage and thus performs chopper control giving priority to braking.

As with earlier embodiments, the chopping signal need not be synchronized with the velocity of rotor 12 in this embodiment.

This embodiment can achieve advantages similar to (7)–(16) of the second embodiment, and offers the following additional advantage:

(19) Because high frequency chopper signal generator 101, low frequency chopper signal generator 102, power supply voltage sensor 103 and switch 104 are provided as chopper signal generator 180''', and the frequency of the chopper signal changes depending on the power supply voltage value, chopper control can be performed that corresponds to the charged state of generator 20, thereby performing a more effective brake control.

The present invention is not limited to the above embodiments as modifications and improvements that fall within a range in which the object of the present invention can be achieved are included in the present invention. Again, for the following embodiments like numbers indicate like parts.

Figure 30:
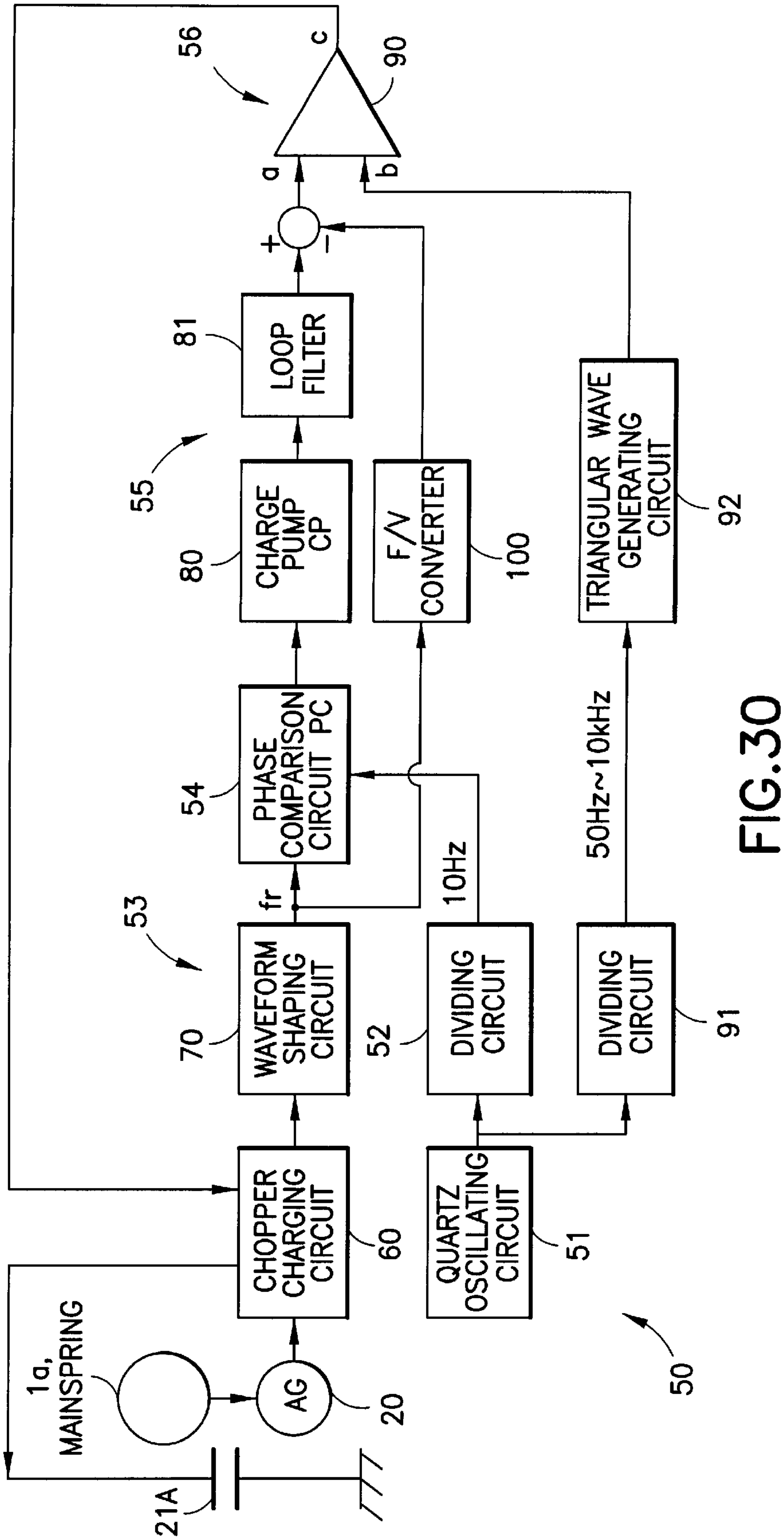
FIG. 30 is a block diagram of the timepiece constructed in accordance with the fifth embodiment of the invention.

As reference is now made to FIG. 30 in which another embodiment of the invention is provided. Rotation controller 50 may include a F/V (frequency/velocity) converter 100 that converts the output frequency of waveform shaping circuit 70 into velocity information. Since the rotational velocity information of generator 20 can be obtained by the provision of F/V converter 100, the rotational velocity of generator 20 can be controlled so that it approaches a predetermined velocity, that is, a time standard signal. As a result, even if a waveform of generated power greatly varies instantly and deviates from a lock range, the control of generator 20 can be maintained, and a more stable system can be constructed.

Figure 31:
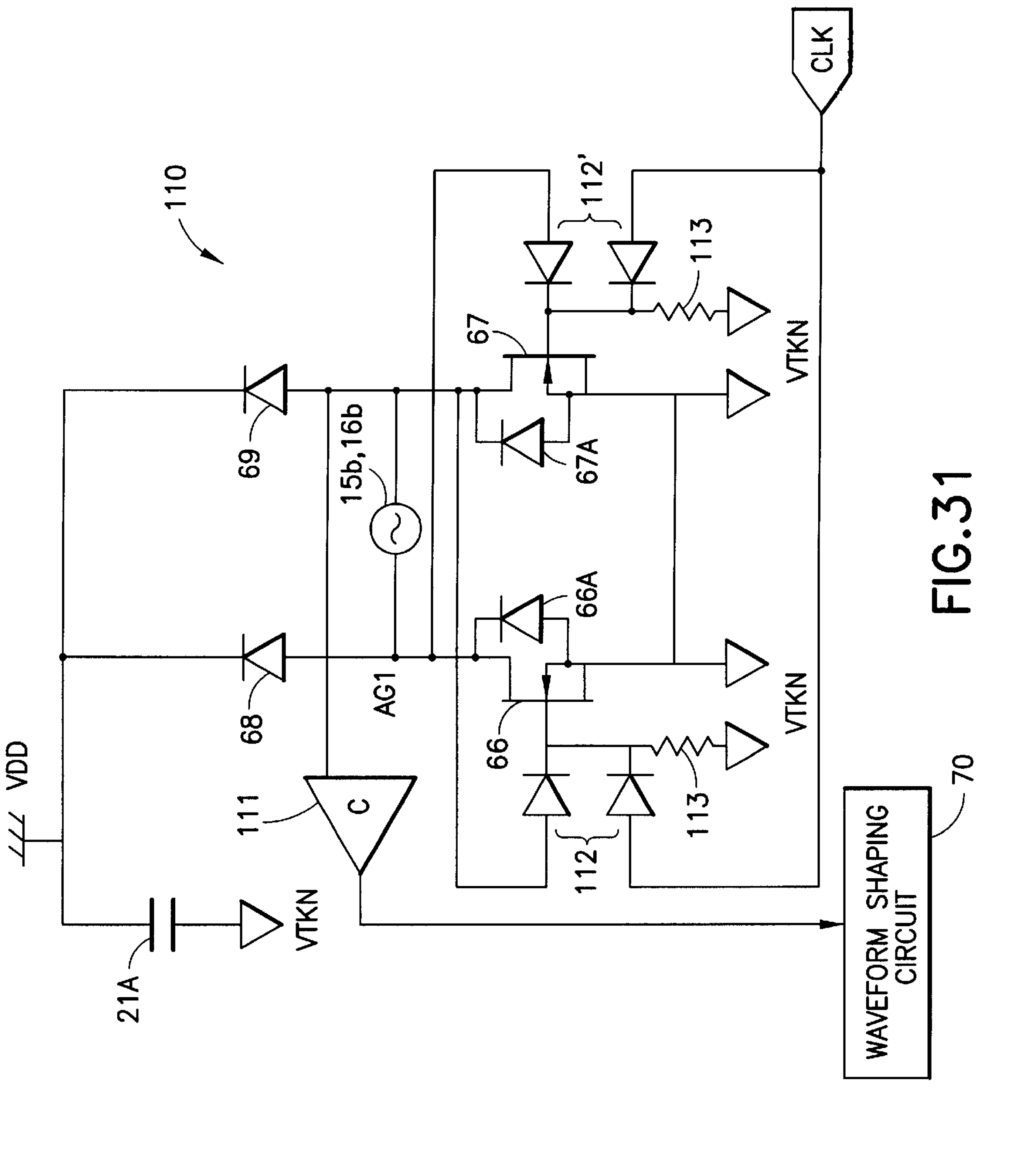
FIG. 31 is a circuit diagram showing a second embodiment of the chopper charging circuit constructed in accordance with the invention.

Chopper charging circuit 60 is not limited to that disclosed in the above embodiments. For example, as shown in FIG. 31, a chopper charging circuit 110 constructed in accordance with another embodiment of the invention composed of a comparator 111 is coupled across coils 15*b*, 16*b* for detecting the polarity of rotor 12. Furthermore, diodes 112 are coupled between a respective coil end and a respective one of chopping transistors 66, 67. Diodes 112' are coupled between resistors 113 and a clock CLK signal.

Since comparators 61, 62 are used to detect polarity in the above embodiments, power supply 63 is needed to supply a comparative reference voltage Vref to comparators 61, 62. The embodiment of FIG. 31, however, makes power supply unnecessary. In chopper charging circuit 110, depending upon the polarity of a power generating coil, transistors 66, 67 are driven by the coil terminal voltage through diodes 112 to make transistors 66, 67 conductive. For this purpose, the coil terminal voltage must be made higher than a voltage which is obtained by adding a threshold voltage Vth capable of driving transistors 66, 67 to the rising-up voltage Vf of diodes 112. When, for example, Vth=0.5 V and diode Vf=0.3, 0.8 V is needed to satisfy the above requirement, and generator 20 must have a generating capability of about 1.0–1.6 V. As a result, chopper charging circuit 60 of the above embodiments in which transistors 66, 67 are driven without the diodes is preferable in that a chopper charging operation can be more effectively carried out by a small voltage generated by generator 20.

Further, the chopper charging circuit may be arranged such that transistors 66, 67 of chopper charging circuit 60 shown in FIG. 6 are changed to a P-channel type, further transistors 66, 67 can be replaced with diodes 68, 69 to thereby short-circuit them to the positive side (VDD) of capacitor 21*a* (first power supply line) so that the voltage of capacitor 21*a* is boosted to a voltage less than the voltage of the VTKN when transistors 66, 67 are released. In this case, the outputs from comparators 61, 62 are ANDed with the output of clock signal CLK by an AND circuit and input to the gates of transistors 66, 67.

Likewise, in the second to fifth embodiments, the first and second switches 121, 122 may be replaced with a capacitor 123 and a diode 124 and disposed to the negative side (VSS) of capacitor 21*a* (second power supply side). That is, transistors 126–129 of respective switches 121, 122 are changed to N-channel type and inserted between terminals MG1, MG2 of generator 20 and the negative side (VSS) of capacitor 21*a* as the power supply on the low voltage side (second power supply line side). In this case, the circuit is arranged to permit switches 121, 122 connected to the negative terminal of generator 20 to be continuously activated and switches 121, 122 connected to the positive terminal thereof to be intermittently activated.

Further, a chopper charging circuit that simultaneously activates and deactivates transistors 66, 67 may be used in the first embodiment.

In addition, chopper charging circuits 200, 300, 400, 500, 600 as shown in FIGS. 32–36 may be used, respectively, in the first embodiment. In chopper charging circuits 200–600, components that are similar or correspond to those of the above embodiments are denoted by the same numerals and the description thereof is omitted.

Figure 32:
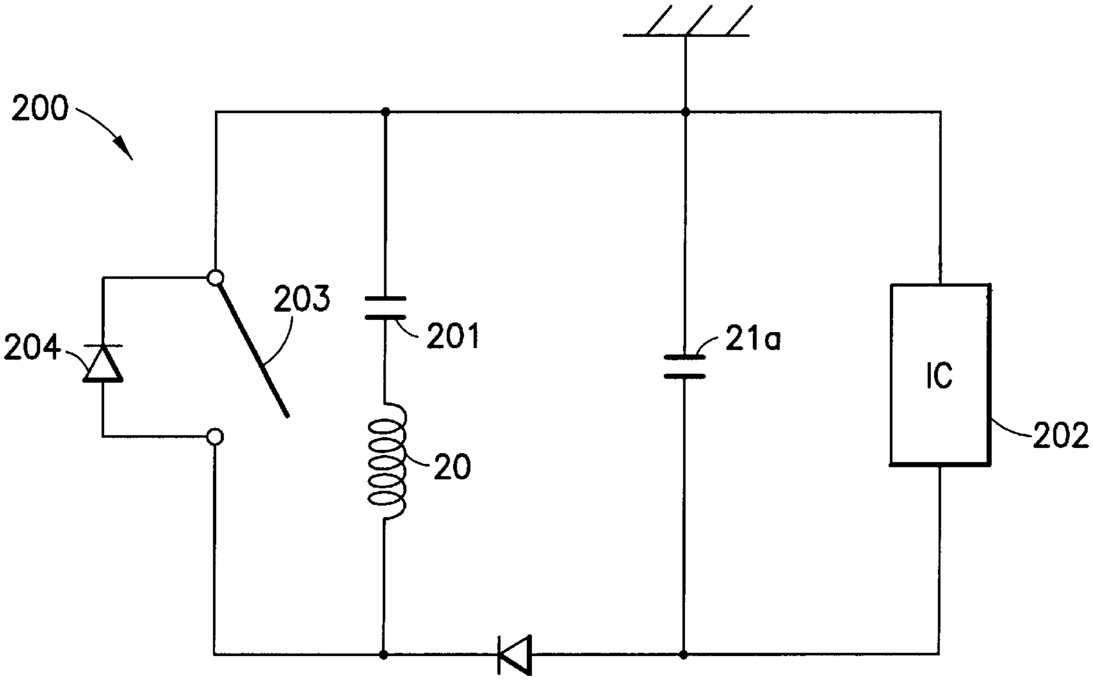
FIG. 32 is a circuit diagram showing a third embodiment of the chopper charging circuit constructed in accordance with the invention.

Chopper charging circuit 200 shown in FIG. 32 is arranged such that a capacitor 201 is connected in series to the coil of generator 20, and a capacitor 21*a* and an IC 202 are connected in parallel to generator 20. A chopping switch 203 for executing chopping under the control of IC 202 is connected in parallel to generator 20. A parasitic diode 204 is connected in parallel to switch 203.

In this manner, a benefit similar to the benefit denoted as (2) of the first embodiment is achieved. Brake torque can be improved without dropping a charged voltage in chopper charging circuit 200 because energy is charged to capacitor 201 when a short-circuit brake is applied to generator 20 by turning activating switch 203. Further, power in which a generated voltage is increased by containing the energy of capacitor 201 can be charged to capacitor 21*a* when switch 203 is deactivated. In addition, because parasitic diode 204 also acts as the diode of a boosting/rectifying circuit, the number of parts can be reduced thus achieving a part and manufacture cost reduction.

Figure 33:
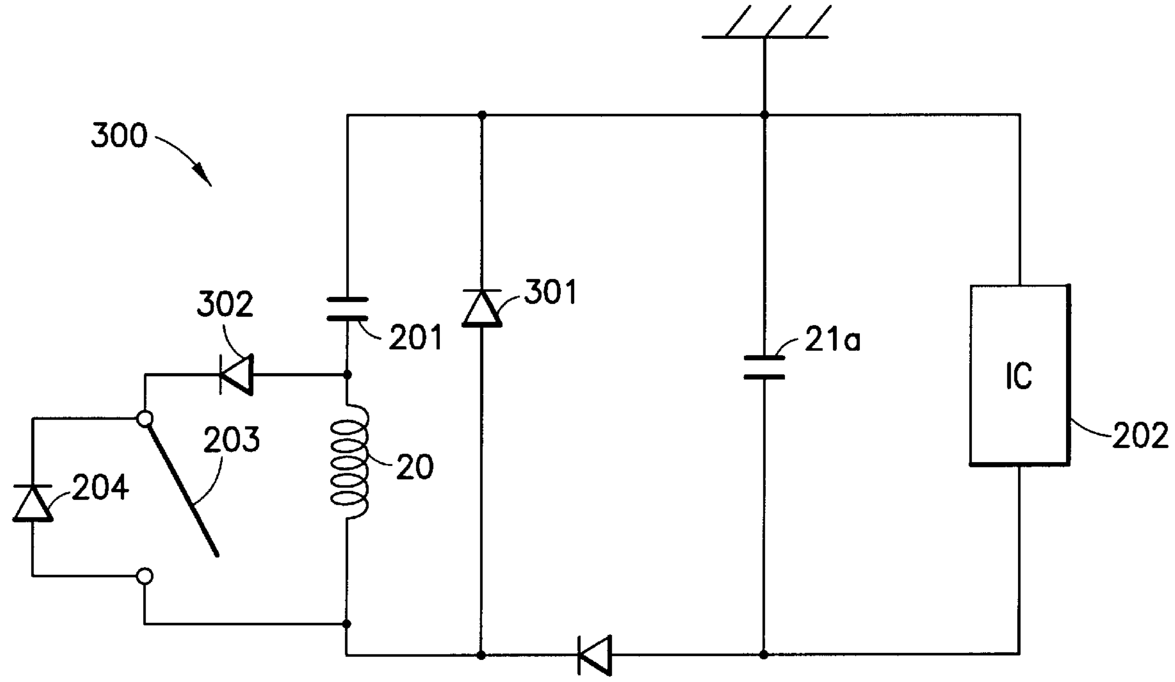
FIG. 33 is a circuit diagram showing a fourth embodiment of the chopper charging circuit constructed in accordance with the invention.

Chopper charging circuit 300, shown in FIG. 33, differs from chopper charging circuit 200 in that rectifying diodes 301, 302 are added to chopper charging circuit 200.

Chopper charging circuit 300 is more expensive than chopper charging circuit 200 because it includes an additional diode 301 in parallel with generator 20 and capacitor 201 and a second diode 302 between generator 20 and switch 203. However, chopper charging circuit 200 has a drawback because when switch 203 is connected and short-circuited, the charge of capacitor 201 flows to switch 203, thereby reducing a generated voltage improving ratio when a short-circuit time is increased. Whereas, the advantage of chopper charging circuit 300 is that since it can prevent the charge of capacitor 201 from flowing to switch 203 when switch 203 is connected, it can increase boosting performance as compared with chopper charging circuit 200.

Figure 34:
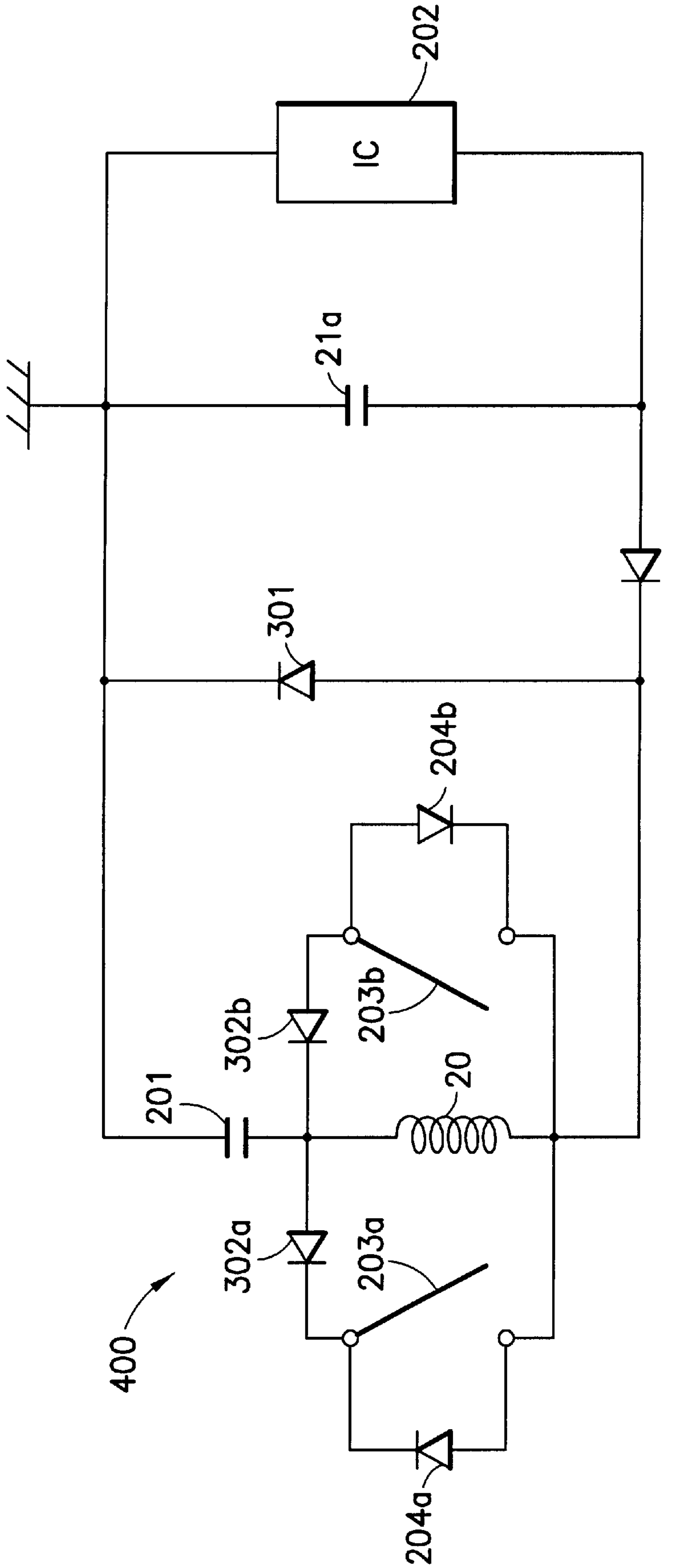
FIG. 34 is a circuit diagram showing a fifth embodiment of the chopper charging circuit constructed in accordance with the invention.

Chopper charging circuit 400 shown in FIG. 34 is similar to chopper charging circuit 300, the primary difference being an additional switch 203*b* and diodes 204*b*, 302*b* used in chopper charging circuit 300 to execute chopping to both the positive and negative waves of the a.c. output of generator 20. Like numbers are utilized to indicate like structure.

A second switch 203*b* is coupled across generator 20 parallel with a diode 204*b*. A diode 302*b* is coupled in series with switch 203*b* and generator 20. A first switch 203*a* with diodes 204*a* and 302*a* are coupled in mirror image and in parallel with the circuit of switch 203*b*. As a result, boosting and braking control can be performed over the entire cycle of the a.c. output of generator 20, thereby increasing boosting performance and braking performance.

Figure 35:
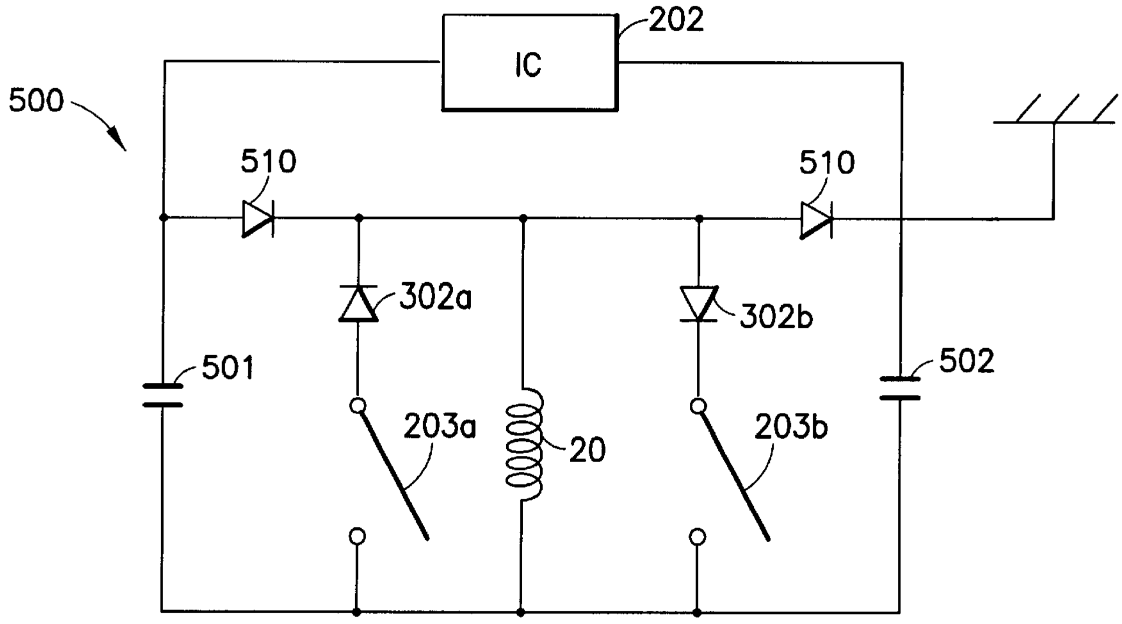
FIG. 35 is a circuit diagram showing a sixth embodiment of the chopper charging circuit constructed in accordance with the invention.

Chopper charging circuit 500 shown in FIG. 35 is a voltage doubler rectifying circuit capable of imposing a voltage twice as large as the voltage generated by generator 20 on IC 202 by the provision of two capacitors 501, 502. Diodes 510 are coupled in series across IC 202. A generator is coupled between the junction of diodes 510 at its one end and capacitors 501, 502 at its other end. Capacitors 501, 502 are coupled in parallel with a first diode 302*a* and is coupled in series with a switch 203*a*, which is coupled in parallel with generator 20. A second diode 302*b* is coupled in series with a switch 203*b*, which in turn is coupled in parallel with generator 20.

Figure 36:
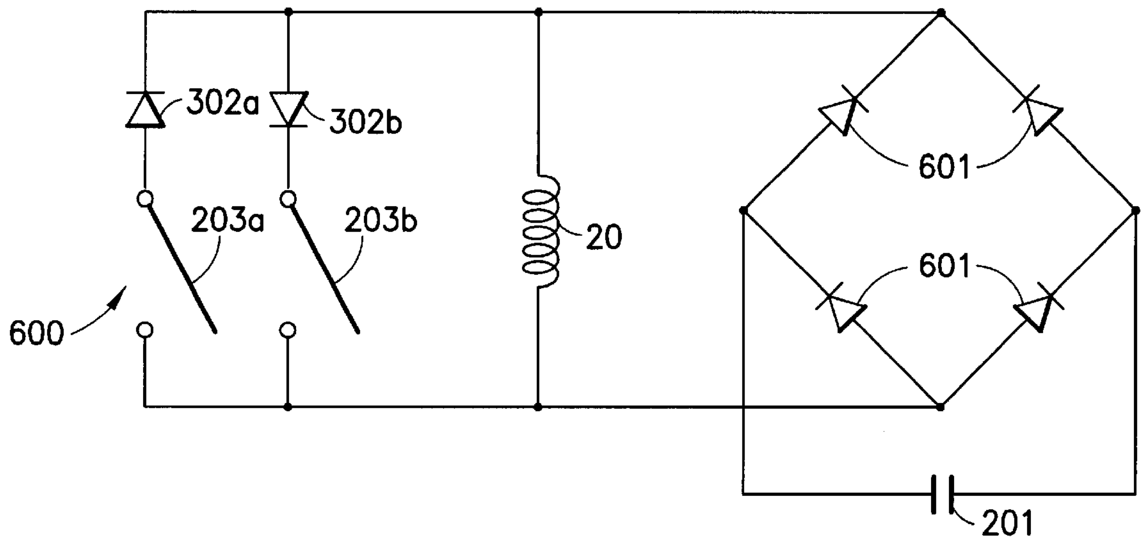
FIG. 36 is a circuit diagram showing a seventh embodiment of the chopper charging circuit constructed in accordance with the present invention.

Chopper charging circuit 600 shown in FIG. 36 achieves chopping by a full wave rectifying circuit having rectifying diodes 601. A capacitor 201 is coupled across diodes 601. Diodes 601 are also in parallel with generator 20 and a series connection of diode 302*a* in series with switch 203*a* and diode 302*b* in series with a switch 203*b*.

Although chopper charging circuit 500, 600 are arranged to carry out chopping to a full wave, they may be arranged to carry out chopping to a half wave. Chopper charging circuits 300–600 can also obtain an advantage similar to that numbered (2) of the first embodiment.

Figure 37:
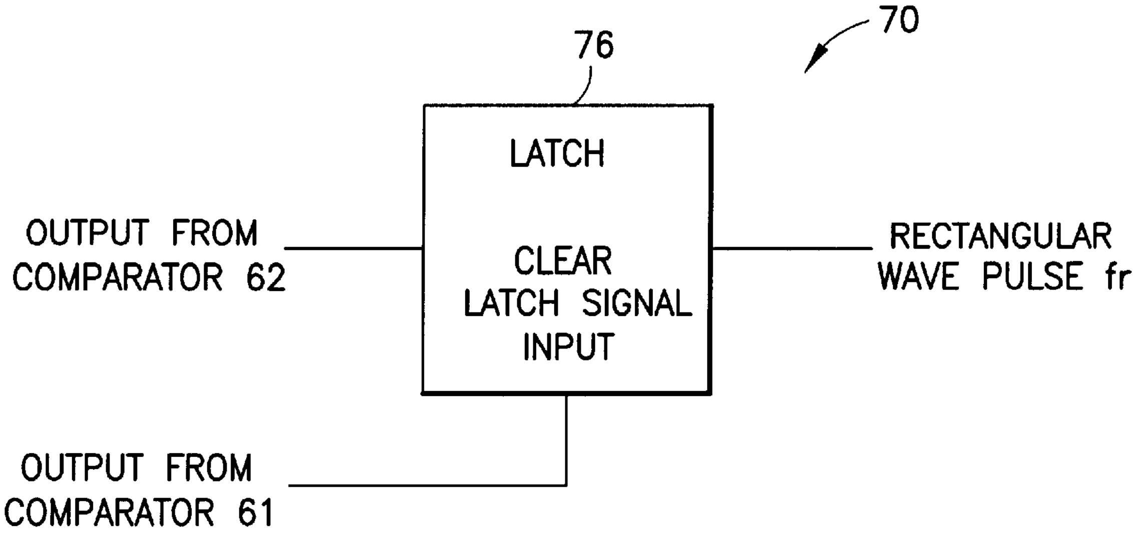
FIG. 37 is a view showing another embodiment of the waveform shaping circuit constructed in accordance with the invention.

Further, the arrangement of rotation sensing circuit 53, LPF 55 and brake control circuit 56 is not limited to the arrangement composed of waveform shaping circuit 70, charge pump 80, loop filter 81, signal output circuit 90, dividing circuit 91 and triangular wave generating circuit 92 as shown in the first embodiment. For example, latch 76, as shown in FIG. 37, may be used as the waveform shaping circuit 70. Although one embodiment of waveform shaping circuit 70 shapes the rectangular wave pulse fr only by the output from one of comparators 61, 62 as shown in FIG. 6, waveform shaping circuit 70 shown in FIG. 37 applies latch 76 in response to the ascending edge of the output for detecting the polarity of terminal AG1 (comparator 62) and is reset in response to the output from comparator 61 of terminal AG2 as shown in FIG. 9. This arrangement has an advantage that time is not delayed and detection can be accurately performed, although two outputs must be used. When latch 76 is applied in response to the output of terminal AG1, even if the output at terminal AG1 causes a lack of pulse, it is ignored. Accordingly, an affect to the rectangular wave pulse fr can be prevented.

The rotation controller is not limited to that using the PLL control as shown in the first embodiment and the one using up/down counter 160 as shown in the second through fifth embodiments. The rotation controller may control a rotational velocity only by the output from, for example, F/V converter 100. Further, generator 20 is not limited to a two-pole rotor, but may be a generator using a multi-pole rotor.

Although the second to fifth embodiments use a four-bit up/down counter 160 as the brake controller, an up/down counter of three bits or less and an up/down counter of five bits or more may be used. Since the use of an up/down counter having a larger number of bits increases a countable value, the range in which a cumulated error can be stored is increased, which is particularly advantageous in the control executed in a non-lock state just after the start of generator 20, for example. On the other hand, the use of a counter having a small number of bits has the advantage that a one-bit counter can handle the operation at a reduced cost, although the range in which an accumulated error can be stored is reduced, because an up-count and a down-count are repeated particularly in a lock state.

The brake controller is not limited to an up/down counter and may include first and second counters for use with reference signal fs and rotation sensing signal FG1, respectively, and a comparison circuit for comparing the values counted by the respective count means. However, the use of up/down counter 160 is advantageous in that it simplifies a circuit arrangement. Further, any arrangement may be employed as the brake controller so long as it can detect the rotational cycle of generator 20 and activate the brake-activation control and the brake-deactivation control based on the rotational cycle of generator 20.

Although the brake control can be carried out using two types of chopper signals having different duty ratios and different frequencies in the above embodiments, three or more types chopper signals having different duty ratios and different frequencies may be used.

The specific arrangements of voltage doubler rectifying circuit 35, brake circuit 120, brake control circuit 56, chopper signal generator 180 and the like are not limited to those of the above respective embodiments and any arrangements may be used so long as they can chopper control generator 20 of an electronically controlled mechanical timepiece.

Figure 38:
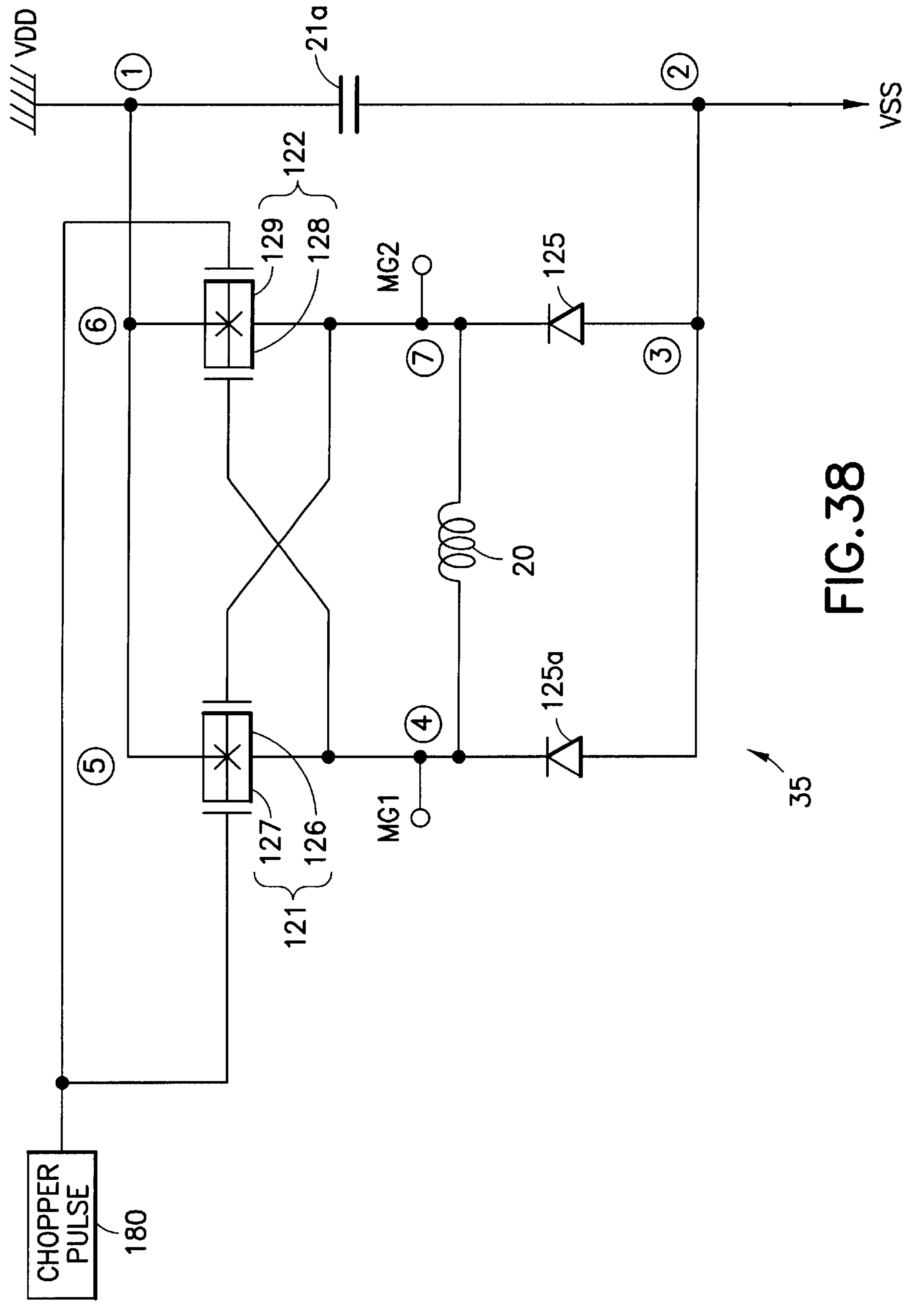
FIG. 38 is a circuit diagram showing another embodiment of the chopper rectifying circuit constructed in accordance with the invention.

For example, as is shown in the embodiment of FIG. 38, a diode 125*a* may be provided in place of capacitor 123 as chopper rectifying circuit 35 of brake circuit 120. Again, like numbers are utilized to indicate like structure. In this case, since a boosting circuit is not formed, chopper rectifying circuit 35 functions as a simplified synchronized chopper rectifying circuit. That is, when the polarity of the first terminal MG1 is positive and that of the second terminal MG2 is negative, first field effect transistor (FET) 126 is activated and third field effect transistor (FET) 128 is deactivated. As a result, the voltage charge generated by generator 20 is charged to power supply circuit (capacitor)

21*a* through the circuit "④→⑤→⑥→①→②→③→⑦→④" as is shown in FIG. 38. On the other hand, when the polarity of the first terminal MG1 is negative and the polarity of the second terminal MG2 is positive, first FET 126 is deactivated and third FET 128 is activated. As a result, the voltage charge generated by generator 20 is charged to power supply circuit (capacitor) 21*a* through the circuit "⑦→⑥→①→②→③→④→⑦" as is shown in FIG. 38.

The frequency of the chopper signal in the above embodiments may be set at an appropriate level depending on the system components and circuit construction. However, when the cycle is, for example, 50 Hz or more (about five times as large as the rotational frequency of the rotor of generator 20), brake performance can be improved while keeping a charged voltage to a prescribed value or more. Further, the duty ratio of the chopper signal may be appropriately set according to the components of a specific arrangement.

The rotational frequency (reference signal) of the rotor is not limited to 10 Hz of the first embodiment and the 8 Hz of second embodiment and may be appropriately chosen in accordance with the specific components.

Figure 39:
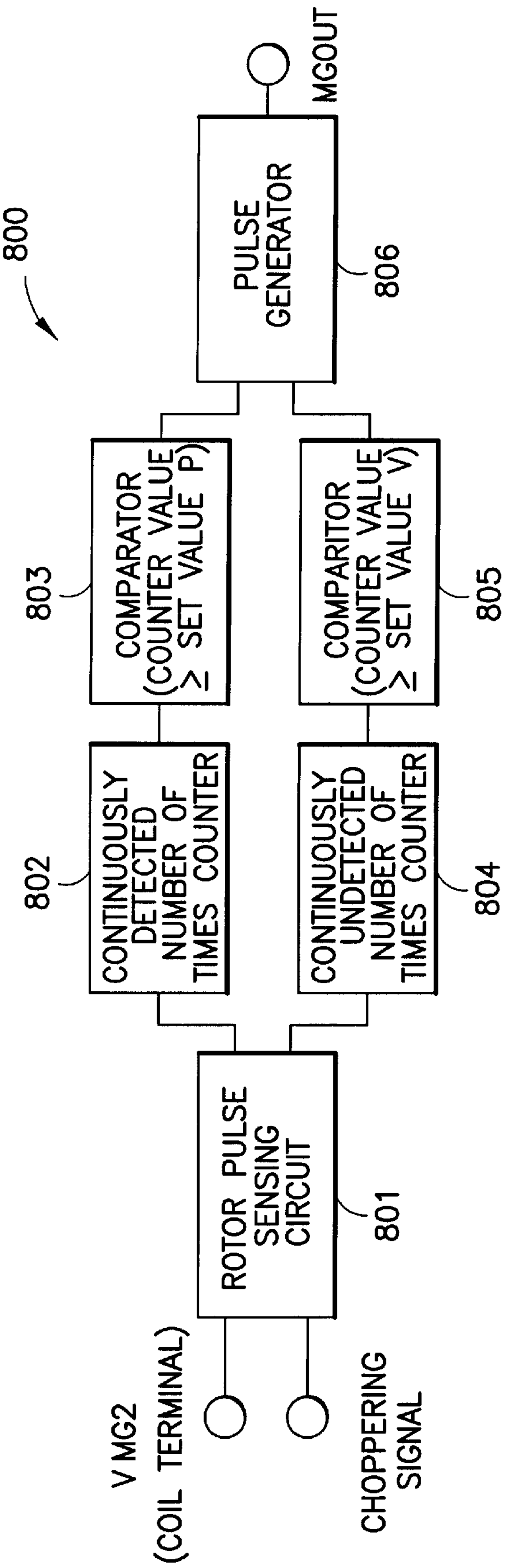
FIG. 39 is a view showing another embodiment of a rotor rotation sensing circuit constructed in accordance with the invention.

A rotor rotation sensing circuit 800 as shown in FIG. 39 may be used to detect the rotation of the rotor as rotation sensing circuit 53. That is, when generator 20 is controlled by chopping, a chopper pulse is superimposed on the rotational waveform of rotor 12 of generator 20. The voltage of the rotational waveform of rotor 12 is compared with the reference voltage at the time the chopper waveform is superimposed to obtain a rectangular wave signal (rotor rotation sensing signal MGOUT) that corresponds to a rotor rotational cycle from the rotational waveform of rotor 12. At the time, noise such as an external magnetic field (for example, a commercial power supply having a frequency of 50/60 Hz) may be superimposed on the rotational waveform of rotor 12 and there may arise such a case that the rotational waveform of rotor 12 is deformed by being affected by the noise and a rotor rotation signal cannot be obtained.

To cope with the noise problem, rotor rotation sensing circuit 800 includes a rotor pulse sensing circuit 801 coupled to the coil of generator 20 and the chopper signal for detecting whether the voltage of a rotor pulse VMG2 exceeds a reference or threshold voltage VROTD at the time of chopping. Rotor Pulse sensing circuit 80 provides an output to a first counter 802 for counting the number of consecutive times rotor voltage VMG2 exceeds a reference voltage and registering a first count. Counter 802 inputs the first count to a comparator 803 for comparing the first count of first counter 802 with a predetermined value p (which, for example, may be set to three) and detecting whether the first count is greater than predetermined value p. Rotor pulse sensing circuit 801 also provides an input to a second counter 804 for counting the number of times rotor voltage VMG2 is in excess of reference voltage VROTD and is not continuously detected by rotor pulse sensing circuit 801 and registering a second count. Counter 802 outputs the second count to a comparator 805 for comparing the second count of second counter 804 with a second predetermined value r (which, for example, may be set to three) and detecting whether the second count is greater than second predetermined value r. A pulse generator 806 outputs rotor rotation sensing signal MGOUT based on the results of comparisons executed by comparators 803, 805.

Figure 40:
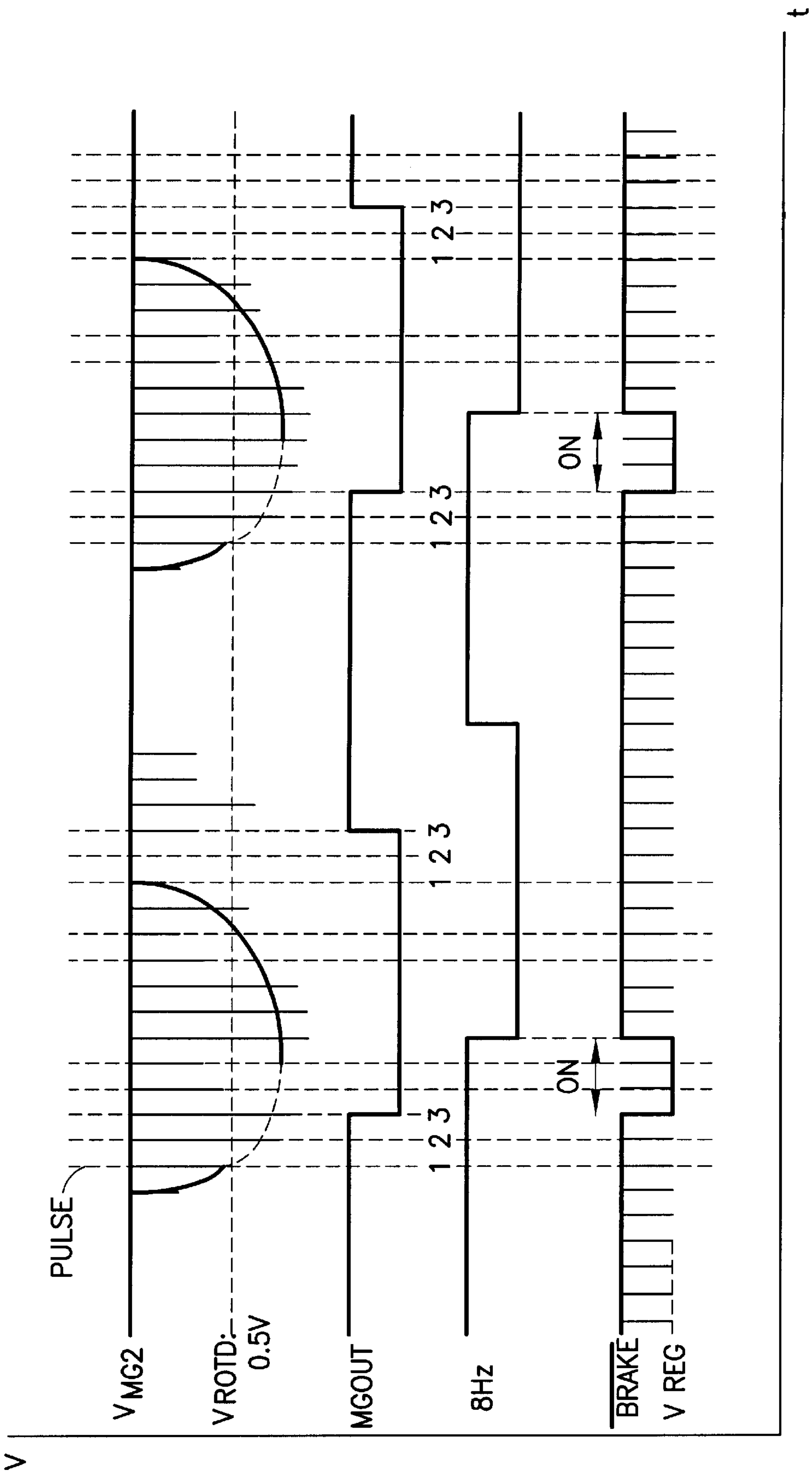
FIG. 40 is a timing chart of the operation of the rotor rotation sensing circuit of FIG. 39.

Referring to FIG. 40, a preferred embodiment is displayed where reference voltage VROTD is set to 0.5V and each pulse is depicted as a broken horizontal line. When voltage VMG2 of generator 20 exceeds reference voltage VROTD for a predetermined value p pulses (set, preferably, to three consecutive pulses), rotation sensing signal MGOUT drops from a high-level signal to a low-level signal, and a brake is applied to generator 20 by chopper control (BRAKE shown as a low-level signal). Whereas when voltage VMG2 of generator 20 does not exceed reference voltage VROTD for a predetermined value r pulses (set, preferably, to three consecutive pulses), rotation sensing signal MGOUT switches to a high-level signal, and the brake is released (depicted as BRAKE shown as a high-level signal). As such, since MGOUT switches from a high-level signal to a low-level signal once during each rotation of rotor 12, the rotation of rotor 12 can be reliably detected as shown in FIG. 40. MGOUT is compared with a reference signal (for example, 8 Hz) and a brake is applied during the time that the reference signal exceeds MGOUT to thereby regulate the velocity of rotor 12.

Figure 41:
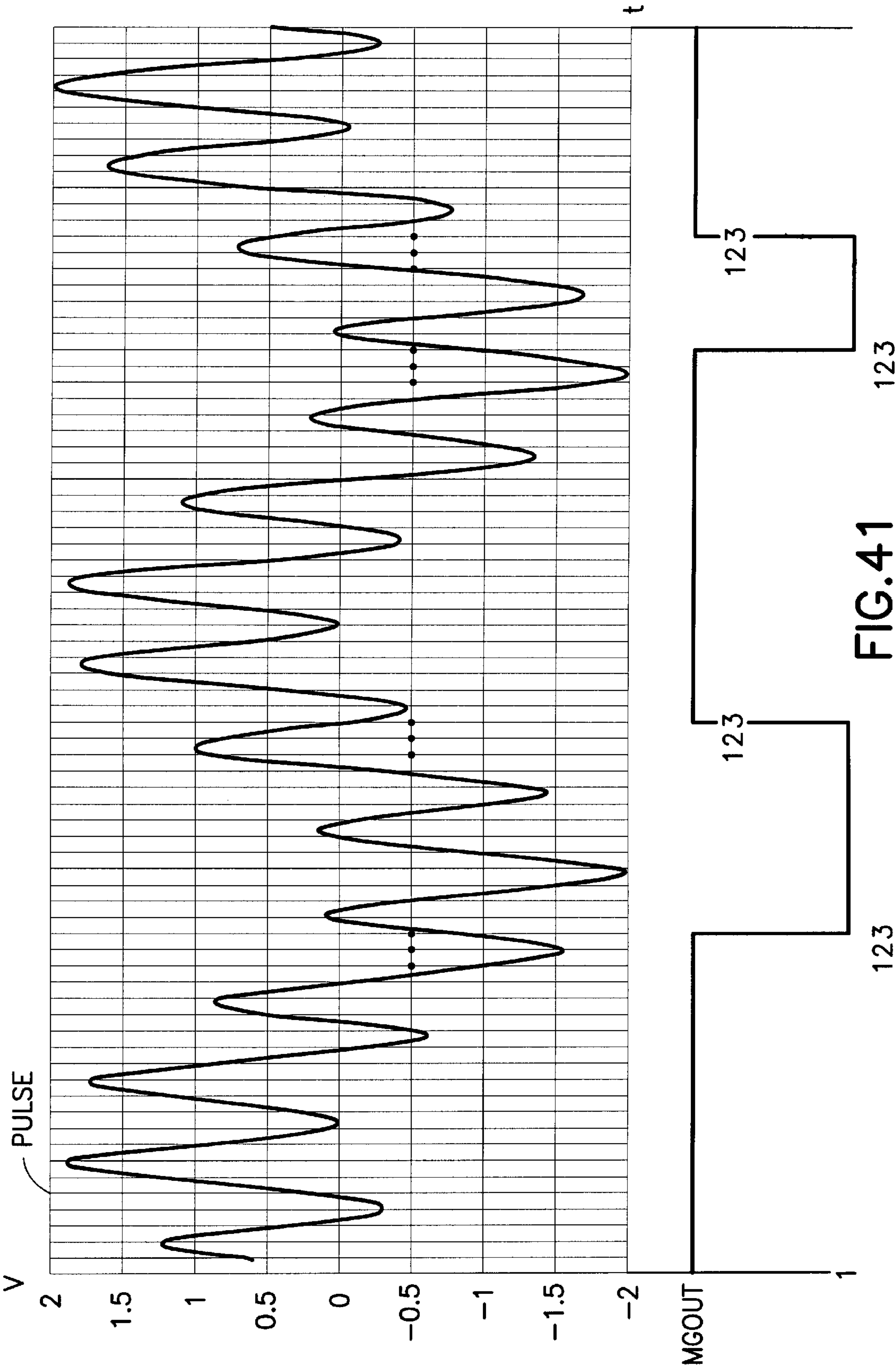
FIG. 41 is a graph of a waveform output by the rotor rotation sensing circuit of FIG. 39.

Although the values p and r may differ depending on the components used, they may be based on the noise frequency superimposed on the rotational cycle of rotor 12. For example, referring to FIG. 41, when 50 Hz noise (1 Vp-p sine wave) is superimposed on a 8-Hz rotational waveform (2 Vp-p sine wave) of rotor 12 and the chopping frequency is 256 Hz, about five cycles of the chopping frequency occurs during one cycle of the 50 Hz noise. Therefore, even if noise is superimposed on the rotational waveform of rotor 12, whether the rotational waveform exceeds the reference voltage can be determined depending upon whether one-half or more of the rotational waveform (the amount of three cycles of the continuous chopping frequency) exceeds the reference voltage. As such, the values p and r are preferably set to three times.

Figure 42:
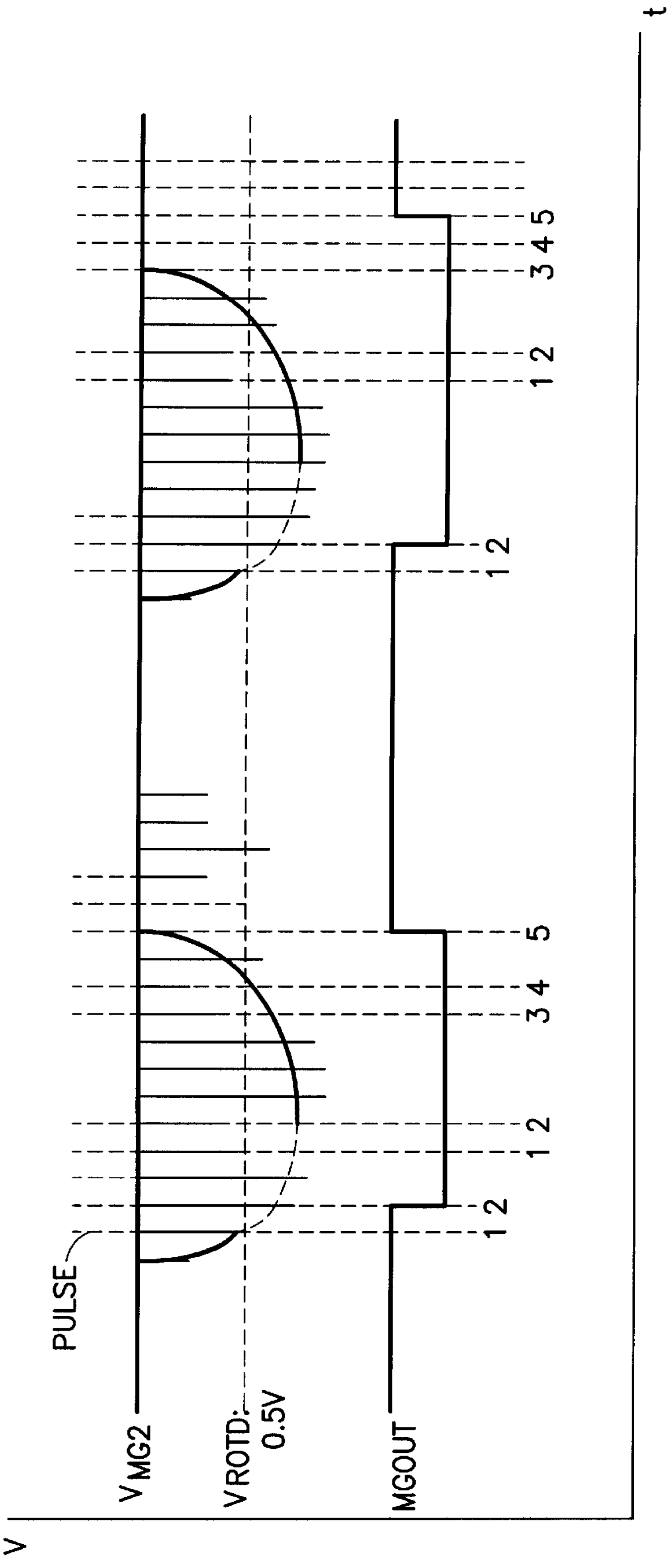
FIG. 42 is a timing chart depicting the operation of another embodiment of the rotor rotation circuit constructed in accordance with the invention.
Figure 43:
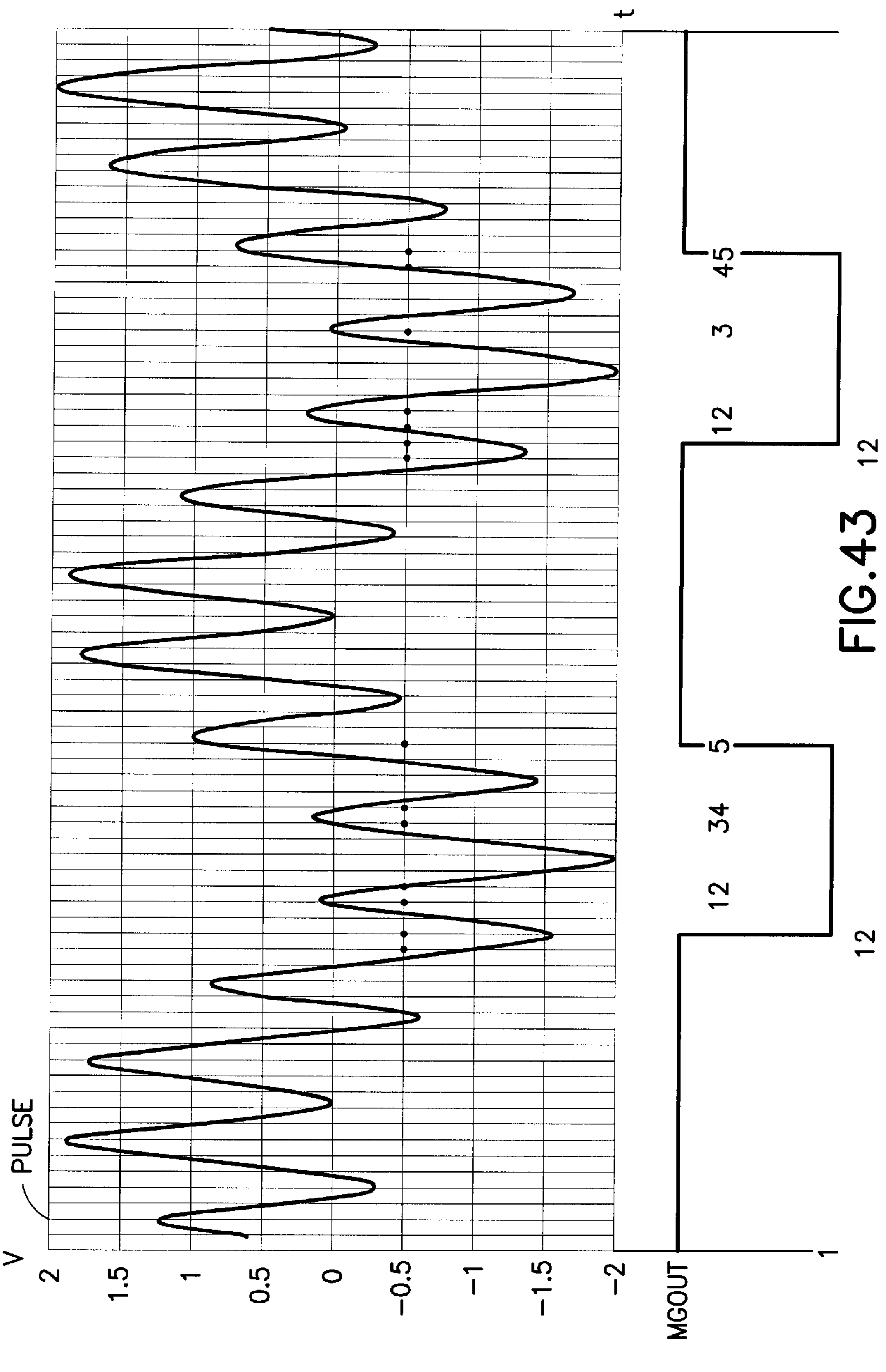
FIG. 43 is a waveform output by the rotor rotation sensing circuit of FIG. 42.

As is shown in FIGS. 42 and 43, a rotor rotation sensing circuit 800' constructed similarly to rotation sensing circuit 800, may include in place of counter 804, a counter 804' for counting the number of times voltage VMG2 does not exceed reference voltage VROTD, regardless of whether the non-detection occurs consecutively. In this case, a value v may be set, for example, to a value of two. Thus, where the number of consecutive pulses in which detected voltage VMG2 exceeds reference voltage VROTD is two, rotation sensing signal MGOUT drops from a high-level signal to a low-level signal. A value w may be set, for example, to a value of five, In this way, when the voltage VMG2 does not exceed reference voltage VROTD and is not detected, even if voltage VMG2 does not do so consecutively, rotation sensing signal MGOUT switches to a high-level signal. Thus, non-detection may be set based on the chopping frequency and the noise frequency to be superimposed on the rotational frequency of rotor 12. The detection of the rotation of rotor 12 where noise is superimposed on the rotational waveform of rotor 12 permits the rotation of rotor 12 to be correctly detected even if a clock is used in an environment where noise is likely to occur.

Figure 15:
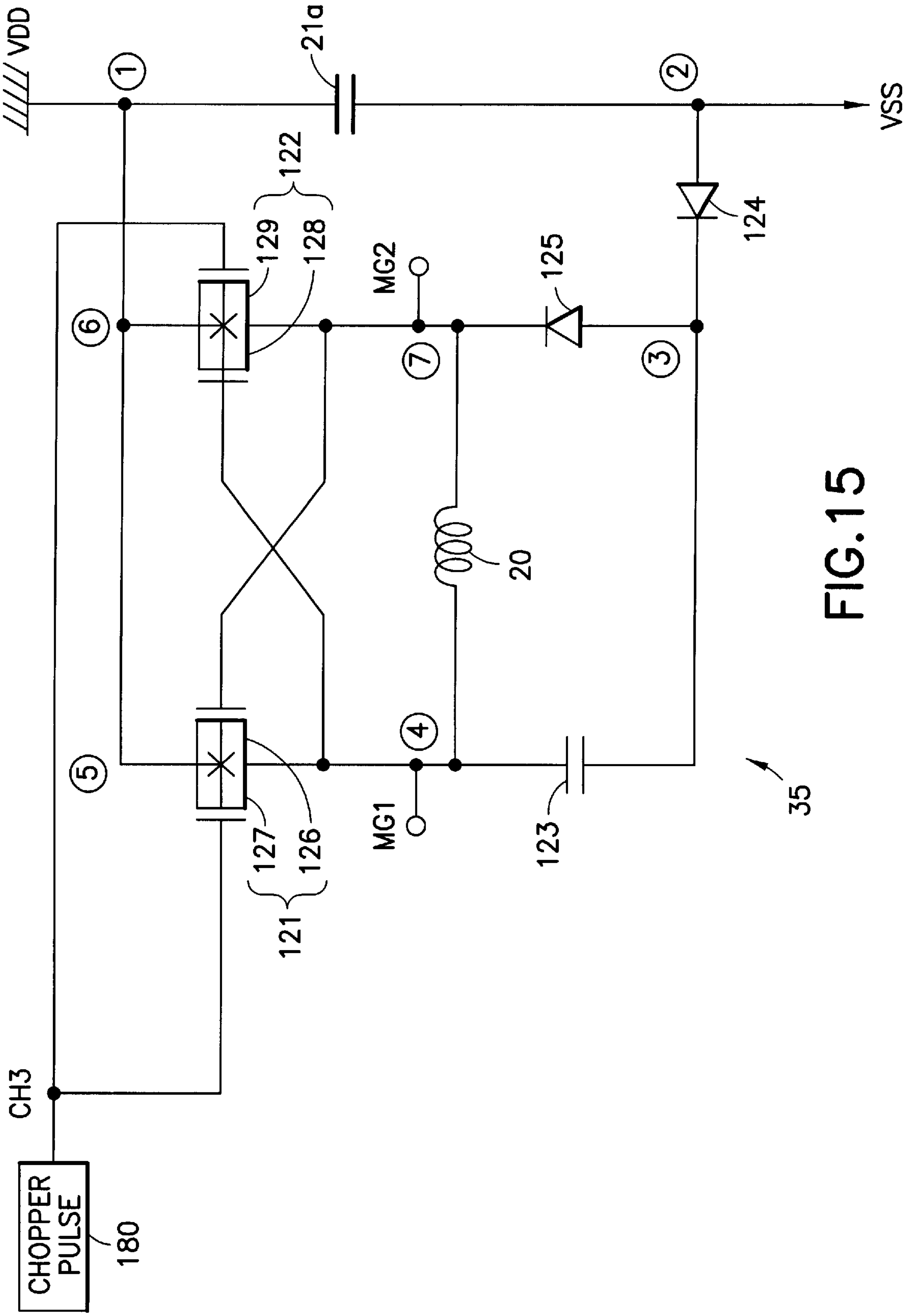
FIG. 15 is a circuit diagram of a rectifying circuit of the timepiece constructed in accordance with the second embodiment of the invention.

The use of chopper rectifying circuit 35 shown in FIG. 15 and FIG. 38 is not limited to the electronically controlled mechanical timepiece of the above embodiments. It is applicable to timepieces, such as wrist watches, table clocks, other types of clocks, portable sphygmomanometers, portable phones, pagers, pedometers, pocket calculators, portable personal computers, electronic notebooks, portable radios and the like. In short, it can be widely used in any type of electronic equipment that consumes electrical power. If, incorporated in an electronic circuit, such a chopper circuit can drive a mechanical system by a generator without a battery, thereby rendering a battery and the need to replace the battery unnecessary.

Further, it is possible to use the present invention in combination with other power-generating mechanisms by which battery replacement is made unnecessary, for example, a self-winding power generating mechanism and a self-power-generating device such as a solar cell, a thermo-power-generating device and the like.

The effect of the present invention is described next in connection with an example.

Figure 44:
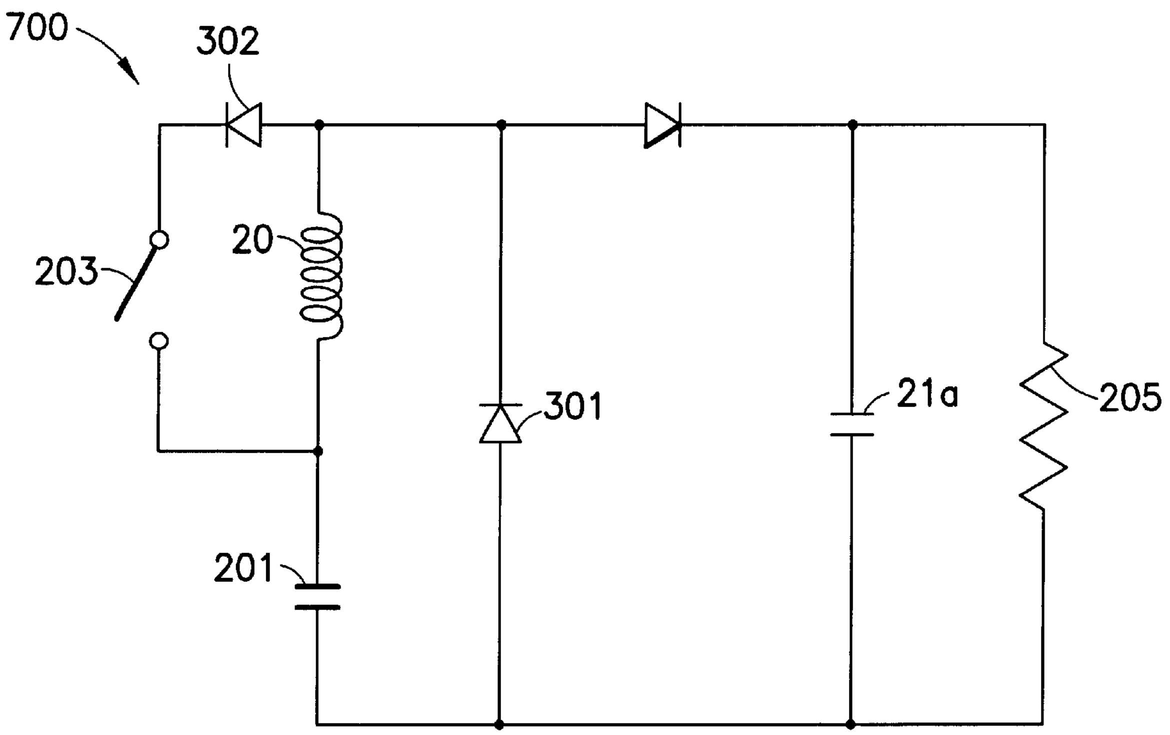
FIG. 44 is a circuit diagram showing a chopper charging circuit of an experimental example of the present invention.

A chopper charging circuit 700, shown in FIG. 44, was used in the following experiment. Chopper charging circuit 700 was constructed similarly to chopper charging circuit 300 shown in FIG. 33 and arranged such that a capacitor 201 of 0.1 μF was connected in series to the coil of generator 20. A capacitor 21*a* of 1 μF and chopping switch 203 were connected in parallel with generator 20. Further, a resistor 205 of 10 MΩwas disposed in place of an IC as well as rectifying diodes 301, 302 were provided.

The voltages charged to capacitor 21*a* (generated voltages) and drive torque were measured at the respective values of a duty cycle which represents the activation ratio of switch 203 when the chopping frequency of switch 203 was switched to five stages of frequencies; that is, to 25, 50, 100, 500, 1000 Hz. FIGS. 45 and 46 show the results of the experiment. The rotational frequency of the rotor of generator 20 was set to 10 Hz. Since an electronically controlled mechanical timepiece had IC 202, which was ordinarily set to be driven by 0.8 V and 80 nA, when 0.8 V was charged to capacitor 21*a* in circuit 700, a current of 80 nA flowed to resistor 205 of 10 MΩ so that a voltage sufficient to drive IC 202 was charged.

As is apparent from the results of the experiment shown in FIG. 45, a voltage exceeding 0.8 V was charged except where the chopping frequency was 25 Hz. Thus, charged voltage could be maintained using chopper charging circuit 700 to a prescribed value of 0.8 V or more.

FIG. 46 shows the results of the measurement of the torque for driving generator 20 under the chopping conditions shown in FIG. 45. Drive torque is necessary to rotate generator 20 at 10 Hz and similar to the torque by which generator 20 applies a brake to mainspring 1*a*. As is shown in FIG. 46, when the duty reaches 0.9, nearly the same drive torque can be obtained independent of the chopper frequency, although the drive torque curves are different depending upon the chopping frequencies as the duty is increased.

Therefore, when the chopper frequency is 50 Hz, that is, at least five times as large as the rotational frequency of the rotor, brake performance can be improved while maintaining the charged voltage to at least the prescribed value, thus confirming the effectiveness of the present invention.

As is shown in FIG. 45, even if chopper frequency is 25 Hz, at least 0.8 V can be charged when the duty is 0.80 or less. Accordingly, the chopping frequency of 25 Hz also can be also used by suitably setting the duty value.

Although the chopper frequency was measured only up to 1000 Hz in the experiment, it is presumed that the same effect can be achieved by a larger chopper frequency. However, when the chopper frequency is excessively large, the IC for chopping consumes a large amount of power, and therefore power to be generated by the generator is increased. Thus, preferably, the upper limit of the chopping frequency is set to above 1000 Hz; that is, to about one-hundred times as large as the rotational frequency of the rotor. In the event that an IC can be constructed that consumes less power, the upper limit of the dropping frequency will increase accordingly.

The characteristics shown in FIGS. 45 and 46 are not limited to the case where the rotational frequency (reference signal) of rotor 12 of generator 20 is 10 Hz. A similar tendency is also established at other frequencies. Accordingly, the rotational frequency may be appropriately set depending on the timepiece construction, and the same effect can be achieved with any rotational frequency.

It will thus be seen that the objects set forth above, among those made apparent from the preceding description are efficiently obtained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A timepiece, comprising:

a mechanical energy source;

a generator having a rotor;

a train wheel connecting said mechanical energy source and said generator, said mechanical energy source driving said train wheel to cause rotation of said generator, said generator converting rotation into electrical power; and a rotation controller coupled to said generator for controlling the rotation of said generator, said rotation controller including a switch for short-circuiting said generator, said rotation controller controlling the rotation of said generator by intermittently activating and deactivating said switch by chopping.

2. The apparatus of claim 1, wherein the apparatus is a timepiece.

3. The apparatus of claim 1, wherein said rotation controller includes an up/down counter for controlling the rotation of said rotor.

4. The apparatus of claim 1, wherein said rotation controller includes a PLL control for controlling the rotation of said rotor.

5. The timepiece of claim 2, wherein said generator includes a rotor, said train wheel rotating said rotor, and the frequency of chopper control is at least five times as large as the waveform frequency of the voltage generated by said rotor of said generator at a predetermined velocity.

6. The timepiece of claim 2, wherein the frequency of chopper control is about five to one hundred times as large as the waveform frequency of the voltage generated by said rotor of said generator at a predetermined velocity.

7. The timepiece of claim 2, further comprising:

a power supply circuit having a first power supply line coupled to said generator at a first terminal and a second power supply line coupled to said generator at a second terminal for transmitting electrical energy generated by said generator to said power supply circuit; and wherein said switch includes a first switch and a second switch, said first switch being interposed between said first terminal and said first power supply line, said second switch being interposed between said second terminal and said second power supply line; and wherein said rotation controller continuously activates one of said first switch and said second switch and chopper controls the other of said first switch and said second switch.

8. The timepiece of claim 7, wherein said first switch includes a first transistor and said second switch includes a second transistor.

9. The timepiece of claim 8, wherein said rotation controller includes:

a comparison circuit for outputting a differential signal based upon the comparison of a waveform-shaped signal with a time reference signal;

a signal output circuit for outputting a clock signal having a variable pulse width based upon said differential signal;

a first logic circuit for receiving said clock signal and said comparison reference signal and transmitting a signal to said first transistor for selectively activating the first transistor; and a second logic circuit for receiving said clock signal and said comparison reference signal and transmitting a signal to said second transistor for selectively activating the second transistor.

10. The timepiece of claim 7, wherein said first transistor is a field effect transistor having a gate connected to said second terminal of said generator and said first switch further includes a second field effect transistor connected in series to said first field effect transistor, said second field effect transistor being intermittently activated by said rotation controller; and said third transistor is a field effect transistor having a gate connected to said first terminal of said generator and said second switch further including a fourth field effect transistor connected in series to said third field effect transistor, said fourth field effect transistor being intermittently activated by said rotation controller.

11. The timepiece of claim 10, further comprises a first diode interposed between said first terminal of said generator and one of said first power supply line and second power supply line and a second diode interposed between said second terminal of said generator and the other of said first power supply line and said second power supply line.

12. The timepiece of claim 10, further comprising a boost capacitor interposed between one of said first generator terminal and said second generator terminal and one of said first power supply line and said second power supply line, and a diode interposed between the other one of said first generator terminal and said second generator terminal and the other one of said first power supply line and said second power supply line.

13. The timepiece of claim 2, wherein said rotation controller includes a chopper signal generator for generating at least a first chopper signal and a second chopper signal, said first chopper signal having a duty ratio different from said second chopper signal, and transmitting said first chopper signal and said second chopper signal to said switch, thereby performing chopper control of said generator.

14. The timepiece of claim 13, wherein said rotation controller includes a brake controller for controlling a brake activation, said brake controller detecting the rotational cycle of said generator and applying a brake on said generator based on said rotational cycle, and for releasing the brake based on said rotational cycle; said brake controller transmitting to said switch said first chopper signal having a duty ratio larger than that of said second chopper signal during said brake activation control and transmitting said second chopper signal to said switch during said brake deactivation control.

15. The timepiece of claim 2, wherein said rotation controller includes a chopper signal generator for generating a chopper signal and a brake controller for controlling a brake activation, said brake controller detecting the rotational cycle of said generator and applies a brake on said generator based on said rotational cycle, and for releasing the brake based on said rotational cycle; said brake controller transmitting to said switch said chopper signal during said brake activation control.

16. The timepiece of claim 2, wherein said rotation controller includes a chopper signal generator for generating at least a first chopper signal and a second chopper signal, said first chopper signal and said second chopper signal having different frequencies, and transmitting said first chopper signal and said second chopper signal to said switch to perform chopper control of said generator.

17. The timepiece of claim 16, wherein said rotation controller includes a brake controller for controlling a brake activation, said brake controller detecting the rotational cycle of said generator and applying a brake on said generator based on said rotational cycle, and for releasing the brake based on said rotational cycle; said brake controller transmitting to said switch said first chopper signal having a frequency smaller than that of said second chopper signal during said brake activation and transmitting said second chopper signal to said switch during said brake deactivation.

18. The timepiece of claim 17, wherein said first chopper signal and said second chopper signal have different duty ratios.

19. The timepiece of claim 2, wherein said rotation controller comprises:

a chopper signal generator for generating at least a first chopper signal having a first frequency and a second chopper signal having a second frequency lower than said first frequency;

and a voltage sensing unit for detecting the voltage of a power supply charged by the generator;

and wherein, when the voltage of the power supply detected by said voltage sensing unit is lower than a predetermined value, a first chopper signal is transmitted to said switch, and when the detected voltage of the power supply is higher than the predetermined value, a second chopper signal is transmitted to said switch, thereby chopper controlling the generator.

20. The timepiece of claim 2, wherein said rotation controller comprises:

a chopper signal generator for generating a first chopper signal having a first frequency and a second chopper signal having a second frequency, said second frequency being lower than said first frequency;

a voltage sensor for detecting the voltage of a power supply charged by said generator;

a brake controller for detecting the rotational cycle of said generator and applying a brake on said generator when said rotational cycle is greater than a first predetermined value, and for releasing the brake when said rotational cycle is less than or equal to the first predetermined value, and said brake controller transmitting said first chopper signal to said switch when the detected voltage is greater than the predetermined value, and said brake controller transmitting said second chopper signal to said switch when the detected voltage is less than or equal to the predetermined value, thereby performing chopper control.

21. The timepiece of claim 2, wherein said rotation controller includes a brake controller having a synchronizer for synchronizing the time at which a brake is applied to said generator and at which the brake is released from said generator, said synchronizer controlling said switch by a chopper signal.

22. The timepiece of claim 2, wherein said rotation controller includes a rotor rotation sensor for detecting the rotation of said rotor comprising:

a rotor sensor for detecting a rotor pulse voltage;

a comparator for comparing said rotor pulse voltage to a reference voltage during a period of chopper control; and a pulse generator for transmitting one of a low-level rotor rotation sensing signal and a high-level rotor rotation sensing signal when a said rotor pulse voltage exceeds said reference voltage and the other of one of a low-level rotor rotation sensing signal and a high-level rotor rotation sensing signal when said rotor pulse voltage does not exceed said reference voltage.

23. The timepiece of claim 2, wherein said rotation controller includes a rotor rotation sensor for detecting the rotation of said rotor comprising:

a rotor sensor for detecting a rotor pulse voltage;

a first counter for counting the number of consecutive times a rotor pulse voltage is greater than a reference voltage during a period of chopper control and storing a first count value;

a first comparator for comparing said first count value to a first predetermined value; and a pulse generator for transmitting one of a low-level rotor rotation sensing signal and a high-level rotor rotation sensing signal when a first count exceeds said predetermined value and the other of one of a low-level rotor rotation sensing signal and a high-level rotor rotation sensing signal when said first count does not exceed said predetermined value.

24. The timepiece of claim 23, wherein said rotor rotation sensor further comprises:

a second counter for counting the number of consecutive times a rotor pulse voltage is less than said reference voltage and storing a second count value;

a second comparator for comparing said second count value to a second predetermined value; and wherein said pulse generator transmits a low-level rotor rotation sensing signal when said first count exceeds said first predetermined value, and transmits a high-level rotor rotation sensing signal when said second count exceeds said second predetermined value.

25. The timepiece of claim 23, wherein said rotor rotation sensor further comprises:

a second counter for counting the number of times a rotor pulse voltage is less than said reference voltage and storing a second count value;

a second comparator for comparing said second count value to a second predetermined value; and wherein said pulse generator transmits a low-level rotor rotation sensing signal when said first count exceeds said first predetermined value, and transmits a high-level rotor rotation sensing signal when said second count exceeds said second predetermined value.

26. The timepiece of claim 23, wherein said first predetermined value is based on a chopping frequency and a noise frequency superimposed on the rotational waveform of said rotor.

27. The timepiece of claim 24, wherein said first predetermined value and said second predetermined value are based on a chopping frequency and a noise frequency superimposed on the rotational waveform of said rotor.

28. The timepiece of claim 25, wherein said first predetermined value and said second predetermined value are based on a chopping frequency and a noise frequency superimposed on the rotational waveform of said rotor.

29. The timepiece of claim 2, wherein said rotation controller controls includes a PLL control for controlling the rotation of said rotor.

30. The timepiece of claim 2, wherein said rotation controller includes an up/down counter for controlling the rotation of said rotor.

31. The apparatus of claim 1 wherein the apparatus is a portable electronic device.

32. The apparatus of claim 1, wherein the frequency of chopper control is greater than the waveform frequency of the voltage generated by said rotor of said generator at a pretermined velocity.

33. The apparatus of claim 1, further comprising:

a power supply circuit having a first power supply line coupled to said generator at a first terminal and a second power supply line coupled to said generator at a second terminal for transmitting electrical energy generated by said generator to said power supply circuit; and wherein said switch includes a first switch and a second switch, said first switch being interposed between said first terminal and said first power supply line, said second switch being interposed between said second terminal and said second power supply line; and wherein said rotation controller continously activates one of said first switch and said second switch and chopper controls the other of said first switch and said second switch.

34. The apparatus of claim 33, wherein said first switch includes a first transistor and said second switch includes a second transistor.

35. The apparatus of claim 34, wherein said rotation controller includes:

a comparison circuit for outputting a differential signal based upon the comparison of a waveform-shaped signal with a time reference signal;

a signal output circuit for outputting a clock signal having a variable pulse width based upon said differential signal;

a first logic circuit for receiving said clock signal and said comparison reference signal and transmitting a signal to said first transistor for selectively activating the first transistor; and a second logic circuit for receiving said clock signal and said comparison reference signal and transmitting a signal to said second transistor for selectively activating the second transistor.

36. The apparatus of claim 33, wherein said first switch includes a first field effect transistor having a gate connected to said second terminal of said generator and said first switch further includes a second field effect transistor connected in parallel to said first field effect transitor, said second field effect transistor being intermittently activated by said rotation controller; and said second switch includes a third field effect transistor having a gate connected to said first terminal of said generator and said second switch further including a fourth field effect transistor connected in parallel to said third field effeect transistor, said fourth field effeect transistor being intermittently activated by said rotation controller.

37. The apparatus of claim 36, further comprises a first diode interposed between said first terminal of said generator and one of said first power supply line and second power supply line and a second diode interposed between said second terminal of said generator and the other of said first power supply line and second power supply line.

38. The apparatus of claim 36, further comprising a boost capacitor interposed between one of said first generator terminal and said second generator terminal and one of said first power supply line and said second power supply line, and a diode interposed between the other one of said first generator terminal and said second generator terminal and the other one of said first power supply line and said second power supply line.

39. The apparatus of claim 1, wherein said rotation controller includes a chopper signal generator for generating at least a first chopper signal and a second chopper signal, said first chopper signal having a duty ratio different from said second chopper signal, and transmitting said first chopper signal and said second chopper signal to said switch, thereby performing chopper control of said generator.

40. The apparatus of claim 39, wherein said rotation controller includes a brake controller for controlling a brake activation, said brake controller detecting the rotational cycle of said generator and applying a brake on said generator based on said rotational cycle, and for releasing the brake based on said rotational cycle; said brake controller transmitting to said switch said first chopper signal having a duty ratio larger than that of said second chopper signal during said brake activation control and transmitting said second chopper signal to said switch during said brake deactivation control.

41. The apparatus of claim 1, wherein said rotation controller includes a chopper signal generator for generating a chopper signal and a brake controller for controlling a brake activation, said brake controller detecting the rotational cycle of said generator and applies a brake on said generator based on said rotational cycle, and for releasing the brake based on said rotational cycle; said brake controller transmitting to said switch said chopper signal during said brake activation control.

42. The apparatus of claim 1, wherein said rotation controller includes a chopper signal generator for generating at least a first chopper signal and a second chopper signal, said first chopper signal and said second chopper signal having different frequencies, and transmitting said first chopper signal and said second chopper signal to said switch to perform chopper control of said generator.

43. The apparatus of claim 42, wherein said rotation controller includes a brake controller for controlling a brake activation, said brake controller detecting the rotational cycle of said generator and applying a brake on said generator based on said rotational cycle, and for releasing the brake based on said rotational cycle; said brake controller transmitting to said switch said first chopper signal having a frequency smaller than that of said second chopper signal during said brake activation and transmitting said second chopper signal to said switch during said brake deactivation.

44. The apparatus of claim 43, whereni said first chopper signal and said second chopper signal have different duty ratios.

45. The apparatus of claim 1, wherein said rotation controller comprises:

- a chopper signal generator for generating at least a first chopper signal having a first frequency and a second chopper signal having a second frequency lower than said first frequency;
- and a voltage sensing unit for detecting the voltage of a power supply charged by the generator;
- and wherein, when the voltage of the power supply detected by said voltage sensing unit is lower than a predetermined value, a first chopper signal is transmitted to said switch, and when the detected voltage of the power supply is higher than the predetermined value, a second chopper signal is transmitted to said switch, thereby chopper controling the generator.

46. The apparatus of claim 1, wherein said rotation controller comprises:

- a chopper signal generator for generating a first chopper signal having a first frequency and a second chopper signal having a second frequency, said second frequency being lower than said first frequency;
- a voltage sensor for detecting the voltage of a power supply charged by said generator;
- a brake controller for detecting the rotational cycle of said generator and applying a brake on said generator when said rotational cycle is greater than a first predetermined value, and for releasing the brake when said rotational cycle is less than or equal to the first predetermined value, and
- said brake controller transmitting said first chopper signal to said switch when the detected voltage is greater than the predetermined value, and said brake controller transmitting said second chopper signal to said switch when the detected voltage is less than or equal to the predetermined value, thereby performing chopper control.

47. The apparatus of claim 1, wherein said rotation controller includes a brake controller having a synchronizer for synchronizing the time at which a brake is applied to said generator and at which the brake is released from said generator, said synchronizer controlling said switch by a chopper signal.

48. The apparatus of claim 1, wherein said rotation controller includes a rotor rotation sensor for detecting the rotation of said rotor comprising:

- a rotor sensor for detecting a rotor pulse voltage;
- a comparator for comparing said rotor pulse voltage to a reference voltage during a period of chopper control; and
- pulse generator for transmitting one of a low-level rotor rotation sensing signal and a high-level rotor rotation sensing singal when a said rotor pulse voltage exceeds said reference voltage and the other of one of a low-level rotor rotation sensing signal and a high-level rotor rotation sensing signal when said rotor pulse voltage does not exceed said reference voltage.

49. The apparatus of claim 1, wherein said rotation controller includes a rotor rotation sensor for detecting the rotation of said rotor comprising:

- a rotor sensor for detecting a rotor pulse voltage;
- a first counter for counting the number of consecutive times a rotor pulse voltage is greater than a reference voltage during a period of chopper control and storing a first count value;
- a first comparator for comparing said first count value to a first predetermined value; and
- a pulse generator for transmitting one of a low-level rotor rotation sensing signal and a high-level rotor rotation sensing signal when a first count exceeds said predetermined value and the other of one of a low-level rotor rotation sensing signal and a high-level rotor rotation sensing signal when said first count does not exceed said predetermined value.

50. The apparatus of claim 49, wherein said rotor rotation sensor further comprises:

a second counter for counting the number of consecutive times a rotor pulse voltage is less than said reference voltage and storing a second count value;

a second comparator for comparing said second count value to a second predetermined value; and wherin said pulse generator transmits a low-level rotor rotation sensing signal when said first count exceeds said first predetermined value, and transmits a high-level rotor rotation sensing signal when said second count exceeds said second predetermined value.

51. The apparatus of claim 49, wherein said rotor rotation sensor further comprises:

a second counter for counting the number of times a rotor pulse voltage is less than said reference voltage and storing a second count value;

a second comparator for comparing said second count value to a second predetermined value; and wherein said pulse generator transmits a low-level rotor rotation sensing signal when said first count exceeds said first predetermined value, and transmits a high-level rotor rotation sensing signal when said second count exceeds said second predetermined value.

52. The apparatus of claim 49, wherein said first predetermined value is based on a chopping frequency and a noise frequency superimposed on the rotational waveform of said rotor.

53. The apparatus of claim 50, wherein said first predetermined value and said second predetermined value are based on a chopping frequency and a noise frequency superimposed on the rotational waveform of said rotor.

54. The apparatus of claim 51, wherein said first predetermined value and said second predetermined value are based on a chopping frequency and a noise frequency superimposed on the rotational waveform of said rotor.

55. A method of controlling a generator, the method comprising:

comparing a reference signal with a rotation sensing signal that is based on the rotational cycle of said generator;

determining a phase difference between said reference signal and said rotation sensing signal; and chopper controlling said generator by intermittently activating and deactivating a switch for short-circuiting the respective terminals of said generator in accordance with said phase difference.

56. The method of claim 55, wherein the generator supplies power to a portable electronic device.

57. The method of claim 55, wherein the generator is a timepiece generator.

58. A method of controlling a generator, the method comprising:

inputting to an up/down counter a reference signal based on a signal from a time standard source and a rotation sensing signal based on the rotational cycle of the generator, wherein one of said reference signal and said rotation sensing signal is input as an up-count signal and the other of said reference signal and said rotation sensing signal is input as a down-count signal; and chopper controlling said generator by applying a brake to said generator when the counter value of the up/down counter is a preset value and not applying the brake to said generator when the counter value is a value other than said preset value.

59. The method of claim 58, wherein the generator supplies power to a portable electronic device.

60. The method of 58 further comprising:

detecting a charge voltage of a power supply;

comparing said charged voltage with a prescribed voltage; and outputting a reset signal to said up/down counter when said charged voltage differs from said prescribed voltage.

61. The method of claim 58, wherein the generator is a timepiece generator.

62. The method of controlling a generator of claim 61, the method further comprising:

detecting a charged voltage of a power supply;

comparing said charged voltage with a prescribed voltage; and outputting a system reset signal to said up/down counter when said charged voltage is greater than said prescribed voltage.

63. A generator comprising:

a rotation controller coupled to said generator for controlling the rotation of said generator, said rotation controller including a switch for short-circuiting said generator, said rotation controller controlling the rotation of said generator by intermittently activating and deactivating said switch by chopping.

64. The generator of claim 63 wherein the generator is a timepiece generator for supplying power to a timepiece.

65. A generator comprising:

a rotation controller coupled to said generator for controlling the rotation of said generator, said rotation controller including a switch for short-circuiting said generator, said rotation controller controlling the rotation of said generator by intermittently activating and deactivating said switch, wherein said rotation controller includes a rotor rotation sensor for detecting the rotation of said rotor comprising:

a rotor sensor for detecting a rotor pulse voltage;

a comparator for comparing said rotor pulse voltage to a reference voltage; and a pulse generator for transmitting one of a low-level rotor rotation sensing signal and a high-level rotor rotation sensing signal when a said rotor pulse voltage exceeds said reference voltage and the other of one of a low-level rotor rotation sensing signal and a high-level rotor rotation sensing signal when said rotor pulse voltage does not exceed said reference voltage.

66. The generator of claim 65 wherein the generator is a timepiece generator for supplying power to a timepiece.

67. A method of controlling a generator, the method comprising:

inputting to an up/down counter a reference signal based on a signal from a time standard source and a rotation sensing signal based on the rotational cycle of the generator, wherein one of said reference signal and said rotation sensing signal is input as an up-count signal and the other of said reference signal and said rotation sensing signal is input as a down-count signal; and chopper controlling said generator by applying a brake to said generator when the counter value of the up/down counter is a preset value and not applying the brake to said generator when the counter value is a value other than said preset value;

detecting a charged voltage of a power supply;

comparing said charged voltage with a prescribed voltage; and outputting a system reset signal to said up/down counter when said charged voltage is greater than said prescribed voltage.

68. The method of claim 67 wherein the generator is a timepiece generator for supplying power to a timepiece.

69. A generator having a rotation cycle, the generator comprising:

a time standard source;

an up/down counter having a counter value and having as an inputs a reference signal based on a signal from said time standard source and a rotation sensing signal based on the rotational cycle of the generator, wherein one of said reference signal and said rotation sensing signal is input as an up-count signal and the other of said reference signal and said rotation sensing signal is input as a down-count signal; and a brake for applying a braking force when the counter value of the up/down counter is a preset value and not applying the braking force when the counter value is a value other than said preset value.

* * * * *